(12) United States Patent
Frigon et al.

(10) Patent No.: US 11,641,643 B1
(45) Date of Patent: May 2, 2023

(54) INTERFACE MATRIX ARRANGEMENT FOR MULTI-BEAM, MULTI-PORT ANTENNA

(71) Applicant: Everest Networks, Inc., Mountain View, CA (US)

(72) Inventors: Jean-François Frigon, Brossard (CA); Van Hoang Nguyen, Senneville (CA)

(73) Assignee: Everest Networks, Inc., Mountain View, CA (US)

( * ) Notice: Subject to any disclaimer, the term of this patent is extended or adjusted under 35 U.S.C. 154(b) by 79 days.

(21) Appl. No.: 17/397,964

(22) Filed: Aug. 9, 2021

Related U.S. Application Data

(63) Continuation of application No. 16/396,578, filed on Apr. 26, 2019, now Pat. No. 11,089,595.

(60) Provisional application No. 62/663,107, filed on Apr. 26, 2018.

(51) Int. Cl.
| | |
|---|---|
| *H04B 7/10* | (2017.01) |
| *H04W 72/044* | (2023.01) |
| *H01Q 21/24* | (2006.01) |
| *H01Q 3/40* | (2006.01) |
| *H04B 7/0408* | (2017.01) |
| *H04B 7/0452* | (2017.01) |
| *H01Q 3/00* | (2006.01) |
| *H04W 84/12* | (2009.01) |

(52) U.S. Cl.
CPC .......... *H04W 72/046* (2013.01); *H01Q 3/005* (2013.01); *H01Q 3/40* (2013.01); *H01Q 21/24* (2013.01); *H04B 7/0408* (2013.01); *H04B 7/0452* (2013.01); *H04W 84/12* (2013.01)

(58) Field of Classification Search
CPC ....... H04B 7/10; H04B 7/0408; H04B 7/0452
See application file for complete search history.

(56) References Cited

U.S. PATENT DOCUMENTS

| | | |
|---|---|---|
| 3,255,450 A | 6/1966 | Butler |
| 5,872,491 A | 2/1999 | Kim et al. |
| 6,067,053 A | 5/2000 | Runyon et al. |
| 7,224,977 B2 | 5/2007 | Cavalli |
| 7,228,156 B2 | 6/2007 | Gilbert |
| 7,411,564 B2 | 8/2008 | Thevenot et al. |
| 7,415,288 B1 | 8/2008 | Hou et al. |
| 7,446,712 B2 | 11/2008 | Itoh et al. |
| 7,505,009 B2 | 3/2009 | Parsche et al. |
| 7,639,191 B2 | 12/2009 | Andersson et al. |
| 7,714,782 B2 | 5/2010 | Davis et al. |
| 7,764,232 B2 | 7/2010 | Achour et al. |
| 7,792,559 B2 | 9/2010 | Viorel et al. |
| 7,860,183 B2 | 12/2010 | Maltsev |
| 7,873,319 B2 | 1/2011 | Lastinger et al. |

(Continued)

FOREIGN PATENT DOCUMENTS

| | | |
|---|---|---|
| CN | 102668408 | 9/2012 |
| CN | 102804502 | 11/2012 |

(Continued)

OTHER PUBLICATIONS

[No Author Listed], "All Beamforming Solutions Are Not Equal," Ruckus Wireless, Inc., Jan. 2013, 9 pages.

(Continued)

*Primary Examiner* — Tu X Nguyen
(74) *Attorney, Agent, or Firm* — Fish & Richardson P.C.

(57) ABSTRACT

An interface matrix arrangement for multi-beam, multi-port antenna is described.

22 Claims, 43 Drawing Sheets

(56) References Cited

U.S. PATENT DOCUMENTS

| | | |
|---|---|---|
| 7,881,258 B2 | 2/2011 | Gilbert |
| 7,916,081 B2 | 3/2011 | Lakkis |
| 8,090,329 B2 | 1/2012 | Viorel et al. |
| 8,229,506 B2 | 7/2012 | Duet et al. |
| 8,244,190 B2 | 8/2012 | Larsson et al. |
| 8,289,910 B2 | 10/2012 | Gabriel et al. |
| 8,441,410 B2 | 5/2013 | Robert |
| 8,482,478 B2 | 7/2013 | Hartenstein |
| 8,483,200 B2 | 7/2013 | Cha |
| 8,494,587 B2 | 7/2013 | Picker et al. |
| 8,514,868 B2 | 8/2013 | Hill et al. |
| 8,515,410 B1 | 8/2013 | Bach |
| 8,538,420 B2 | 9/2013 | Picker et al. |
| 8,581,790 B2 | 11/2013 | Riley |
| 8,634,339 B2 | 1/2014 | Picker |
| 8,665,846 B2 | 3/2014 | O'Keefe et al. |
| 8,676,193 B2 | 3/2014 | Picker et al. |
| 8,687,480 B2 | 4/2014 | Jia et al. |
| 8,730,125 B2 | 5/2014 | De Flaviis et al. |
| 8,810,455 B2 | 8/2014 | Achour et al. |
| 8,849,332 B2 | 9/2014 | Scalia |
| 8,891,464 B2 | 11/2014 | Picker |
| 8,907,861 B2 | 12/2014 | Hirt et al. |
| 8,942,659 B2 | 1/2015 | Gulati et al. |
| 8,976,884 B2 | 3/2015 | Krishnamurthy et al. |
| 8,990,699 B2 | 3/2015 | Pugh et al. |
| 9,031,530 B2 | 5/2015 | Awoniyi |
| 9,070,977 B2 | 6/2015 | Choudhury et al. |
| 9,094,953 B2 | 7/2015 | Picker et al. |
| 9,113,354 B2 | 8/2015 | Picker et al. |
| 9,113,426 B2 | 8/2015 | Hultell |
| 9,124,005 B2 | 9/2015 | Nguyen et al. |
| 9,167,474 B2 | 10/2015 | Picker |
| 9,246,238 B2 | 1/2016 | Frigon et al. |
| 9,268,938 B1 | 2/2016 | Aguayo Gonzalez et al. |
| 9,288,259 B2 | 3/2016 | Shao et al. |
| 9,294,995 B2 | 3/2016 | Bach |
| 9,301,154 B2 | 3/2016 | Hamalainen |
| 9,313,088 B2 | 4/2016 | Takashinna et al. |
| 9,479,241 B2 | 10/2016 | Pabla |
| 9,525,524 B2 | 12/2016 | Barzegar |
| 9,584,273 B2 | 2/2017 | Kim et al. |
| 9,658,868 B2 | 5/2017 | Hill et al. |
| 9,749,241 B2 | 8/2017 | Gabriel et al. |
| 9,749,291 B2 | 8/2017 | Fork et al. |
| 9,910,144 B2 | 3/2018 | Corum et al. |
| 10,015,756 B1 | 7/2018 | Bullington |
| 10,129,887 B2 | 11/2018 | Pabla |
| 10,218,068 B1 | 2/2019 | Loui |
| 10,879,627 B1 | 12/2020 | Frigon et al. |
| 11,050,470 B1 | 6/2021 | Frigon et al. |
| 11,089,595 B1 | 8/2021 | Frigon et al. |
| 11,191,126 B2 | 11/2021 | Nguyen et al. |
| 2004/0242272 A1 | 12/2004 | Aiken et al. |
| 2005/0003865 A1 | 1/2005 | Lastinger et al. |
| 2006/0038738 A1 | 2/2006 | Shtrom |
| 2006/0109067 A1 | 5/2006 | Shtrom |
| 2006/0192720 A1 | 8/2006 | Shtrom |
| 2006/0205342 A1 | 9/2006 | McKay, Sr. et al. |
| 2007/0178839 A1 | 8/2007 | Rezvani et al. |
| 2008/0024366 A1 | 1/2008 | Cheng et al. |
| 2008/0139136 A1 | 6/2008 | Shtrom et al. |
| 2009/0028098 A1 | 1/2009 | Gates et al. |
| 2009/0066595 A1 | 3/2009 | Barker et al. |
| 2009/0080543 A1 | 3/2009 | Azizi et al. |
| 2009/0170472 A1 | 7/2009 | Chapin et al. |
| 2009/0298421 A1 | 12/2009 | Andersson et al. |
| 2010/0079347 A1 | 4/2010 | Hayes |
| 2010/0119002 A1 | 5/2010 | Hartenstein |
| 2010/0137024 A1 | 6/2010 | Maguire |
| 2010/0271261 A1 | 10/2010 | Waters |
| 2011/0130092 A1 | 6/2011 | Yun et al. |
| 2011/0249576 A1 | 10/2011 | Chrisikos et al. |
| 2011/0276963 A1 | 11/2011 | Wu et al. |
| 2012/0007789 A1 | 1/2012 | Petersson et al. |
| 2012/0274524 A1 | 11/2012 | Piazza et al. |
| 2012/0300682 A1 | 11/2012 | Hartenstein |
| 2012/0321003 A1 | 12/2012 | Soul et al. |
| 2013/0038496 A1 | 2/2013 | Kish et al. |
| 2013/0039355 A1 | 2/2013 | De La Garrigue |
| 2013/0157710 A1 | 6/2013 | Nammi et al. |
| 2013/0214989 A1 | 8/2013 | Farley et al. |
| 2013/0244722 A1 | 9/2013 | Rousu et al. |
| 2014/0161203 A1 | 6/2014 | Nammi et al. |
| 2014/0210681 A1 | 7/2014 | Shtrom |
| 2014/0225807 A1 | 8/2014 | Shtrom et al. |
| 2014/0266944 A1 | 9/2014 | Hartenstein |
| 2015/0003313 A1 | 1/2015 | Shao et al. |
| 2015/0022413 A1 | 1/2015 | Louzir et al. |
| 2015/0110049 A1 | 4/2015 | Pabla |
| 2015/0110212 A1 | 4/2015 | Pabla |
| 2016/0056544 A1 | 2/2016 | Garcia et al. |
| 2017/0039405 A1 | 2/2017 | Twogood et al. |
| 2017/0086184 A1 | 3/2017 | Pabla |
| 2017/0331670 A1 | 11/2017 | Parkvall |
| 2019/0103906 A1 | 4/2019 | Athley |
| 2019/0174475 A1 | 6/2019 | Pabla |
| 2020/0154521 A1 | 5/2020 | Nguyen et al. |
| 2020/0313294 A1* | 10/2020 | Morita ............... H01Q 21/0025 |
| 2022/0086955 A1 | 3/2022 | Nguyen et al. |

FOREIGN PATENT DOCUMENTS

| | | |
|---|---|---|
| CN | 205900780 | 1/2017 |
| CN | 106410396 | 2/2017 |
| EP | 2369893 | 9/2011 |
| JP | 2013-516110 | 5/2013 |
| WO | WO 2002023748 | 3/2002 |
| WO | WO 2006123021 | 11/2006 |
| WO | WO 2012115245 | 8/2012 |
| WO | WO 2018226764 | 12/2018 |

OTHER PUBLICATIONS

[No Author Listed], "BeamFlex® Smart Antenna System," Feature Sheet, Ruckus Wireless, Inc., Mar. 2013, 3 pages.

[No Author Listed], "Wireless Access Points and Arrays to Meet Your Every Need." Xirrus, Inc., 2014, 2 pages.

[No Author Listed], "Xinus Wireless Array, XR-6000 Series," Product Datasheet, Xirrus, Inc., Jan. 27, 2014, 4 pages.

Aboba, "Virtual Access Points" IEEE 802.11-03/154R0, Mar. 27, 2003, pp. 1-12.

Antenna-theory.com [online]. "VSWR (Voltage Standing Wave Ratio)" Dec. 31, 2009 [retrieved on Aug. 22, 2018], XP055501276, Retrieved from the Internet: <URL:http://www.antenna-theory.com/definitions/vswr.php>. 4 pages.

Hashemi et al., "Dual-Mode Leaky-Wave Excitation in Symmetric Composite Right/Left-Handed Structure with Center Vias," Microwave Symposium Digest (MTT), 2010 IEEE MTT-S International, May 2010, pp. 9-12.

Jackson et al., "Leaky-Wave Antennas," Proceedings of the IEEE, Jul. 2012, 100(7):2194-2206.

Liu et al., "Dominant Mode Leaky-Wave Antenna with Backfire-to-Endfire Scanning Capability," Electronics Letters, Aug. 29, 2002, 38:1414-1416.

Moernaut et al., "The basics of antenna arrays." Orban Microwave Products. Jul. 31, 2014, 8 pages.

Nguyen et al., "Performance-Enhanced and Symmetric Full-Space Scanning End-Switched CRLH LWA," IEEE Antennas and Wireless Propagation Letters, Jul. 25, 2011, 10:709-712.

Wang et al., "A microstrip leaky-wave antenna with beam-switchable scanning radiation" 2000 Asia-Pacific Microwave Conference. Proceedings (Cat. No.00TH8522), Dec. 6, 2000, pp. 1339-1342.

Wang et al., "Beam-Switchable Scanning Leaky-Wave Antenna" Electronics Letters, Mar. 30, 2000, 36(7):596-597.

\* cited by examiner

INTERFACE MATRIX ARRANGEMENT FOR MULTI-BEAM, MULTI-PORT ANTENNA

CROSS-REFERENCE TO RELATED APPLICATIONS

This application is a continuation of U.S. patent application Ser. No. 16/396,578, filed on Apr. 26, 2019 and issuing as U.S. Pat. No. 11,089,595, which claims benefit under 35 U.S.C. § 119(e)(1) of U.S. Provisional Application No. 62/663,107, filed on Apr. 26, 2018, incorporated by reference herein.

TECHNICAL FIELD

This disclosure is directed generally to wireless network devices, and more specifically to an interface matrix arrangement for multi-beam, multi-port antenna.

BACKGROUND

Wireless networks provide network connectivity to a multitude of wireless client devices through several wireless network devices. Those wireless network devices, also denoted as wireless access points (APs) or base stations (BS), are interconnected through a distribution system and share common radio frequency (RF) resources. Each AP can integrate one or more radios. Typically, a wireless client device selects a radio in an AP and establishes a wireless link with the radio according to a wireless network protocol such as the WLAN IEEE 802.11 (Wi-Fi) protocol or the cellular mobility long term evolution (LTE) protocol. RF signals used to establish the wireless link are transmitted in a wireless channel assigned or selected by the radio, where the RF channel occupies a limited bandwidth.

SUMMARY

Dynamic radio coverage reconfiguration is a powerful tool to optimize the network performance by directing the signal energy where required and decreasing interference in unwanted directions. An important aspect to consider in the design of efficient wireless network devices with dynamic radio coverage is to employ RF circuitry enabling the radio coverage reconfiguration with the lowest number of components and least RF signal power insertion loss. Multiple examples of an interface matrix arrangement for multi-beam, multi-port antenna are disclosed.

Details of one or more implementations of the disclosed technologies are set forth in the accompanying drawings and the description below. Other features, aspects, descriptions and potential advantages will become apparent from the description, the drawings and the claims.

BRIEF DESCRIPTION OF THE DRAWINGS

Like reference symbols in the various drawings indicate like elements.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the drawings.

DETAILED DESCRIPTION

Figure 1:
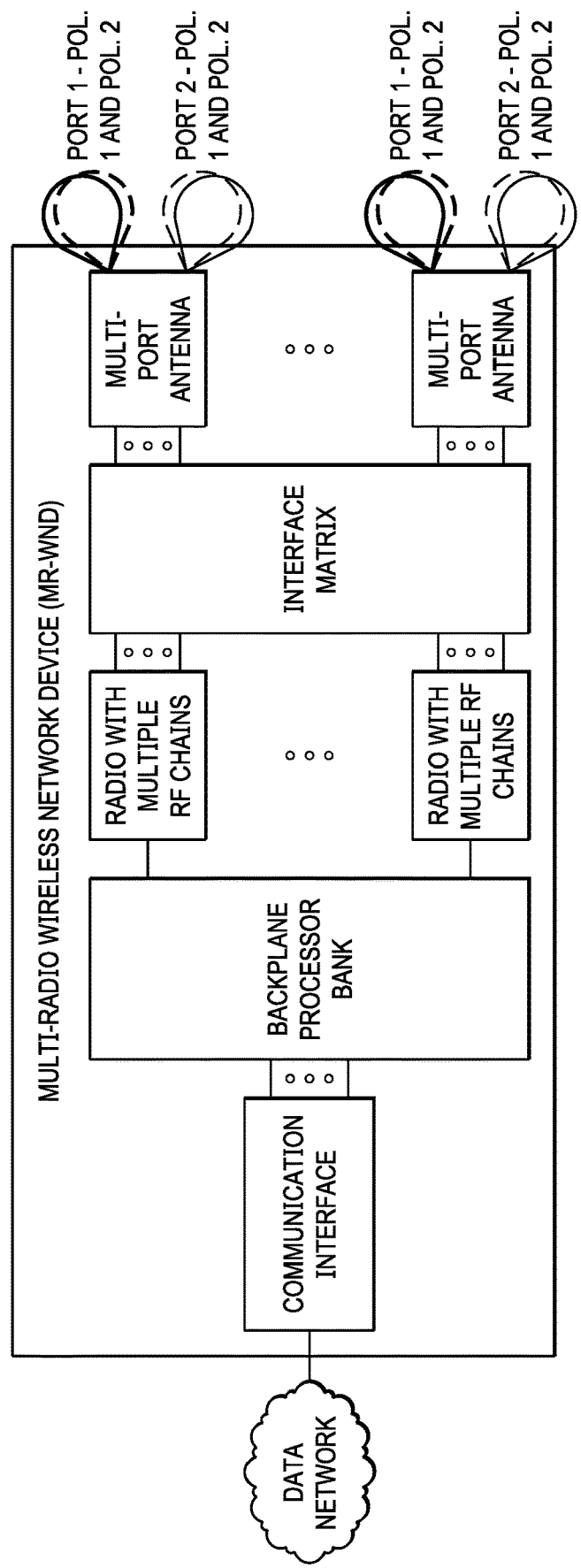
FIG. 1 is a diagram of a multi-radio wireless network device (MR-WND).

Multiple embodiments of an interface matrix arrangement for multi-beam, multi-port antenna are disclosed. The disclosed interface matrix arrangement can be integrated in wireless network devices (WNDs) like the one shown diagrammatically in FIG. 1. Such a WND can include multiple radios each with multiple radio RF transceiver chains (example of such radios include MIMO (multiple-input multiple-output) and MU (multi-user)-MIMO radios), an interface matrix and multiple multi-port antennas. This WND, also referred to as a multi-radio wireless network device (MR-WND), can be used as an access point or base station. The multi-port antennas have at least two ports and can simultaneously transmit multiple beams to increase the aggregate spectral efficiency. Each port transmits or receives a RF signal. Ports attached to a same radio transmit RF signals in a RF channel occupying a limited bandwidth. Each beam, also referred to as a spatial stream (SS) of data, may radiate the same or different RF signal and each beam has different signal polarization and/or radiation pattern (a radiation pattern is mainly characterized by the maximum gain direction and its beamwidth). Several types of antennas can be employed providing omnidirectional, directional or reconfigurable radiation patterns, and various radiation polarizations. The interface matrix interconnects the RF signals from the radios to the multi-port antennas ports. Optionally, the interconnection can be dynamically configured.

Prior to describing examples implementations of a power recycling and output decoupling selectable RF signal divider and combiner, in the following sections we address the design and implementation of an antenna system that provides efficient MIMO and MU-MIMO communications concurrently with multiple radios in UHD environments. The antenna system would itself be a composite of a plurality of directional antennas, together with other RF elements, configured so as to achieve this result. We discuss our embodiments of the antenna system, as a composite of a plurality of various RF elements. In particular, the antenna system comprises preferentially a plurality of directional antennas, as opposed to omni-directional antennas. Directional antennas, by their nature, provide means to reject deleterious signals presenting as interference from outside the coverage area. In the embodiments disclosed herein, the antenna system is defined such that it can achieve the feature attributes required of the WND, in a manner that is compact, and addresses the multitude of physical challenges that arise from its integration. We address both use cases, identified above, where either a wide coverage area or a narrow coverage area with high antenna gain and directivity are required. The disclosed antenna systems thus enable the deployment of high capacity wireless networks for a wide variety of UHD environments. The disclosed antenna system can optionally incorporate means to reconfigure an interface matrix to enable dynamic coverage and interference management of the different radios.

The methods described herein can be used to implement an antenna system with the following features/aspects (important to UHD type environments): (1) means to radiate for at least two radios and at least two RF signals per radio with orthogonal polarization everywhere in the intended coverage zone of each radio of the wireless network device to efficiently support MIMO communications in UHD environments; (2) means to provide coverage in an area while reducing signal leakage and increasing signal rejection to/from adjacent WND in order to provide good connectivity in the coverage area while decreasing the channel reuse distance; and (3) sufficient isolation between radios to enable concurrent radio transmission and reception. In the result, we consider desirable, but not limiting, attributes arising from two MR-WND coverage use cases typified in UHD environments. In the first case, coverage in a relatively wide area is desired.

More specifically, the coverage beamwidth should be between 90 degrees and 160 degrees. This feature is to provide coverage in large areas, such as conference halls, stadium or airport concourses, etc. In the second case, a relatively small coverage with a narrow beam and high signal gain is desired. More specifically, the coverage beamwidth should be smaller than 60 degrees with more than 6-dBi gain and low side lobe levels. This feature is to provide coverage from locations far from users, such as in a stadium or arena bowl seating area.

Additional desirable optional features that are incorporated include: (1) means to radiate for some radios at least four RF signals, where two RF signals radiate in a given direction with a given beamwidth with orthogonal polarization and the two other RF signals radiate in a different direction and/or different beamwidth with orthogonal polarization with respect to the first two RF signals. This feature helps decorrelate the wireless link and enhances MU-MIMO transmission in UHD environments to distinct users via pattern diversity; (2) means to independently reconfigure the intended coverage direction and/or intended coverage area of some of the radios, in order to dynamically reassign radio capacity where required relative to the wireless network device location, and/or decrease RF interference in/from given directions. A particularly desirable feature is to reassign the capacity of all radios in the same coverage zone or in different coverage zones, and; (3) the antenna system has a small conformal or planar form factor. This feature is required to design aesthetic wireless network devices.

Figure 2A:
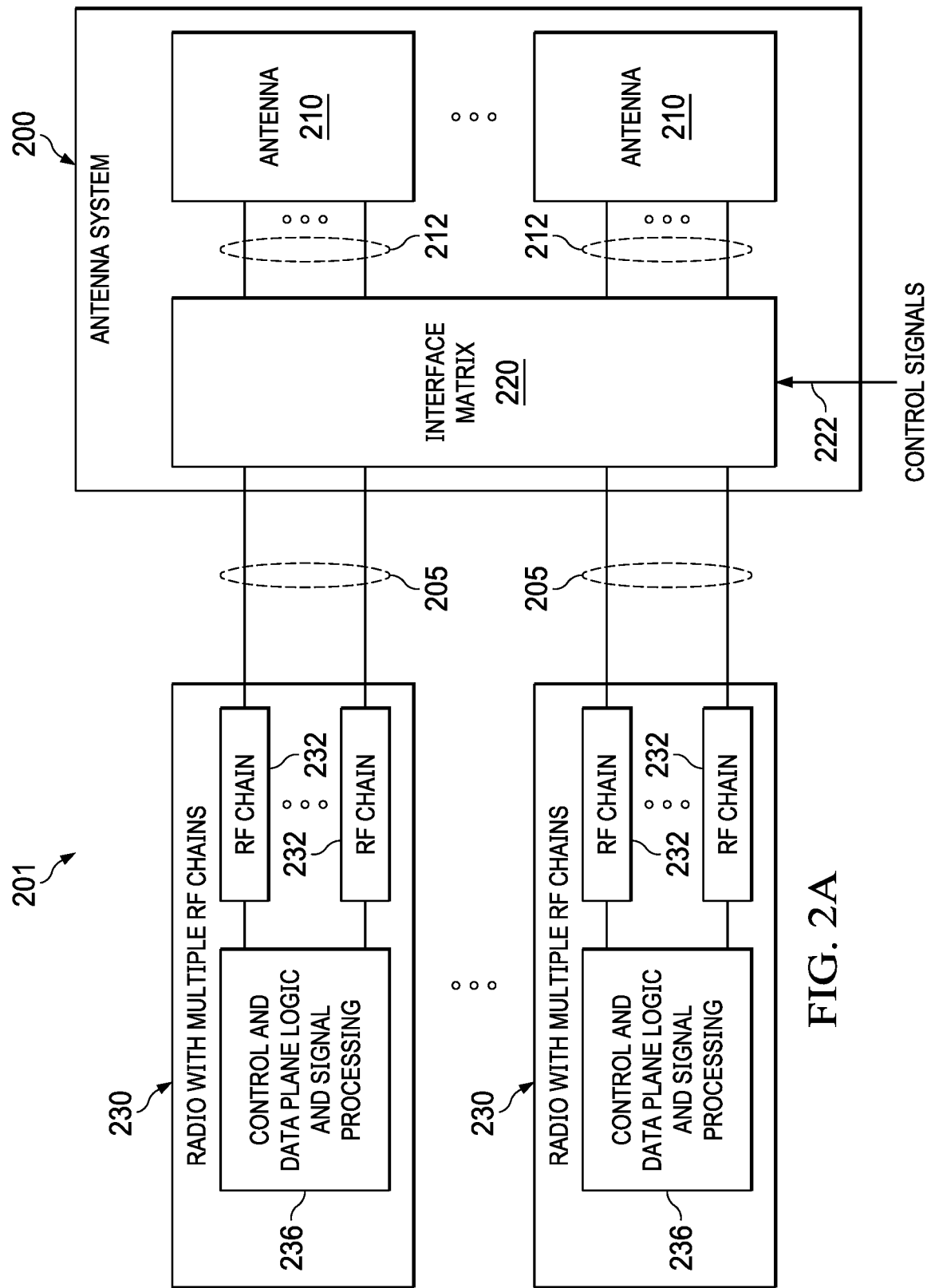
FIGS. 2A-2C show aspects of a multi-radio wireless network device that includes an antenna system in accordance with the disclosed technologies.

FIG. 2A is a diagram of an antenna system 200 that includes multiple antennas 210 and an interface matrix 220 for a MR-WND 201 that comprises at least two radios 230, each radio with multiple radio transceiver chains 232 (also referred to as RF chains). Examples of such radios 230 include MIMO and MU-MIMO radios. In the WND 201, each RF chain 232 of a radio 230 transmits on the same RF channel RF signals 205 belonging to the same data channel. The RF signals 205 can be the same or different. For clarity in the following we will assume that RF signals 205 are different. Each radio 230 transmits and receives RF signals 205 in one or more RF channels within an operating RF band. The RF band itself consists of RF spectrum that divided into multiple RF channels. The RF channels can be non-contiguous and the RF band may consist of non-contiguous RF spectrum. For clarity, in the following we will assume a single RF channel. Different radios transmit and receive RF signals 205 in RF channels in substantially non-overlapping RF bands. The RF chains of the radios 230 connect through the interface matrix 220 to the ports 212 of the multiple antennas 210. The interface matrix 220 could be reconfigured to selectively interconnect the RF chains 232 to the antenna ports 212 to dynamically change the spatial coverage of said radios 230. FIG. 2A illustrates an example of an interconnection of the radios 230, interface matrix 220 and antennas 210 in the MR-WND 201. In general, the number of radios 230 may differ from the number of antennas 210, and a radio can be connected simultaneously to different antennas.

The interface matrix 220 may comprise cables, transmission lines, switching elements and/or power dividing/combining elements to selectively route and connect or disconnect the RF chains 232 to each of the individual antenna feeds. Furthermore, the interface matrix 220 can be configured to allow each RF chain 232 to be coupled to none, one or multiple antenna feeds of the antenna system 200. The state of the switching elements is dynamically configured via the interface matrix control signals 222. The interface matrix 220 can also include RF filters to further reject signals outside the radio's operating RF band. Furthermore, the interface matrix 220 may comprise multiple separate interface matrix modules implemented on separate PCB.

Here, each radio 230 in the wireless network device 201 communicates data wirelessly according to communication protocols, such as those specified by IEEE 802.11, LTE (and its variants, LTE-U, MuLTEfire, etc.), IEEE 802.15.4 (Zigbee), Bluetooth, and/or other type of wireless communication protocols. Different radios 230 can operate according to different user desired protocols. The radios 230 can also be multiple protocol capable, to be reconfigured to operate using different communication protocols. In the discussion that follows, for clarity, IEEE 802.11ac with four antennas is often used as an illustrative example. However, this does not restrict the scope of the described technologies and their applicability to particular radios or particular communication protocols.

The system logic 236 to determine the control signals 222 required to configure the coupling state realized by the interface matrix 220 can be implemented in either the radios 230, or a processor in a processor bank attached to the radios or a separate entity in the data network attached to a wireless network device communication interface such as a different wireless network access device or a wireless network access controller, or a combination of the above.

Figure 2B:
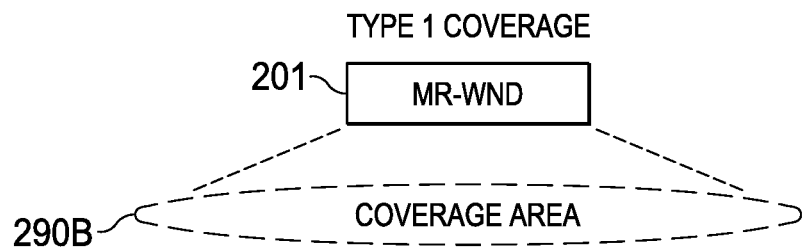
Figure 2C:
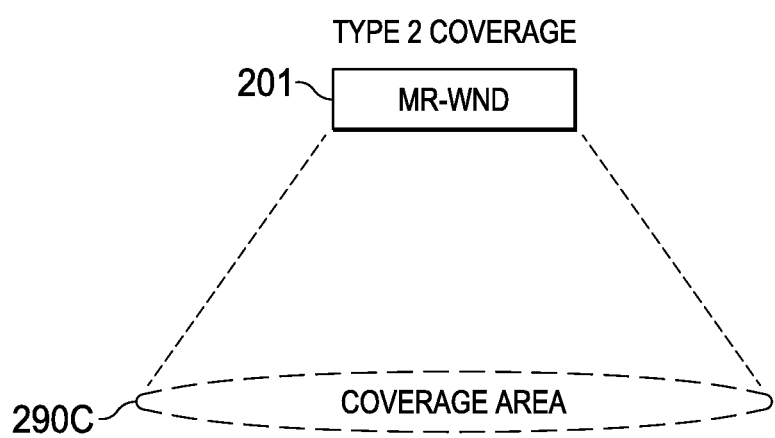

As discussed above, UHD deployments environments are best addressed using an antenna system 200 with either low gain and directivity providing wide coverage area (also referred to as UHD type-1 or simply type-1) or high gain and directivity providing narrow coverage area (also referred to as UHD type-2 or simply type-2). FIGS. 2B and 2C illustrate, without limitation, type 1 coverage area 290B and type 2 coverage area 290C, respectively. An example of type-1 coverage 290B is encountered in deployment of a ceiling mount MR-WND 201 at a height of less than 15 feet while an example of type-2 coverage 290C is encountered in deployment of a MR-WND 201 on a canopy or catwalk to serve users at a distance circa 100 feet. In the absence of a single antenna system that provides ideal capability for both type-1 and type-2 use cases we disclose two approaches to realizing an antenna system, one for UHD type-1 and one for UHD type-2, with each approach itself consisting of two steps. Although both antenna systems differ in their specific composition, the high-level elements of both antenna systems are common to the ones of the antenna system 200 illustrated in FIG. 2A.

In the first approach, we describe in a first step a first antenna system comprising a multi-segment multi-port (MSMP) antenna and an interface matrix for a WND having one radio. This MSMP antenna system provides means to the radio to cover a wide area as per UHD type-1. In a second step, we describe how to extend the MSMP antenna system to a MR-WND comprising at least two radios. This MR-WND employing a multi-radio MSMP antenna system comprising multiple MSMP antennas is suitably the first solution approach to provide coverage in type-1 wide areas.

In the second approach, we describe in a first step an antenna system comprising a Multi-Port Array (MPA) antenna and an interface matrix for a WND having one radio. This MPA antenna provides high gain and high directivity to provide adequate service to users from a large distance as per UHD type-2. In a second step, we describe how to extend the MPA antenna system to a MR-WND comprising at least two radios. This MR-WND employing MPA antennas is suited for UHD type-2 environments.

Figure 3:
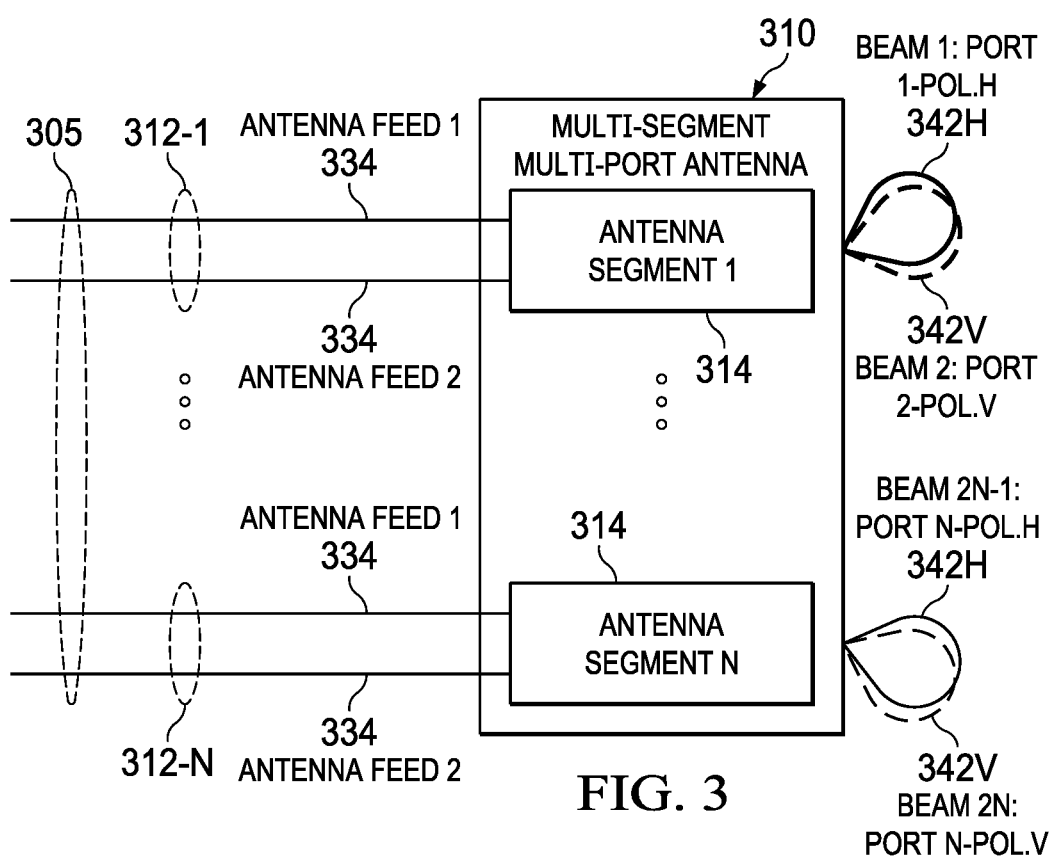
FIG. 3 is a diagram of an example of a multi-segment multi-port (MSMP) antenna.

FIG. 3 illustrates the concept of an MSMP antenna 310 and its interface to a radio with multiple RF radio chains. The MSMP antenna 310 comprises multiple antenna segments 314 wherein each antenna segment has a common antenna port 312 comprising two separate antenna feeds 334 and means to radiate RF signals coupled to the antenna feeds with a directional radiation pattern. Further, each antenna segment 314 in the MSMP antenna 310 is a planar structure than can be independently oriented from the other segments (that is, the normal to each antenna segment plane can be positioned in independent directions). Each antenna feed 334 can be connected, through the interface matrix (e.g., 220), to a RF chain of the radio. Each RF chain transmits/receives a RF signal 305 from a radio.

Generally, a RF chain can be interconnected to none, one or more than one antenna feed 334 and an antenna feed can be connected to none, one or more than one RF chain. RF signals 305 coupled to the two different RF antenna feeds 334 of a common antenna port 312 are radiated by the antenna segment 314 with two different directional (non-omnidirectional) beams 342H, 342V. Both directional beams 342H, 342V radiate the RF signals with substantially similar radiation patterns, but with orthogonal polarizations. We refer to these dual beams as the vertical polarization beam 342V and horizontal polarization beam 342H of the antenna port 312 or antenna segment 314. In the result, each port 312 of the MSMP antenna 310 provides means to radiate a pair of directional beams 342H, 342V with orthogonal polarization in substantially different directions from the other ports 312. The antenna segment 314's properties (planar structure, independent geometric arrangement of different antenna segments, directional beam, two antenna feed, orthogonal polarization) make the MSMP antenna system, as we disclose later, an excellent choice to achieve type-1 coverage 290B with a MR-WND 201.

Figure 4:
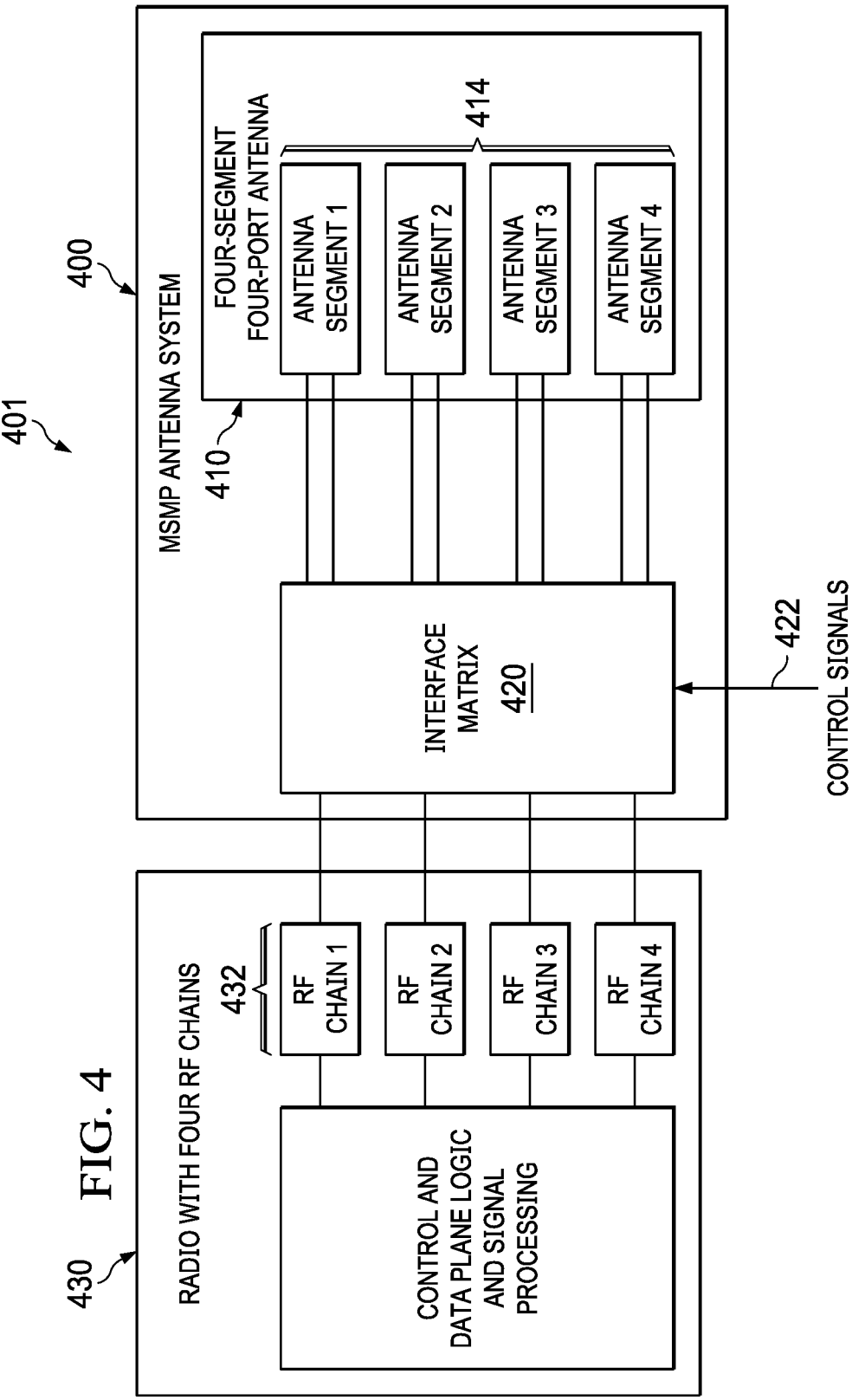
FIG. 4 is a diagram of a wireless network device which includes a single radio with four RF chains and an antenna system that includes four planar antenna segments.

FIG. 4 is a diagram of an MR-WND 401 that uses an MSMP antenna system 400. For sake of clarity, and without limitation, the embodiment of the MR-WND 401 has one radio with four RF chains 432. The MSMP antenna system 400 comprises an MSMP antenna 410 and an interface matrix 420, with the MSMP antenna consisting of four planar antenna segments 414. Somebody skilled in the art can easily extend the embodiment of the MR-WND 401 having a single radio 430 to different number of radios, RF chains, MSMP antennas, planar antennas per MSMP antenna, etc. In the example illustrated in FIG. 4, the MSMP antenna 410 consists of four distinct planar antenna segments 414. Each planar antenna segment 414 is fabricated on a separate printed circuit board (PCB). The planar antenna segments 414 can also be designed to have a low reflection coefficient in a given operating frequency band and a high reflection coefficient outside the band. As will be shown, this becomes an important enabler for multi-radio operations.

Figure 5A:
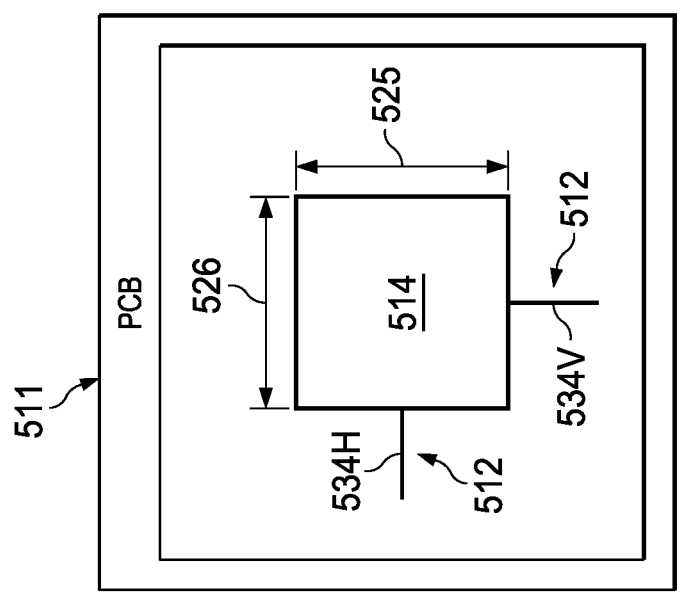
FIGS. 5A-5B show aspects of an example of a dual linear polarization microstrip patch antenna.
Figure 5B:
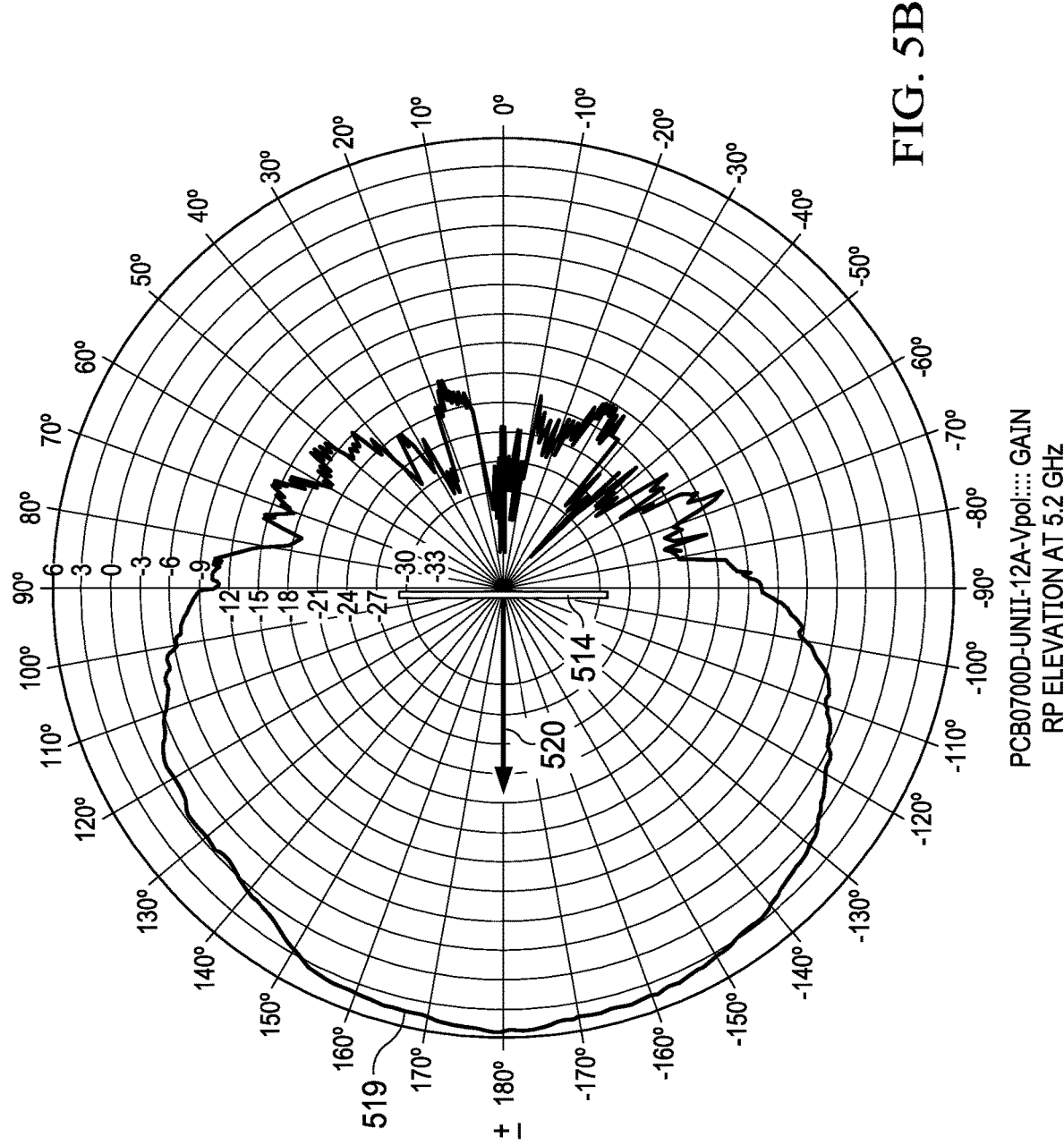

FIG. 5A shows an example of a planar antenna segment 414 implemented here as a dual linear polarization micro strip patch antenna 514 fabricated on a PCB 511. FIG. 5B shows an intensity distribution 519 of a fixed directional beam that is emitted by the microstrip patch antenna 514 in the direction normal 520 of the patch antenna 514's plane. Here, the fixed directional beam has a 3-dB beamwidth of approximately 90 degrees (the actual beamwidth depends on the ground plane dimensions). By tuning its width 525 and length 526, the patch antenna 514 can be designed to have a low reflection coefficient in a given operating frequency band and a high reflection coefficient outside the band. The dual linear polarization microstrip patch antenna 514 has two antenna feeds, and the two feeds 534H, 534V together constitute the planar antenna segment port 512. By appropriately connecting the antenna feeds 534H, 534V to the patch antenna, the single patch antenna 514 can simultaneously radiate two different RF signals with vertical and horizontal polarization.

Multiple microstrip patch antennas 514 can also be fabricated on a single PCB so as to construct multiple MSMP antennas for a MR-WND. Another example of a planar antenna segment that can be employed in this manner is a stacked patch antenna. In all the considered arrangements, the multiple planar antenna segments of the MSMP antenna are oriented on non-parallel planes. That is, the normal 520 to each planar antenna segment is oriented in a different direction. Therefore, RF signals coupled to different ports of the MSMP antenna will simultaneously radiate with different beams having different directions.

Referring now to FIGS. 4 and 5A, the interface matrix 420 provides means to interconnect the different RF chains 432 of the radio 430 to one or more antenna feeds 534H, 534V of the planar antenna segments 414, 514. The interface matrix 420 can further include means to dynamically reconfigure the interconnections between the multiple RF radio chains 432 and the multiple antenna ports 512. In generality, the interface matrix 420 can be configured to allow each RF chain 432 to be coupled to none, one or multiple planar antenna segments 414, 514 of the MSMP antenna 410. In the result, by appropriately designing the geometry of the planar antenna segments 414, 514 of the MSMP antenna 410 and selectively interconnecting RF chains 432 of the radio 430 to the antenna feeds 534H, 534V on the planar antenna segments 414, 514, it is possible to achieve multiple well-controlled coverage areas for the radio 430 with the same MSMP antenna 410. The interface matrix 420 in this arrangement can also implement the further function and means to reject or improve the rejection of signals outside a given band. RF filters, which are devices providing low insertion loss in a given RF band (the RF band may consist of contiguous or non-contiguous RF spectrum) and high signal rejection outside this band, will be often used in the following exemplary embodiment as a mean to provide this function in the interface matrix 420.

Figure 6:
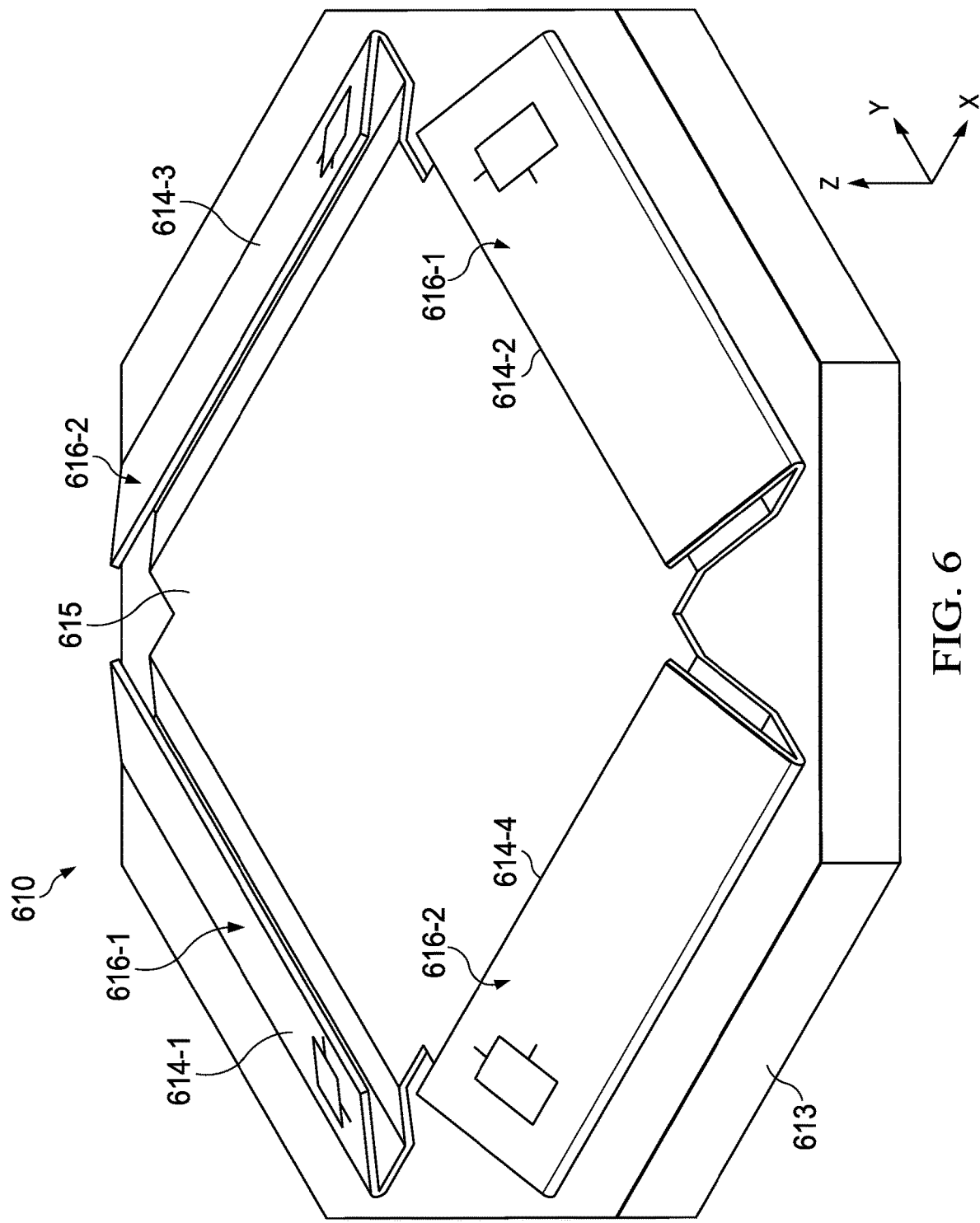
FIGS. 6-7 show aspects of an embodiment of an MSMP antenna which includes four planar antenna segments, each of which implemented as single dual linear polarization microstrip patch antenna.
Figure 7:
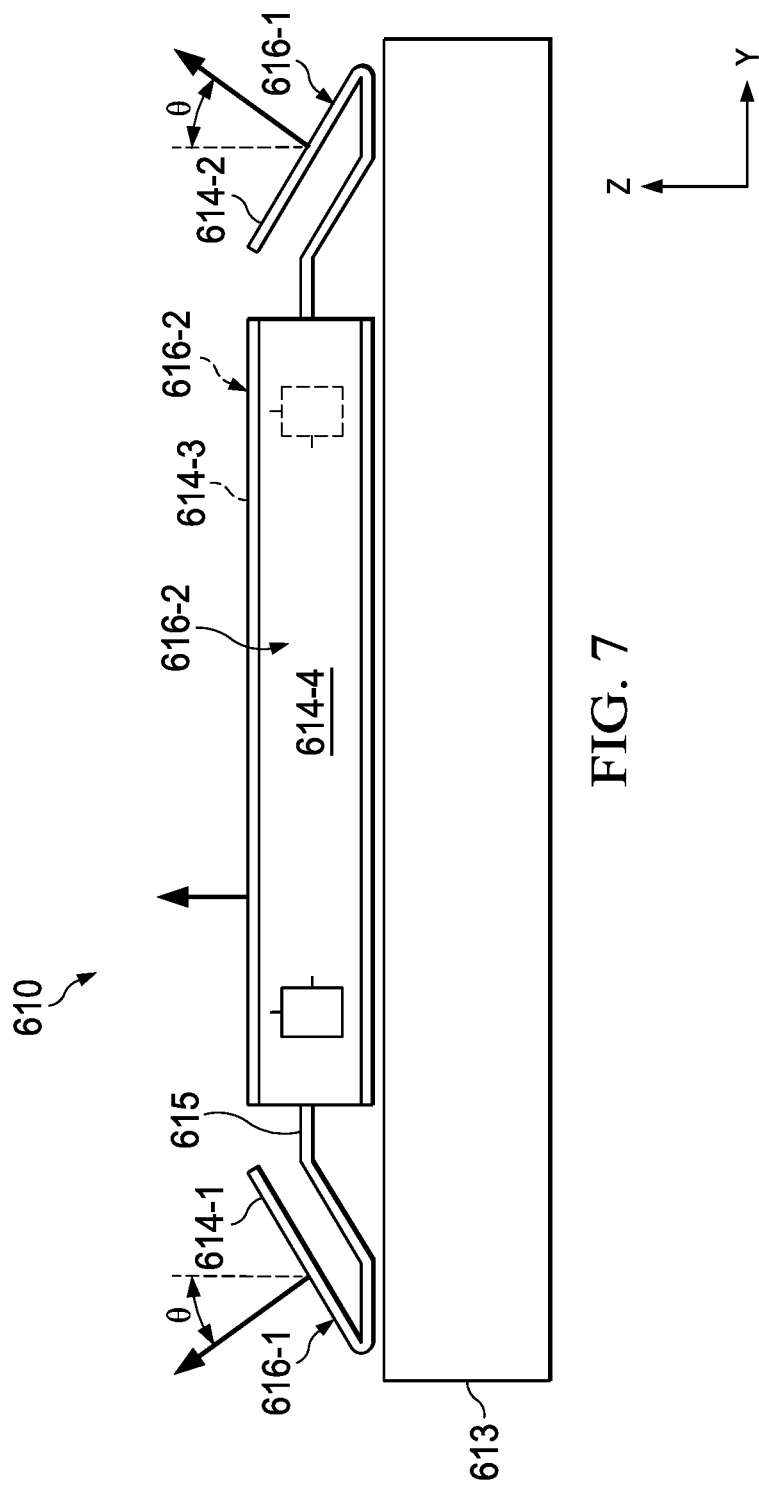

FIG. 6 is a perspective view, and FIG. 7 is a side view into the (y,z)-plane, of an embodiment of an MSMP antenna 610 configured as a geometrical circuit arrangement comprising four planar antenna segments 614-1, 614-2, 614-3, 614-4, each of which implemented as the dual linear polarization microstrip patch antenna 514 of FIG. 5. Note that the side view into the (x,z)-plane of the MSMP antenna 610 is similar to the one illustrated in FIG. 7. The MSMP antenna 610 is supported on a chassis 613 (which can be the housing of the MR-WND 401, for instance) and includes a base 615 and the four planar antenna segments 614-1, 614-2, 614-3, 614-4. In the example illustrated in FIGS. 6-7, the base 615 has a surface parallel to the (x,y)-plane that represents a reference plane for the geometrical circuit arrangement of the MSMP antenna 610. The four planar antenna segments 614-1, 614-2, 614-3, 614-4 are assembled on the base 615 as illustrated in FIGS. 6-7. A first pair 616-1 of two planar antenna segments 614-1, 614-2 are arranged such that their respective normals have the same angle θ with a reference plane normal (the XY plane). For the case where the planar antenna segments are microstrip patch antennas, a range of values for angle θ is 10° to 40°, with a preferred value for this angle being θ=30°. Furthermore, a first plane (the YZ plane) defined by the normals of the first pair 616-1 of two planar antenna segments 614-1, 614-2 is orthogonal to the reference plane 613 (the XY plane). A second pair 616-2 of two planar antenna segments 614-3, 614-4 are arranged such that their respective normal has the same angle θ with a reference plane (the XY plane) as the first two planar antenna segments 614-1, 614-2. Furthermore, the second plane (the XZ plane) defined by the normals of the second pair 616-2 of two planar antenna segments 614-3, 614-4 is orthogonal to the reference plane (the XY plane), and is orthogonal to the first plane (the YZ plane) defined by the normals of the first pair 616-1 of two planar antenna segments 614-1, 614-2. FIG. 5 furthers shows that the respective horizontal (or vertical, as the case may be) antenna feeds 534H, 534V of the different antenna segments 614-1, 614-2, 614-3, 614-4 are co-aligned. This arrangement is preferable in the embodiment 610, as symmetry of the resulting composite RF pattern from the antenna system 400 is desirable in this embodiment, but for generality the antenna feeds 534H, 534V of the different antenna segments 614-1, 614-2, 614-3, 614-4 need not be so aligned.

Figure 8:
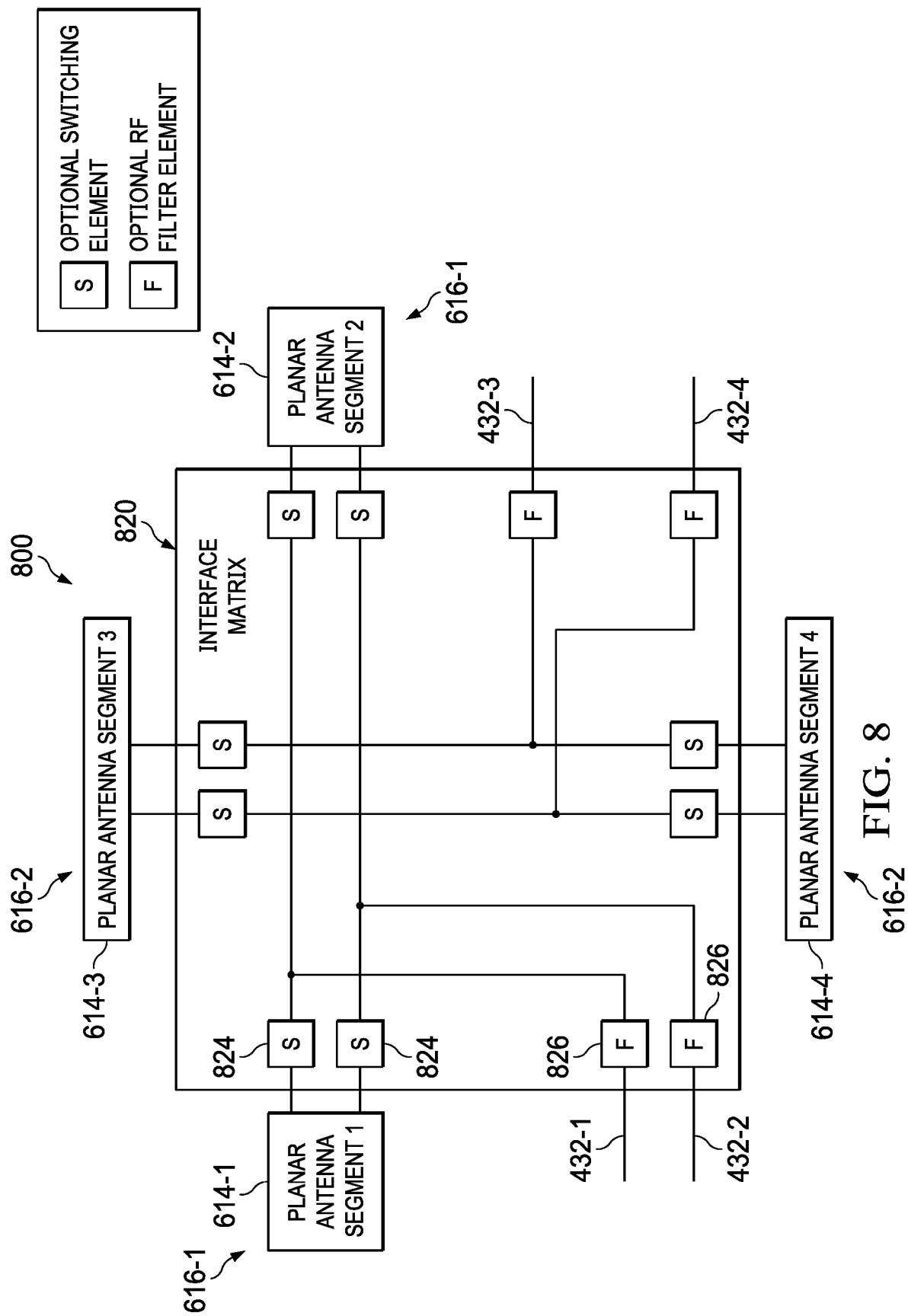
FIG. 8 is a diagram of an MSMP antenna system which includes an interface matrix and a four-segment multi-port antenna, where the interface matrix connects four RF chains of a radio to the four antenna segments using a configurable interconnecting arrangement.

FIG. 8 is a diagram of an MSMP antenna system 800 comprising an interface matrix 820 between the four RF chains 432-1, 432-2, 432-3, 432-4 of the radio 430 and the eight antenna feeds of the four antenna segments 614-1, 614-2, 614-3, 614-4 of the MSMP antenna 610 illustrated in FIG. 6 and FIG. 7. A first RF chain 432-1 of the radio 430 is interconnected through the interface matrix 820 to a first antenna feed 534H, 534V on a first planar antenna segment 614-1 of the first pair 616-1 of two opposite planar antenna segments 614-1, 614-2 and to a first antenna feed 534V, 534H on a second planar antenna segment 614-2 of the first pair 616-1 of two opposite planar antenna segments 614-1, 614-2. Therefore, the RF signal from the first RF chain 432-1 will radiate with different beams in different directions from both planar antenna segments 614-1, 614-2. Note that the two antenna feeds 534H, 534V, one to each of the opposite planar antenna segments 614-1, 614-2, can be selected such that they radiate the same signal with either the same or different polarization. A second RF chain 432-2 of the radio 430 is interconnected in a similar manner through the interface matrix 820 to each of the two ports 512 of the first pair 616-1 of two planar antenna segments 614-1, 614-2, but to antenna feeds other than the antenna feeds 534H, 534V interconnected to the first RF chain 432-1. A third and fourth RF chains 432-3, 432-4 of the radio 430 are interconnected through the interface matrix 820 to the second pair 616-2 of two planar antenna segments 614-3, 614-4 in a similar manner as the first and second RF chains 432-1, 432-2.

The interface matrix 820 can further include switching elements (S) 824 to dynamically and independently interconnect or disconnect each RF chain 432-1, 432-2, 432-3, 432-4 to each of the antenna feeds 534H, 534V. The interface matrix 820 then enables the reconfiguration of the radio coverage area, including its direction and width. The state of the switching elements 824 is dynamically configured via the interface matrix control signals 422. The interface matrix 820 can also include inline RF filters (F) 826 to further reject signals outside the desired operating frequency band.

Figure 9:
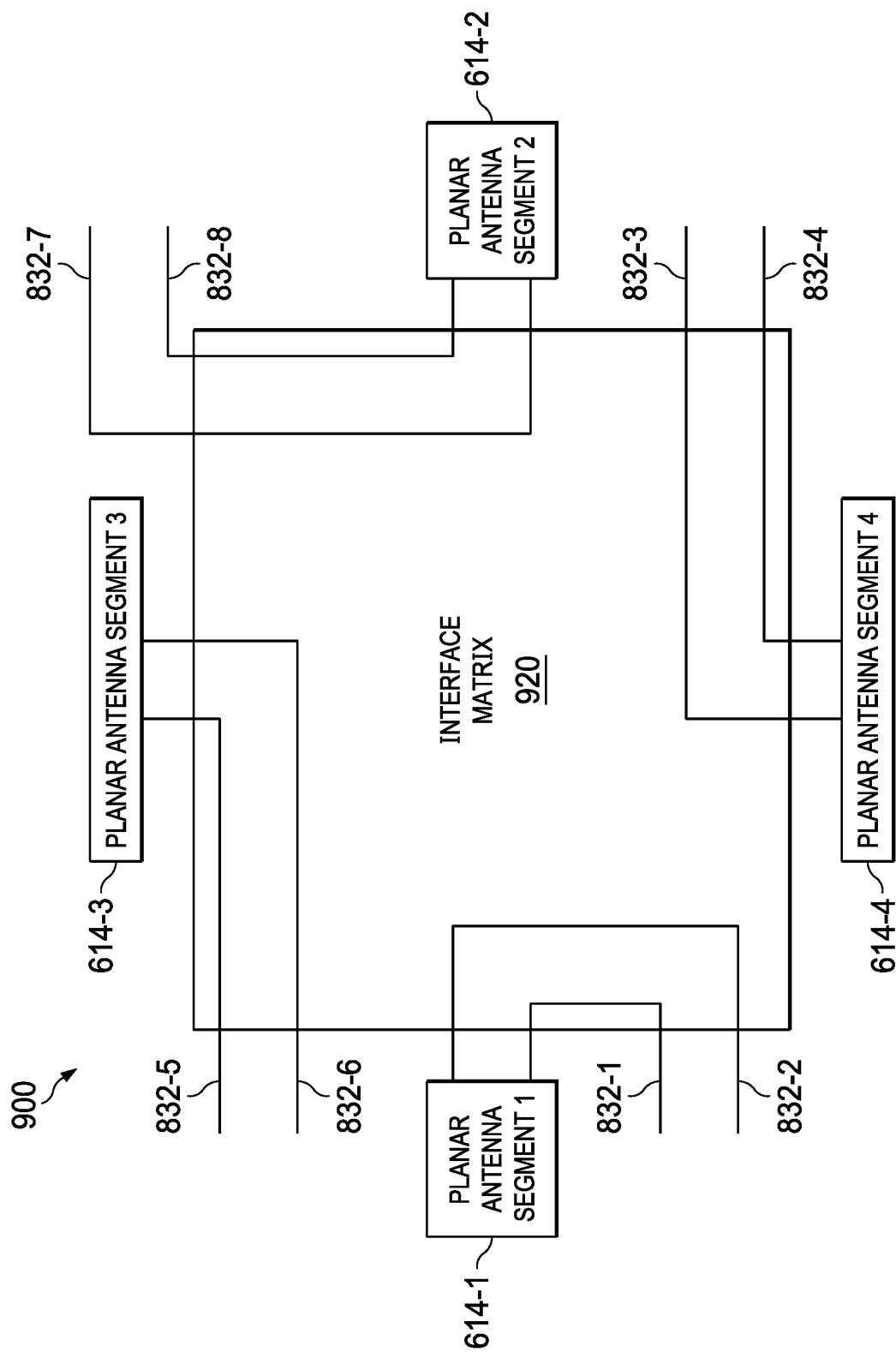
FIG. 9 is a diagram of an MSMP antenna system which includes an interface matrix and a four-segment multi-port antenna, where the interface matrix connects eight RF chains of a radio to the four antenna segments using a fixed interconnecting arrangement.

One skilled in the art can easily extend this exemplary embodiment of antenna system 800 to be used with radios with a smaller or larger number of RF chains. FIG. 9 is a diagram of an MSMP antenna system 900 comprising an interface matrix 920 between eight RF chains 832-1, . . . , 832-8 of a radio and the eight antenna feeds of the four planar antenna segments 614-1, 614-2, 614-3, 614-4 of the MSMP antenna 610 illustrated in FIG. 6 and FIG. 7. The eight antenna feeds of the MSMP antenna 610 can be interconnected with the eight RF chains 832-1, . . . , 832-8 of the radio using a fixed arrangement of the interface matrix 920, as illustrated in FIG. 9. This fixed arrangement of the interface matrix 920 provides all the required features, except providing means through the interface matrix 920 to reconfigure the coverage area.

Figure 10:
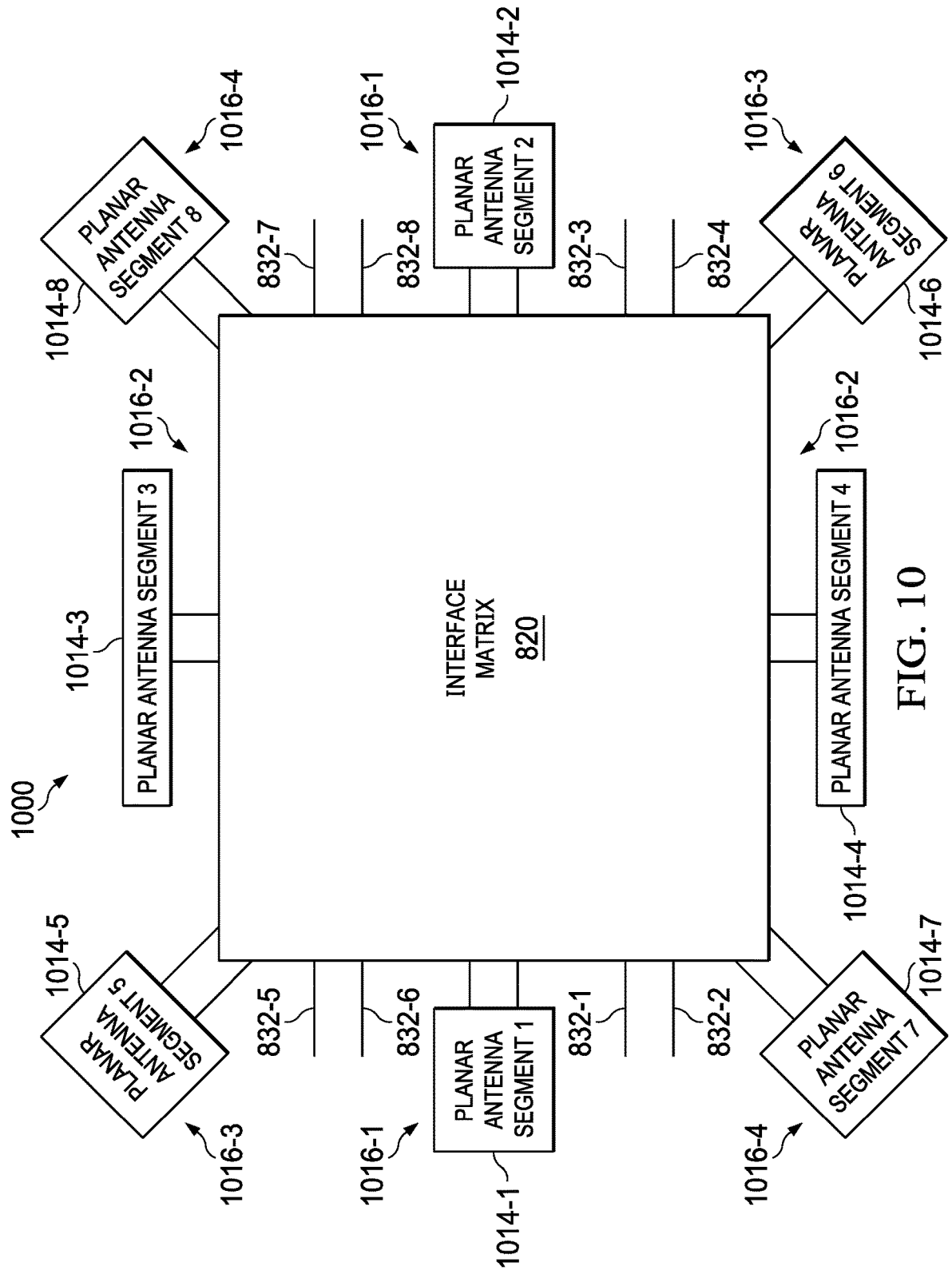
FIG. 10 is a diagram of an MSMP antenna system which includes an interface matrix and an eight-segment multi-port antenna, where the interface matrix connects eight RF chains of a radio to the eight antenna segments using either a fixed or a configurable interconnecting arrangement.

FIG. 10 is a diagram of an MSMP antenna system 1000 comprising an interface matrix 1020 between eight RF chains 832-1, . . . , 832-8 of a radio and sixteen antenna feeds of eight planar antenna segments 1014-1, . . . , 1014-8 of an MSMP antenna. The eight-segment multi-port antenna, having planar antenna segments 1011-1, . . . , 1014-8, can be interconnected with the eight RF chains 832-1, . . . , 832-8 of the radio using an interface matrix 1020, as shown in FIG. 10. The interconnection between the antenna feeds 534H, 534V and RF chains 832-1, . . . , 832-8 is similar to the arrangement with the radio with four RF chains illustrated in FIG. 8. To be more specific, RF chains 832-1 and 832-2, RF chains 832-3 and 832-4, RF chains 832-5 and 832-6, RF chains 832-7 and 832-8, are respectively interconnected through the interface matrix 1020 to the antenna feeds 534H, 534V of the first, second, third and fourth pair 1016-1, . . . , 1016-4 of planar antenna segments, where first, second, third and fourth pair 1016-1, . . . , 1016-4 of planar antenna segments respectively consist of planar antenna segments 1014-1 and 1014-2, planar antenna segments 1014-3 and 1014-4, planar antenna segments 1014-5 and 1014-6, and planar antenna segments 1014-7 and 1014-8. If the interface matrix 1020 further includes switching elements to dynamically and independently interconnect or disconnect each RF chain 832-1, . . . , 832-8 to each of the antenna feeds 534H, 534V, it then become possible to selectively reconfigure the coverage area, including its profile, direction and width, obtainable by the radio with eight RF chains 832-1, . . . , 832-8.

One can appreciate that by employing similar micro strip patch antennas 514 in the multiple segments, the composite radiated signal level, or coverage pattern of the MSMP antenna system 400, 800, 900, 1000 is substantially axially symmetric and uniform in the entire coverage area. This is a desirable and specifically intended feature and benefit of this arrangement, in order to provide uniform service to a plurality of client devices wherever they are located in the type-1 coverage area.

Other benefits and features of the arrangement of antenna system 400, 800, 900, 1000 are: (1) it is possible to achieve various alternate coverage patterns for the radio varying from an approximately 90×90 degree sector coverage to 160×160 degree sector coverage by selectively interconnecting the RF chains to the antenna feeds in the interface matrix 420, 820, 920, 1020; (2) the achievable radiation patterns have maximum gain in front of the MR-WND 401 (along the Z axis) and minimize the signal propagation of signal close or beyond the reference plane (XY plane). This minimizes, as intended, the interference leakage to adjacent wireless network devices and client devices outside the intended service area that may be using the same RF channel; (3) everywhere in the coverage area of the radio, there are always two signals emanating on different beams with orthogonal polarization. This is a desired feature to provide efficient MIMO communication links with two spatial streams in a LOS/quasi-LOS setting; (4) different RF signals are radiated in different directions (e.g., the RF signals from the first and second RF chains 432-1, 432-2 radiate in substantially different directions as the RF signals from the third and fourth RF chains 432-3, 432-4). This provides additional signal discrimination that further enhance the performance of MU-MIMO communications; (5) the MSMP antenna system 400, 800, 900, 1000 has a low profile and can be integrated in a wireless network device 401 with aesthetic design; and (6) as we will explain below, the MSMP antenna system 400, 800, 900, 1000 is suitable for the integration of multiple radios in MR-WND. One can thus appreciate the significant benefits provided by the disclosed MSMP antenna system 400, 800, 900, 1000 over state-of-the-art antenna systems.

We further recognize, in the second step of the first approach for the design of an antenna system for UHD with wide type-1 coverage, the several characteristics possessed by the MSMP antenna system 400, 800, 900, 1000 that are critical for a multiple radio implementation. First, the planar and multi-segment nature of the MSMP antenna makes it amenable to integrate multiple MSMP antennas in a small form factor wireless network device. Second, the MSMP antenna structure makes is possible to conceive a geometric arrangement with interface matrix that enables the coverage properties identified before. Finally, the MSMP antenna has improved intrinsic signal rejection properties which arise from the compounding effects of (1) the directionality and orthogonality of the beams of the various antenna segments, (2) the purposeful and flexible geometric separation and arrangement of the antenna segments and, (3) the optional use of in-line RF filters, enhances the isolation between multiple radios to enable simultaneous operations of the multiple radios.

Figure 11:
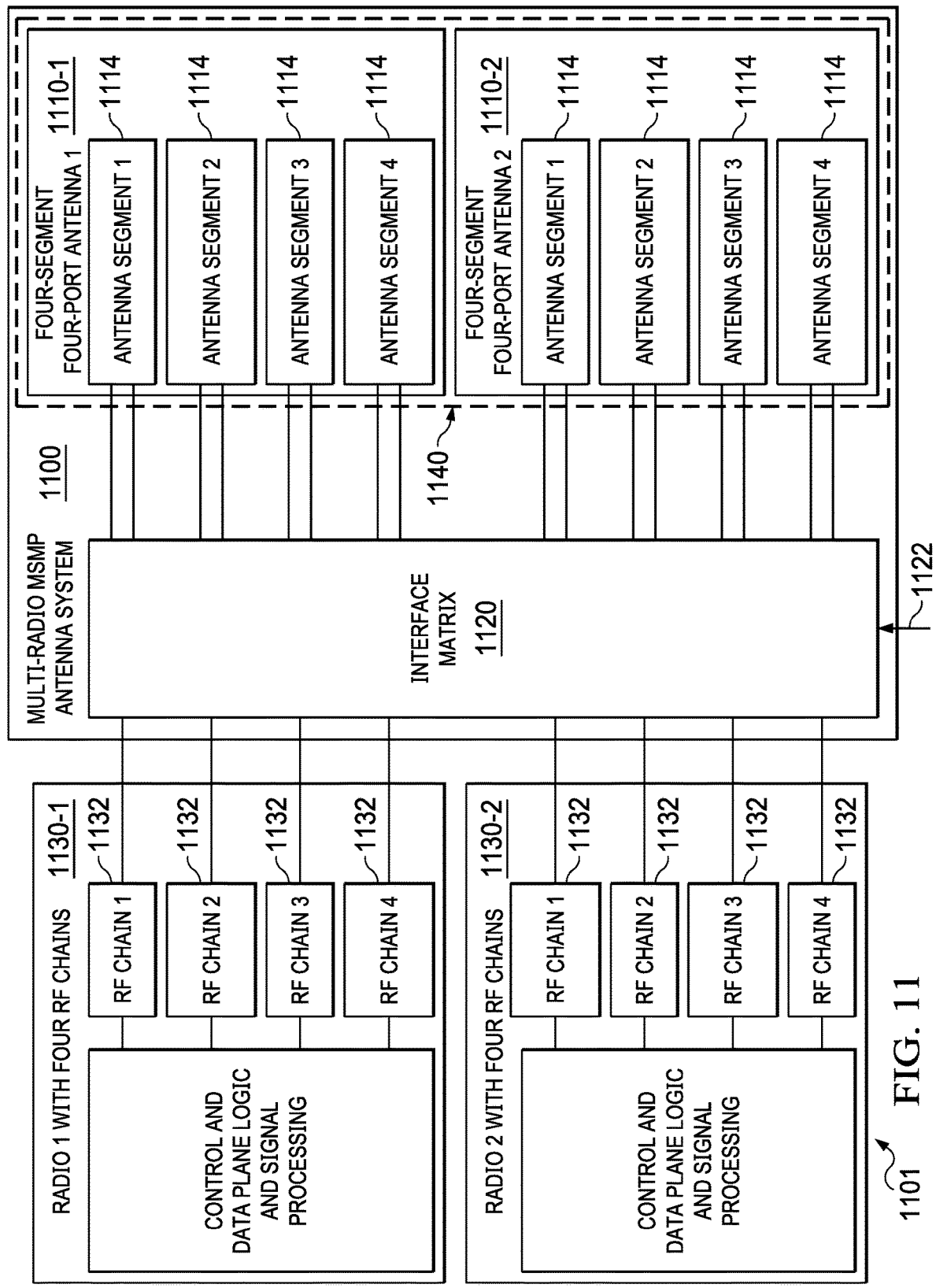
FIG. 11 is a diagram of a multi-radio wireless network device which includes two radios each with four RF chains and an MR-MSMP antenna system that includes two MSMP antennas each with four planar antenna segments.

FIG. 11 is a diagram of an MR-WND 1101 that uses a multi-radio MSMP (MR-MSMP) antenna system 1100. For sake of clarity, the MR-WND 1101 has two radios 1130-1, 1130-2 each with four RF chains 1132. The first radio 1130-1 operates on channels in a first band and the second radio 1130-2 operates on channels in a second band. The two bands are mostly non-overlapping. The MR-MSMP antenna system 1100 comprises an interface matrix 1120 and two MSMP antennas 1110-1, 1110-2 each consisting of four planar antenna segments 1114. In other embodiments, the MR-WND 1101 can have a different number of radios, RF chains, and/or can use a different number of MSMP antennas, planar antenna segments per MSMP antenna, etc. Moreover, the MSMP antennas of the MR-MSMP antenna system 1100 can be assembled in an MR-MSMP antenna assembly 1140 described in detail below in connection with FIGS. 12-13.

For the MR-MSMP antenna system 1100, each MSMP antenna 1110-1, 1110-2 includes four distinct planar antenna segments 1114. The MSMP antennas 1110-1, 1110-2 and their respective set of four planar antenna segments 1114 can be arranged to form an MR-MSMP antenna structure 1140 which will be described in detail below in connection with FIGS. 12-13. Each planar antenna segment 1114 of each MSMP antenna 1110 is fabricated on a separate PCB. Note that as will be described below, planar antenna segments 1114 of different multi-segment multi-port antennas 1110 can be fabricated on the same PCB. Each planar antenna segment 1114 is also designed to have a low reflection coefficient in a desired operating frequency band and a high reflection coefficient outside the band to enhance isolation between RF signals of different radios 1130-1, 1130-2. A reflection coefficient is defined as a ratio of the amplitude of the reflected signal to the amplitude of the incident signal. Here, the low reflection coefficient in the desired operating frequency band is designed to be at least 2 to 3 times smaller than the high reflection coefficient outside the band, when measured for a relative frequency separation of 5% to 10%. The relative frequency separation is defined as $$\frac{|f_L - f_H|}{f_L + f_H} \times 2 \times 100,$$

where $f_L$, is the frequency at which the low reflection coefficient is measured, and $f_H$ is the frequency at which the high reflection coefficient is measured. Note that the high reflection coefficient is typically 0.85 or larger, 0.9 or larger, 0.95 or larger, or 0.99 or larger. Moreover, the planar antenna segments 1114 of each MSMP antenna 1110-1, 1110-2 are on non-parallel planes. That is, the normal to each planar antenna segment 1114 belonging to the same MSMP antenna 1110-1 or 1110-2 is oriented in a different direction. Therefore, RF signals coupled to different ports of a MSMP antenna 1110-1 or 1110-2 will simultaneously radiate with different beams having different directions.

In general, there are no constraints on the mutual geometric arrangement of the different MSMP antennas 1110-1, 1110-2 in the MR-MSMP antenna structure 1140 of the MR-MSMP antenna system 1100. That is, none, some or all antenna segments 1114 belonging to a different MSMP antenna, e.g., 1110-1, can be parallel to an antenna segment 1114 belonging to a different MSMP antenna, e.g., 1110-2. In a particular arrangement, each antenna segment 1114 of the first MSMP antenna 1110-1 interconnected to the first radio 1130-1's RF chains 1132 is in a plane parallel to the plane of one and only one planar antenna segment 1114 of the second MSMP antenna 1110-2 interconnected to the second radio 1130-2's RF chains 1132 (that is, both planar antenna segment normal are oriented in the same direction). This arrangement leads to several advantages. First, parallel planar antenna segments 1114 of the different MSMP antennas 1110-1 and 1110-2 can be fabricated on a single PCB, leading to lower cost and smaller size. Second, it becomes possible, to conceive and configure an interface matrix 1120 to have coverage area for each radio ranging from mutually fully overlapping to non-overlapping.

The interface matrix 1120 of the MR-MSMP antenna system 1100 provides means to interconnect the different RF chains 1132 of the multiple radios 1130-1, 1130-2 to one or more antenna feeds of the planar antenna segments 1114 of the MSMP antennas 1110-1, 1110-2. The interface matrix 1120 can further include means to dynamically reconfigure the interconnections. By appropriately designing the geometry of the planar antenna segments 1114 and selectively interconnecting RF chains 1132 of each radio 1130-1, 1130-2 to the antenna feeds on the planar antenna segments 1114, it is possible to independently achieve multiple well-controlled coverage area for each radio 1130-1, 1130-2 with the same MR-MSMP antenna system 1100. The interface matrix 1120 can also include means to reject signals outside a given band such as RF filters.

Figure 12:
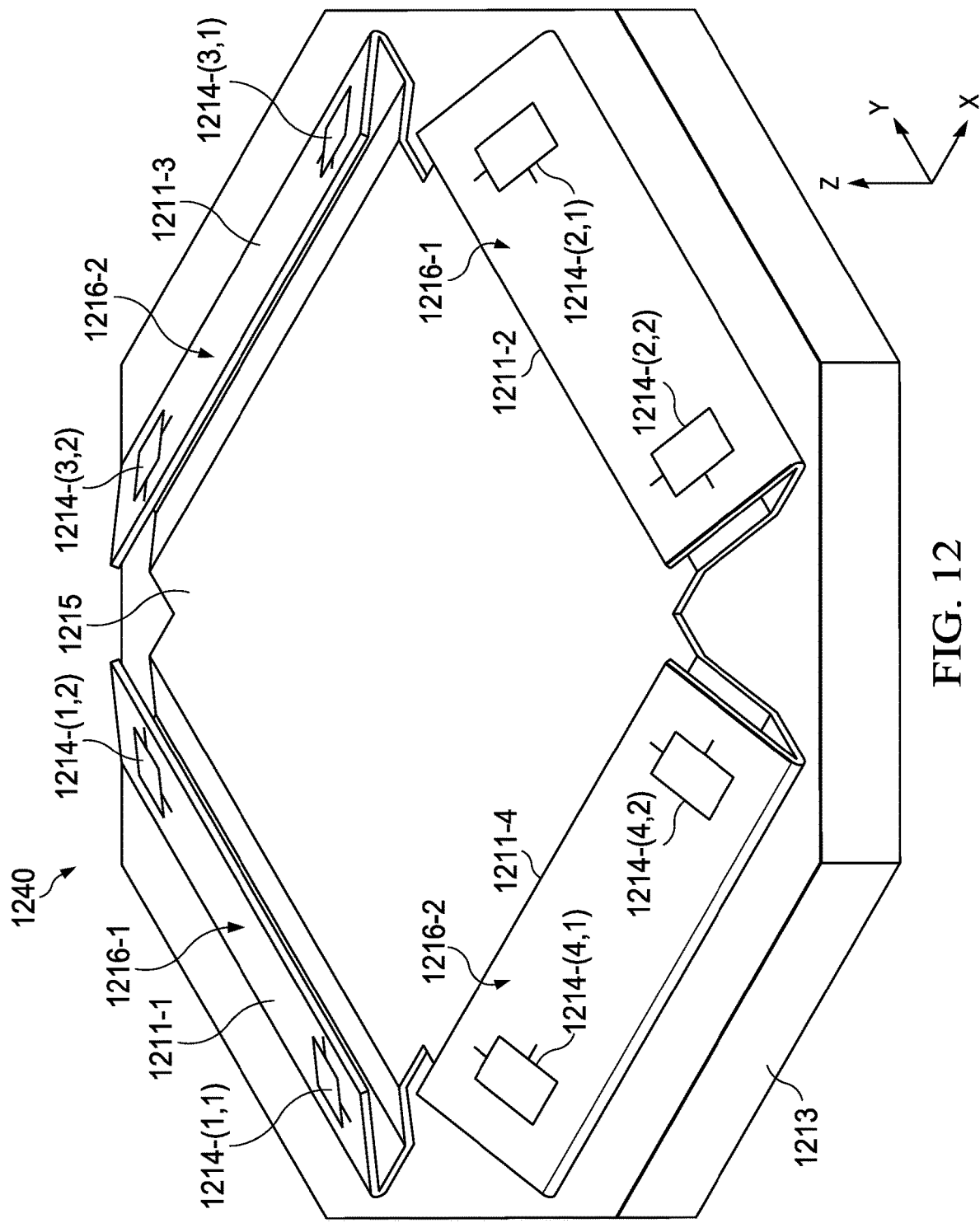
FIGS. 12-13 show aspects of an embodiment of an MR-MSMP antenna structure which includes two MSMP antennas each with four planar antenna segments, each of which implemented as single dual linear polarization microstrip patch antenna.
Figure 13:
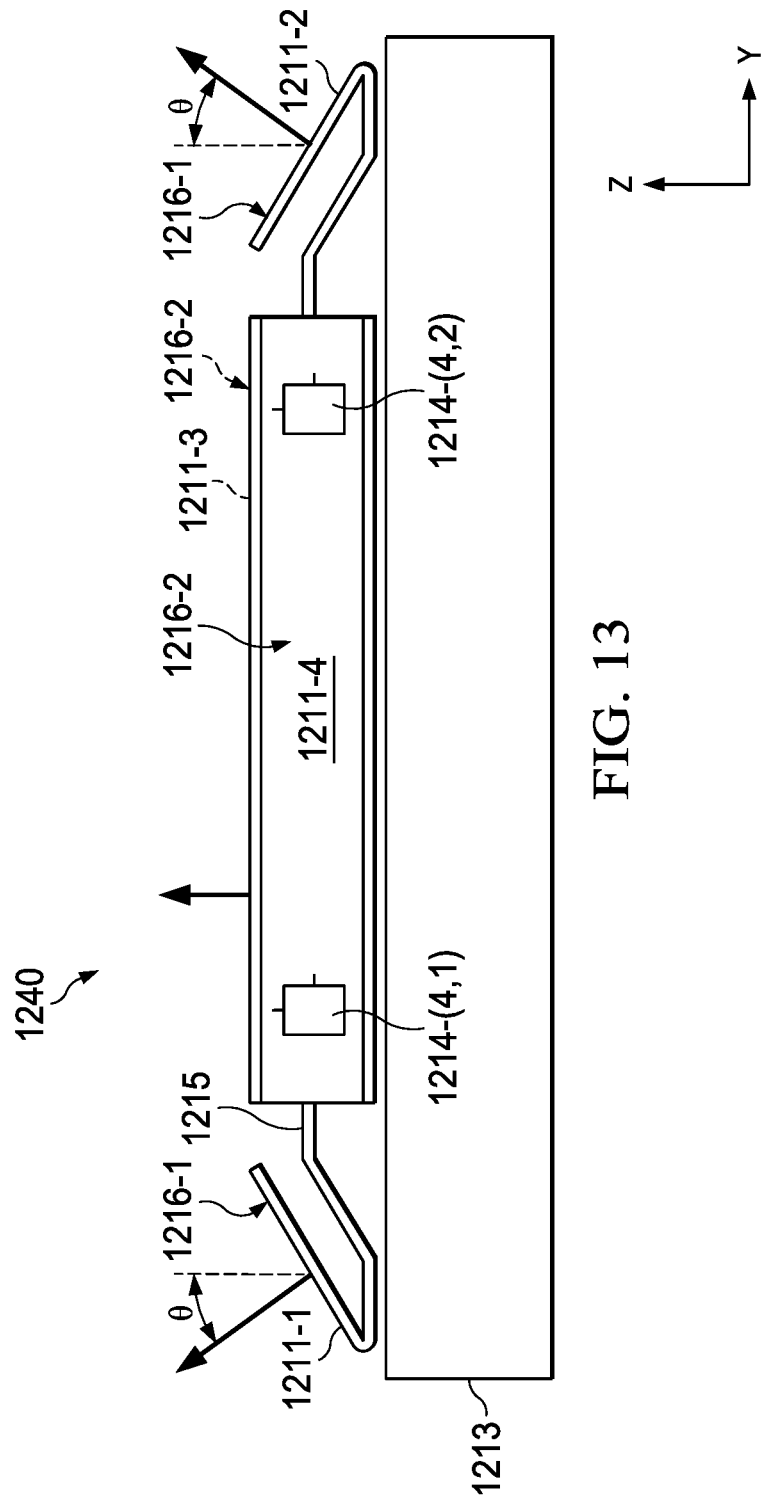

FIG. 12 is a perspective view, and FIG. 13 is a side view into the (y,z)-plane, of an MR-MSMP antenna structure 1240 which includes a base 1215 and a particular circuit arrangement of the two MSMP antennas 1110-1, 1110-2, each with four planar antenna segments 1214, where there are parallel antenna segments from each of the MSMP antennas fabricated on the same PCB 1211. That is, the MR-MSMP antenna structure 1240 comprises four PCBs 1211 and each PCB 1211-$j$ comprises one planar antenna segment 1214-($j$,1) of the first MSMP antenna 1110-1 and one planar antenna segment 1214-($j$,2) of the second MSMP antenna 1110-2, where j=1, 2, 3, 4. The MR-MSMP antenna structure 1240 is supported by a chassis 1213 (which can be the housing of the MR-WND 1101, for instance). In the example illustrated in FIGS. 12-13, the four PCBs 1211 are assembled on the base 1215, which has a surface parallel to the (x,y)-plane that represents a reference plane for the MR-MSMP antenna structure 1240. Here, the chassis 1215 and the four PCBs 1211 are integrally formed. The four planar antenna segments 1214-(1,1), 1214-(2,1), 1214-(3,1), 1214-(4,1) of the first MSMP antenna 1110-1 are tuned to have a low reflection coefficient in the operating band of the first radio and high reflection coefficient outside the band. Similarly, the four planar antenna segments 1214-(1,2), 1214-(2,2), 1214-(3,2), 1214-(4,2) of the second MSMP antenna 1110-2 are tuned to have a low reflection coefficient in the operating band of the second radio and high reflection coefficient outside the band.

A first pair 1216-1 of two PCB's (PCB 1211-1 and PCB 1211-2) are arranged such that their respective normal has the same angle $\theta$ with the reference plane normal (the XY plane). For the case where the planar antenna segments 1214 of the MSMP antennas 1110-1, 1110-2 are microstrip patch antennas (like 514), a range of values for angle $\theta$ is 10° to 40°, with a preferred value for this angle being $\theta$=30°. Further, a first plane (the YZ plane) defined by the two normals of the first pair 1216-1 of two PCBs 1211-1, 1211-2 is orthogonal to the reference plane (the XY plane). A second pair 1216-2 of two PCBs (PCB 1211-3 and PCB 1211-4) are arranged such that their respective normal has the same angle $\theta$ with a reference plane (the XY plane) as the first pair of two PCB's 1211-1, 1211-2. Further, the second plane (the XZ plane) defined by the two normals of the second pair 1216-2 of two PCBs 1211-3, 1211-4 is orthogonal to the reference plane (the XY plane), and is orthogonal to the first plane (the YZ plane) defined by the two normals of the first pair 1216-1 of two PCB's 1211-1, 1211-2.

Figure 14:
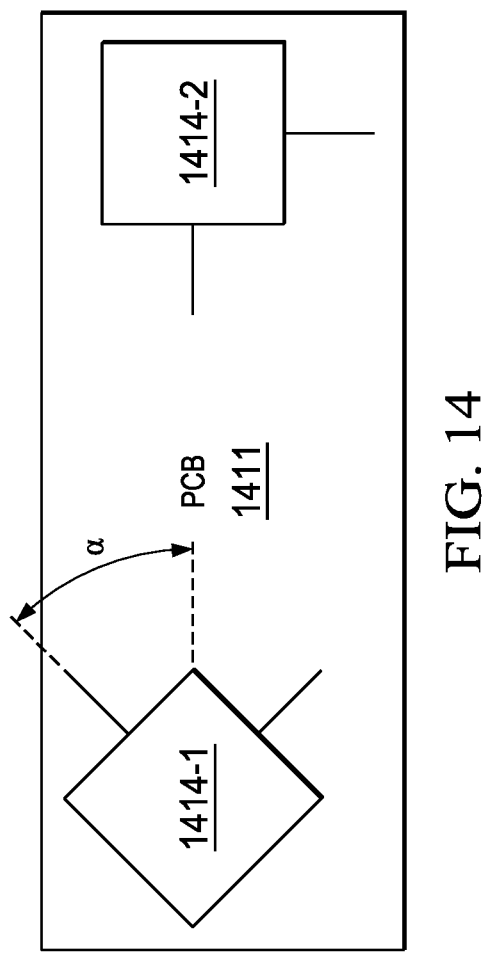
FIG. 14 shows an example of an arrangement on a PCB of two planar antenna segments, each of which implemented as single dual linear polarization microstrip patch antenna, of respective two MSMP antennas.

In the case of this particular arrangement of the MR-MSMP antenna structure 1240, to further reduce coupling between the MSMP antennas 1110-1, 1110-2 and improve the isolation between radios 1130-1, 1130-2, it is preferable to alternate the planar antenna segments 1214 order on each adjacent PCB 1211 such that two planar antenna segments 1214 on the same corner are interconnected to RF chains belonging to a same radio 1130. This configuration is illustrated in FIG. 12. Further, FIG. 14 shows a PCB 1411 which supports a planar antenna segment 1414-1 of the first MSMP antenna 1110-1 and a planar antenna segment 1414-2 of the second MSMP antenna 1110-2. The orientation of the planar antenna segments 1414-1, 1414-2 on the PCB 1411 can be optimized to decrease the coupling between the MSMP antennas 1110-1, 1110-2 when the PCBs 1211-1, ..., 1211-4 of the MR-MSMP antenna structure 1240 are implemented as the PCB 1411. For example, a slant angle $\alpha$ in a range of 30° to 60°, with a preferred value $\alpha$=45°, can be used between the two planar antenna segments 1414-1, 1414-2 on the PCB 1411, as illustrated in FIG. 14.

Figure 15:
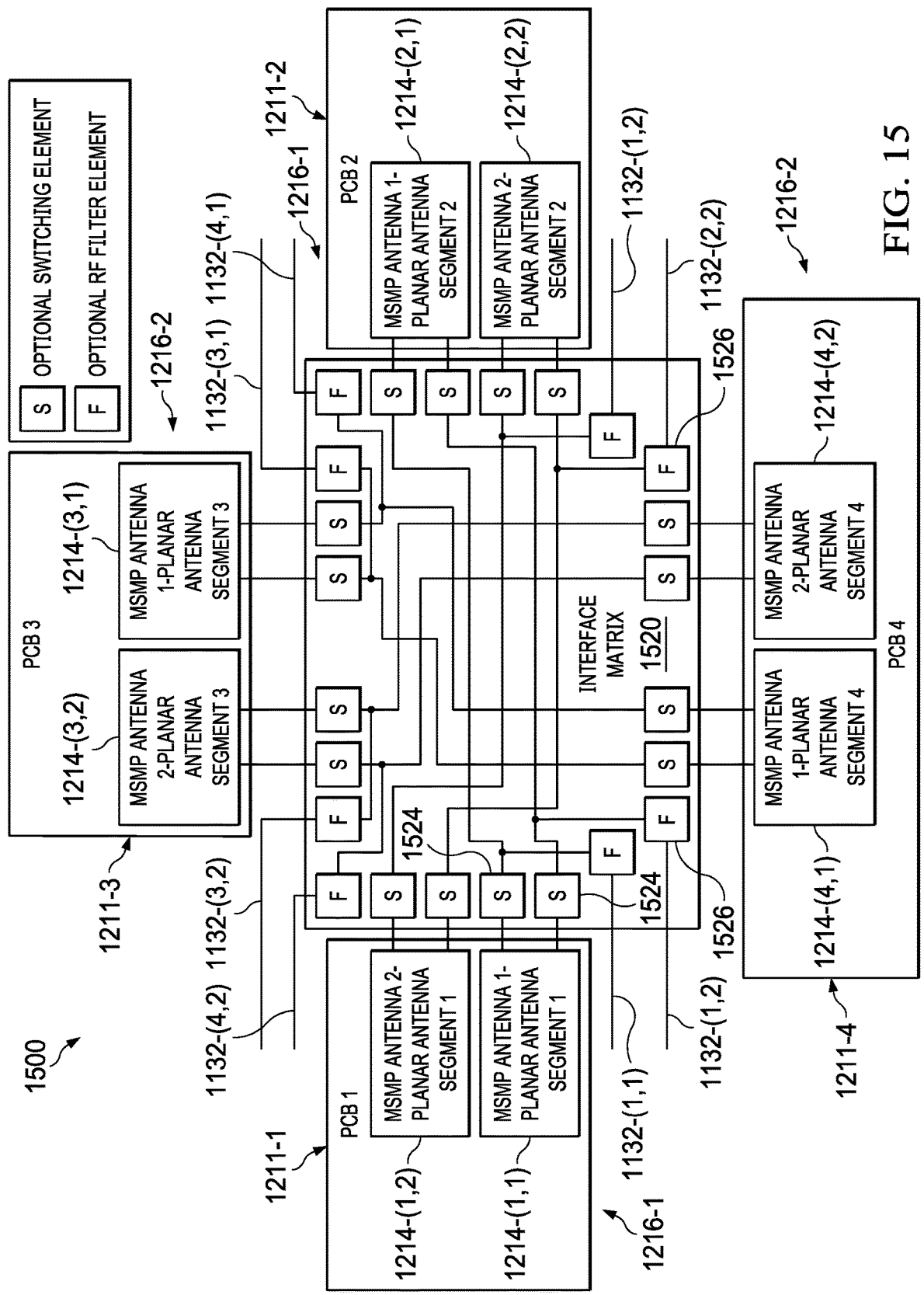
FIG. 15 is a diagram of an MR-MSMP antenna system which includes an interface matrix and two MSMP antennas each having four planar antenna segments, where the interface matrix connects four RF chains from each of two radios to the respective four antenna segments of the MSMP antennas using a configurable interconnecting arrangement.

FIG. 15 is a diagram of an MR-MSMP antenna system 1500 comprising an interface matrix 1520 between the eight RF chains 1132-($k,i$) of the two radios 1130-$i$ and the sixteen antenna feeds of the two MSMP antennas 1110-$i$ arranged in the MR-MSMP antenna structure 1240 illustrated in FIG. 12 and FIG. 13, where i=1, 2 is a radio/MSMP antenna index, j=1, 2, 3, 4 is a PCB/planar antenna segment index, and k=1, 2, 3, 4 is a RF chain index.

A first RF chain 1132-(1,1) of the first radio 1130-1 is interconnected through the interface matrix 1520 to a first antenna feed 534H, 534V of a first planar antenna segment 1214-(1,1) of a first MSMP antenna 1110-1 fabricated on a first PCB 1211-1 of a first pair 1216-1 of two opposite PCBs 1211-1, 1211-2 and to a first antenna feed 534H, 534V of a second planar antenna segment 1214-(2,1) of a first MSMP antenna 1110-1 fabricated on a second PCB 1211-2 of the first pair 1216-1 of two opposite PCBs 1211-1, 1211-2. Therefore, the RF signal from the first RF chain 1132-(1,1) will radiate with different beams in a different direction from both planar antenna segments 1214-(1,1), 1214-(2,1) of the first MSMP antenna 1110-1. Note that the two antenna feeds 534H, 534V can be selected such that they radiate the same signal with different or same polarization. However, to avoid creating a phased array from the planar antenna segments 1214-(1,1), 1214-(2,1) with potential undesirable nulls in the desired coverage area, particularly in a setting where phase control and spacing between the segments cannot easily be accurately controlled, the two antenna feeds 534H, 534V from opposite antenna segments can be selected to radiate the same signal with cross polarization.

A second RF chain 1132-(2,1) of the first radio 1130-1 is interconnected in a similar manner through the interface matrix 1520 to each of the two ports of the same first planar antenna segment 1214-(1,1) of same first MSMP antenna 1110-1 fabricated on same first PCB 1211-1 of same first pair 1216-1 of two opposite PCBs 1211-1, 1211-2 and of the same second planar antenna segment 1214-(2,1) of same first MSMP antenna 1110-1 fabricated on same second PCB 1211-2 of same first pair 1216-1 of two opposite PCBs 1211-1, 1211-2. However, the second RF chain 1132-(2,1) of first radio 1130-1 interconnects to different antenna feeds 534H, 534V than the antenna feeds 534H, 534V interconnected to the first RF chain 1132-(1,1) of first radio 1130-1. A third and fourth RF chains 1132-(3,1), 1132-(4,1) of the same first radio 1130-1 are interconnected through the interface matrix 1520 to the third and fourth planar antenna segments 1214-(3,1), 1214-(4,1) of same first MSMP antenna 1110-1 fabricated on the third and fourth PCBs 1211-3, 1211-4 of the second pair 1216-2 of two opposite PCBs 1211-3, 1211-4 in a similar manner as the first and second RF chains 1132-(1,1), 1132-(2,1) are interconnected to the first and second planar antenna segments 1214-(1,1), 1214-(2,1) of the first MSMP antenna 1110-1 fabricated on the first and second PCBs 1211-1, 1211-2 of the first pair 1216-1 of two opposite PCBs 1211-1, 1211-2.

The interface matrix 1520 of the MR-MSMP antenna system 1500 can further include switching elements 1524 to dynamically and independently interconnect or disconnect each RF chain 1132-($k,i$) of first radio 1130-1 to each of the antenna feeds 534H, 534V of the first MSMP antenna 1110-1. The state of the switching elements is configurable via the interface matrix control signals 1122. The interface matrix can also include inline RF filters 1526 to further reject signals outside the first radio 1130-1's operating frequency band.

The four RF chains 1132-(k,2) from the second radio 1130-2 are interconnected to the four planar antenna segments 1214-(j,2) of the second MSMP antenna 1110-2 in a similar manner as the four RF chains 1132-(k,1) from the first radio 1130-1. For the second radio 1130-2, the interface matrix 1120 can further include switching elements 1524 to dynamically and independently interconnect or disconnect each RF chain 1132-(k,2) of the second radio 1130-2 to each of the antenna feeds 534H, 534V of second MSMP antenna 1110-2. The state of the switching elements 1524 is configurable via the interface matrix control signals 1122. The interface matrix 1520 can also include inline RF filters 1526 to further reject signals outside the operating band of the second radio. The interface matrix 1520 then enables the independent reconfiguration of the first radio 1130-1 and second radio 1130-2 coverage areas, including its profile, direction and width. For example, and without limitations, the coverage areas of the first radio 1130-1 and second radio 1130-2 could be configured in one instance to be substantially similar and in another instance to be mostly non-overlapping.

Referring now to FIGS. 13-14, the MR-MSMP antenna structure 1240 can include more or fewer PCBs 1211 and/or additional planar antenna segments 1214 per PCB. Furthermore, the reference plane between the PCBs 1211 can also be utilized to integrate other antennas 1110 for additional radios 1130. Referring now to FIG. 15, the MR-MSMP antenna system 1500 can be coupled with the same or a greater number of radios 1130 with same or greater number of RF chains. For example, and without limitations, two radios—like the eight RF chain radio to which the MSMP antenna system 900, 1000 communicates— could be used such that two radios with eight RF chains each is coupled with the MR-MSMP antenna system 1500.

One can appreciate that with the MR-MSMP antenna system 1100, 1500, the following benefits and features can be accomplished: (1) it is possible to independently achieve various coverage for each radio varying from an approximately 90×90 degree sector coverage to 160×160 degree sector coverage by selectively interconnecting the RF chains to the antenna feeds in the interface matrix 1120, 1520; (2) the coverage of each radio can be independently configure and can range from fully-overlapping to non-overlapping; (3) the achievable radiation patterns of each radio 1130-i have maximum gain in front of the MR-WND 1101 (along the Z axis) and minimize the signal propagation of signal close or beyond the reference plane (XY plane). This minimizes, as intended, the generated interference to adjacent wireless network devices and client devices using the same channel; (4) everywhere in the coverage area of each radio 1130-i, there is always two signals emanating on different beams with orthogonal polarization. This is a desired feature to provide efficient MIMO communication links with two spatial streams; (5) different RF signals of each radio 1130-i are radiated in different directions (e.g., the RF signals from the first and second RF chains 1132-(1,i), 1132-(2,i) radiate in substantially different directions as the RF signals from the third and fourth RF chains 1132-(3,i), 1132-(4,i)). This provides additional signal discrimination that further enhance the performance of MU-MIMO communications; (6) the antenna system 1100, 1500 provides several means to isolate the radios 1130-i (signal rejection antenna tuning, directionality, geometric arrangement, RF filtering) to enable concurrent multi-radio operation; and (7) the antenna system for the multiple radios 1130-i has a low profile and can be integrated in a wireless network device 1101 with an aesthetic design and form factor that is low profile. For instance, the MR-MSMP antenna structure 1240 that includes two MSMP antennas 1110-1, 1110-2, as shown in FIGS. 12 and 13, has an approximate length of 20 cm, width of 20 cm, and height of 1.6 cm when designed for two radios 1130-1, 1130-2 operating in the 5 GHz unlicensed band. One can thus appreciate the multiple significant and unique benefits provided by the disclosed MR-MSMP antenna system 1100, 1500 over state-of-the-art systems.

The MR-MSMP antenna system 1100, 1500 efficiently resolves the problem of providing efficient MIMO and MU-MIMO communications in UHD environments where wide type-1 coverage area is required and enable dynamic coverage and interference management. However, it doesn't provide sufficient antenna gain and directivity for type-2 UHD deployment scenarios noted earlier, where a MR-WND is located at a farther distance from client devices (e.g., 100+ feet distance). For the second approach we disclose in a first step an antenna system comprising a high gain high directivity Multi-Port Array (MPA) antenna and an interface matrix.

Figure 16:
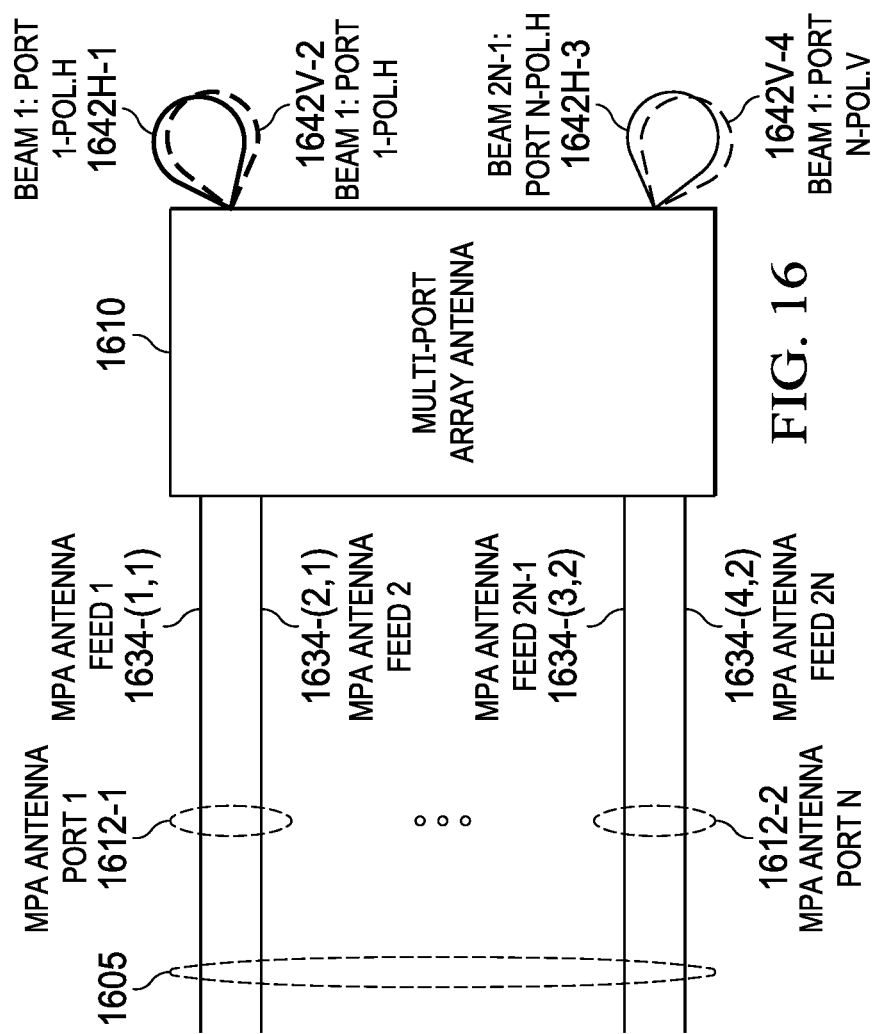
FIG. 16 is a diagram of an example of a multi-port array (MSA) antenna.

FIG. 16 illustrates the concept of an MPA antenna 1610. The MPA antenna 1610 comprises at least one antenna port 1612-1, . . . , 1612-N, where each antenna port comprises two separate and discrete MPA antenna feeds 1634. Each discrete MPA antenna feed 1634 can be connected, through the interface matrix, to RF chains of a radio comprising multiple RF chains. Each RF chain transmits/receives a RF signal 1605. Generally, a RF chain can be interconnected to none, one or more than one MPA antenna feed 1634 and a MPA antenna feed 1634 can be connected to none, one or more than one RF chain. RF signals 1605 coupled to the two separate and discrete RF antenna feeds 1634 of an antenna port 1612-j are both radiated by the MPA antenna 1610 giving dual directional beams 1642H, 1642V having substantially similar radiation patterns but with orthogonal polarization, where j=1 . . . N.

We refer to these dual beams 1642H, 1642V associated with the two antenna feeds 1634 of an MPA antenna port 1612-j as the vertical polarization beam 1642V and horizontal polarization beam 1642H of the antenna port 1612-j. Similarly, different ports of the MPA antenna radiate dual directional beams but in substantially different directions than from other MPA antenna ports. Finally, RF signals 1605 coupled to two different ports 1612-j of the MPA antenna 1610 are simultaneously radiated by the MPA antenna according to the dual directional beams 1642H, 1642V of each port to which the RF signals are coupled. For example, RF signals 1605 coupled to antenna feed 1634-(1,1) and 1634-(2,1) of antenna port 1612-1, and RF signals 1605 coupled to antenna feed 1634-(3,2) and 1634-(4,2) of antenna port 1612-2 will be simultaneously radiated according to beam 1642H-1 (port 1612-1—horizontal polarization), beam 1642V-2 (port 1612-1—vertical polarization), beam 1642H-3 (port 1612-2—horizontal polarization), and beam 1642V-4 (port 1612-2—vertical polarization), respectively.

Figure 17:
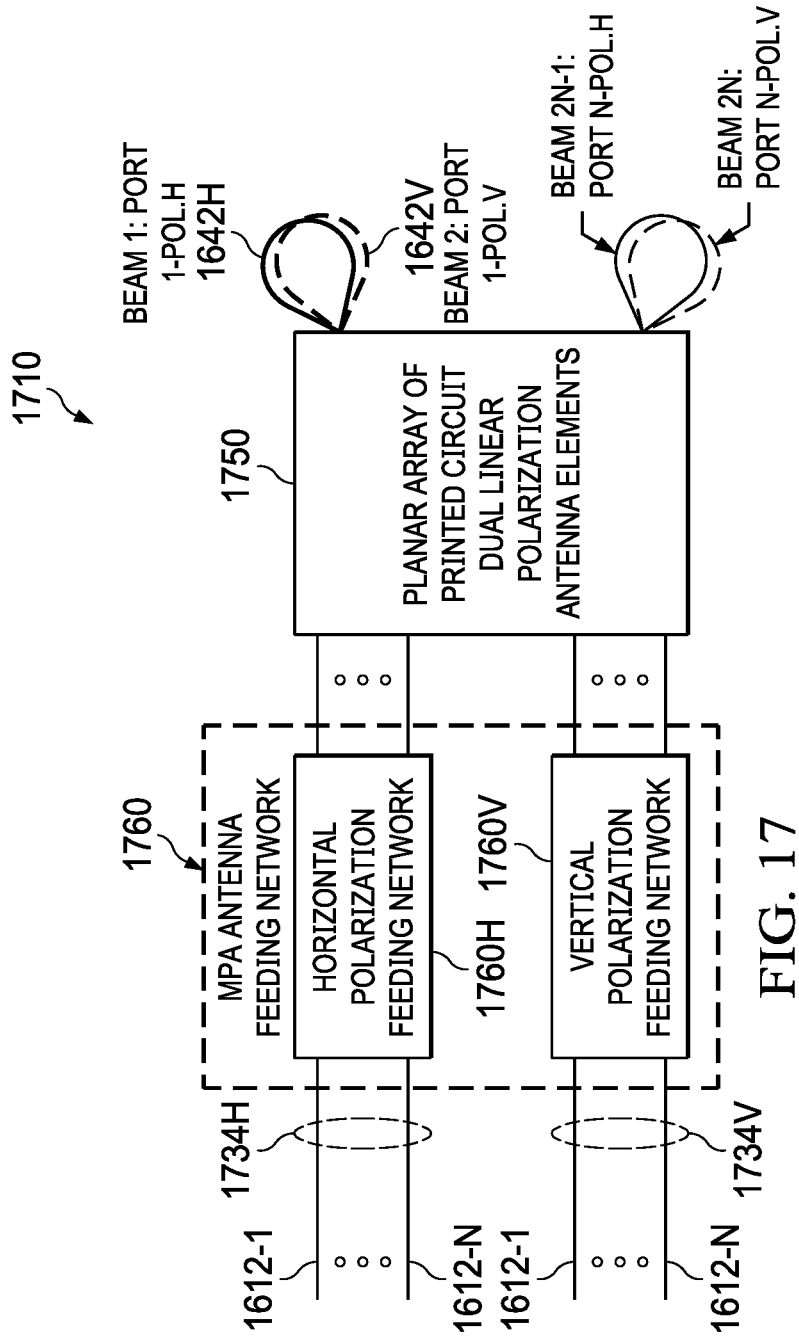
FIG. 17 is a diagram of an example of an MSA antenna which includes an MPA antenna feeding network.

FIG. 17 is a diagram of an embodiment of an MPA antenna 1710 comprising a planar array 1750 of printed circuit dual linear polarization planar antenna elements. An example of a printed circuit dual linear polarization planar antenna element of the planar array 1750 is the dual linear polarization micro strip patch antenna 514 fabricated on a PCB 511 described above in connection with FIG. 5A. The MPA antenna 1710 further comprises an MPA feeding network 1760. The MPA feeding network 1760 comprises a horizontal polarization feeding network 1760H and a vertical polarization feeding network 1760V.

The number of planar antenna elements of the planar array 1750 is configured to be greater than or equal to the number of MPA antenna ports 1612-1, . . . , 1612-N and their arrangement is arbitrary. The planar antenna elements of the planar array 1750 can be homogeneous or heterogeneous.

Each planar antenna element of the planar array 1750 comprises two separate antenna feeds e.g., 534H, 534V, to excite the radiating structure such that the single planar antenna element, e.g., 514, can simultaneously radiate RF signals 1605 coupled to the different antenna feeds 534H, 534V with substantially similar radiation patterns but with orthogonal polarization. We therefore refer to the two antenna element feeds as the vertical polarization antenna element feed 534V and horizontal polarization antenna element feed 534H. Preferably all planar antenna elements of the planar array 1750 are fabricated on a single PCB. Furthermore, the planar antenna elements of the planar array 1750 can be designed to have a low reflection coefficient in the operating frequency band of the radio and a high reflection coefficient outside the band.

The horizontal, respectively vertical, polarization feeding network 1760H, 1760V comprises N antenna feeds inputs and means to couple the MPA antenna feeds 1734H, 1734V to the horizontal, respectively vertical, polarization antenna feed 534H, 534V of at least two planar antenna elements, e.g., 514, feeds of the planar array 1750. The horizontal, respectively vertical, polarization feeding network 1760H, 1760H comprises RF circuits and devices such as, without limitations, transmission lines, hybrid couplers, power dividing/combining elements, phase shifters, delay lines, attenuators, amplifiers, and switching elements. The horizontal, respectively vertical, polarization feeding network 1760H, 1760H and the planar array 1750 of printed circuit dual linear polarization planar antenna elements are designed and arranged such that: (1) RF signals 1605 coupled to an antenna feed of the horizontal, respectively vertical, polarization feeding network 1760H, 1760H are radiated according to horizontally, respectively vertically, polarized directional beams 1642H, 1642V radiating with a given elevation and azimuth beamwidth, a given gain and a given direction; (2) for each MPA antenna feed 1734H of the horizontal polarization feeding network 1760H there is one and only one MPA antenna feed 1734V of the vertical polarization feeding network 1760V that radiates a beam in substantially the same direction but with orthogonal polarization. These two corresponding MPA antenna feeds 1734H, 1734V constitute a MPA antenna port 1612-j, where j=1 . . . N; (3) RF signals 1605 coupled to different antenna feeds 1734H, 1734V of the horizontal, respectively vertical, polarization feeding network 1760H, 1760V are radiated according to horizontally, respectively vertically, polarized directional beams 1642H, 1642V in substantially different directions; and (4) different RF signals 1605 coupled to at least two different MPA antenna feeds 1734H, 1734V of the horizontal, respectively vertical, polarization feeding network 1760H, 1760V are simultaneously radiated by the MPA antenna 1710 according to the directional beams of each MPA antenna port 1612-j.

Optionally, if the number of MPA antenna ports 1612-j is greater than half the number of RF chains of the radio, or equivalently the number of MPA antenna feeds is greater than the number of RF chains of a radio coupled with the MPA antenna system that includes the MPA antenna 1710, the MPA antenna system interface matrix can provide means to selectively interconnect the different RF chains of the radio to one or more MPA antenna feeds 1734H, 1734V. The interface matrix can further include means to dynamically and alternatively configure the interconnections. Furthermore, the interface matrix can be configured to allow each RF chain to be coupled to none, one or multiple antenna feeds 1734H, 1734V of the MPA antenna system. The state of the switching elements is configured via the interface matrix control signals. The interface matrix can also include inline RF filters to further reject signals outside the radio's operating frequency band.

By appropriately designing the horizontal polarization and vertical polarization feeding networks 1760H, 1760V, the arrangement of dual linear polarization antenna elements in the planar array 1750, and selectively interconnecting RF chains of the radio to the antenna feeds 1734H, 1734V of the MPA antenna 1710, it is possible to achieve all the intended features of an MPA antenna system, including controlling the directional coverage area of the radio with the same MPA antenna system.

Figure 18:
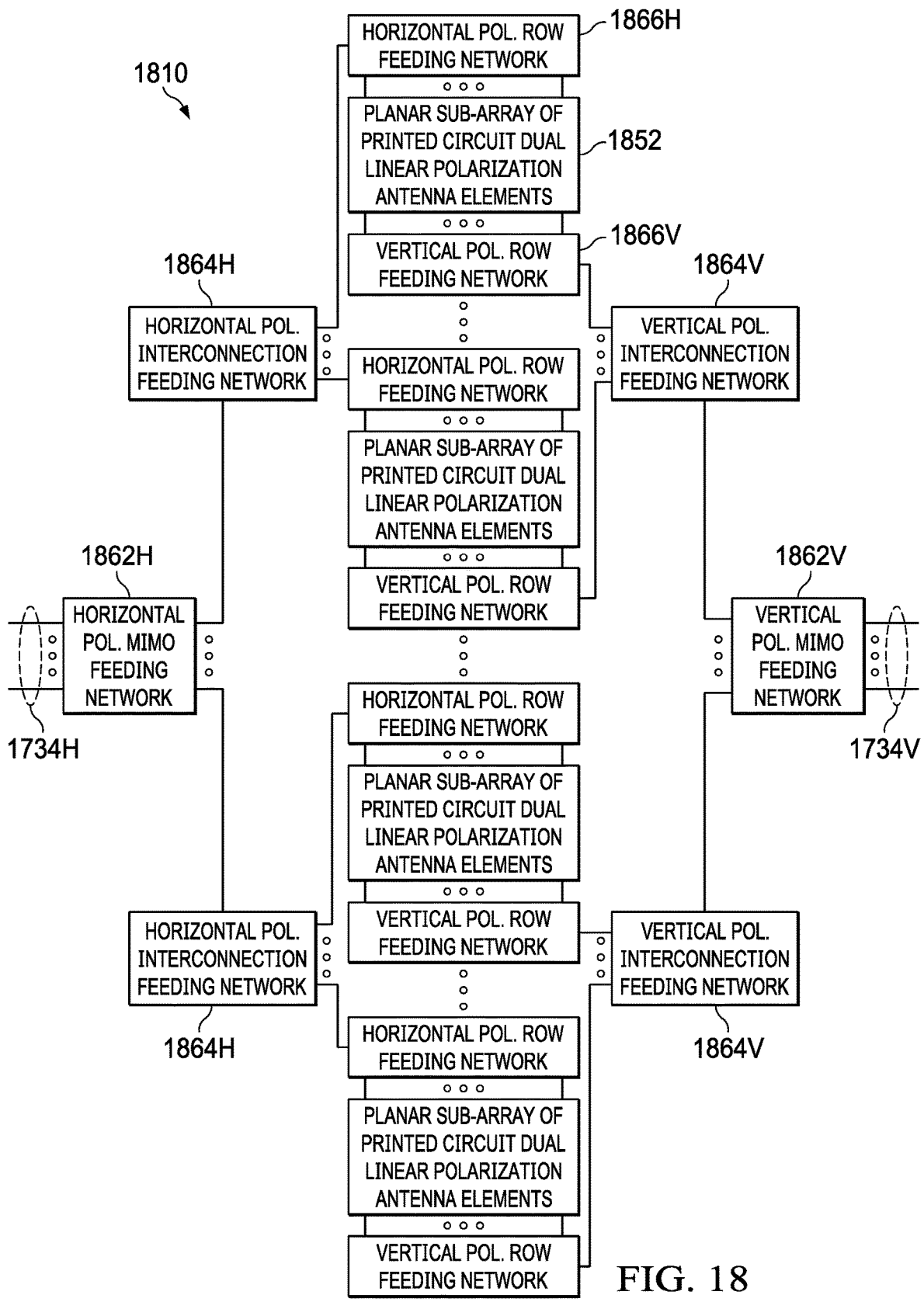
FIG. 18 is a diagram of an MSA antenna which includes sub-arrays of dual polarization antenna elements, MIMO feeding networks, interconnecting feeding networks and row feeding networks.

FIG. 18 is a diagram of an MPA antenna 1810 similar to the MPA antenna 1710 illustrated in FIG. 17. In the MPA antenna 1810, the horizontal polarization feeding network 1760H and vertical feeding network 1760V of the MPA antenna 1710 are logically divided into a horizontal, respectively vertical, polarization multiple input multiple output (MIMO) feeding network 1862H, 1862V, multiple horizontal, respectively vertical, polarization interconnection feeding networks 1864H, 1864V, and multiple horizontal, respectively vertical, polarization row feeding networks 1866H, 1866V. Further, the planar printed circuit dual linear polarization antenna elements in the planar array 1750 of the MPA antenna 1710 are divided into planar sub-arrays 1852, where each sub-array can comprise arbitrary and different number of planar printed circuit dual linear polarization antenna elements (e.g., each antenna element implemented like 514). For the sake of clarity but without limitations, in the following we will assume that the number of planar printed circuit dual linear polarization antenna elements is the same in all sub-arrays 1852.

We will now describe the arrangement of the different logical elements of the MPA antenna 1810. For each sub-array 1852 of planar printed circuit dual linear polarization antenna elements, there is a first feeding network interconnected to the horizontal polarization antenna element feeds 534H of the planar antenna elements called feeding network the horizontal polarization row feeding network 1866H. For each sub-array 1852 of planar printed circuit dual linear polarization antenna elements, there is also a second feeding network interconnected to the vertical polarization antenna element feeds 534V of the planar antenna elements called feeding network the vertical polarization row feeding network 1866V. The horizontal polarization and vertical polarization row feeding network 1866H, 1866V are designed to produce beams in a substantially similar direction with substantially similar beamwidth and side lobe levels.

Figure 19:
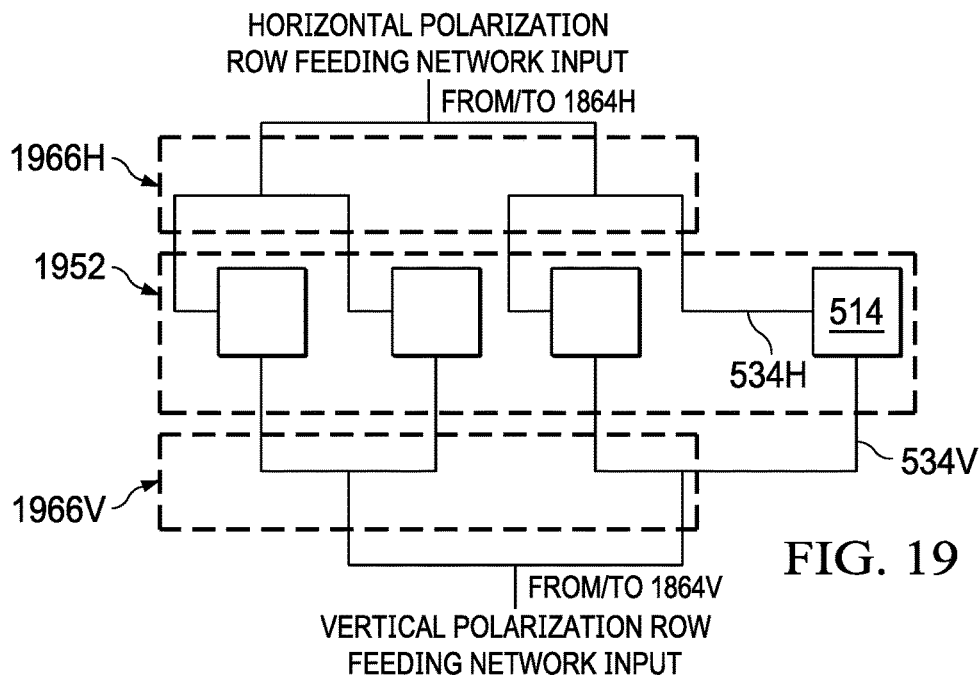
FIG. 19 is a diagram of a sub-array of antenna elements, each of which implemented as single dual linear polarization microstrip patch antenna, and the row feeding networks.

The horizontal, respectively vertical, polarization row feeding network 1866H, 1866V comprises RF circuits and devices such as, without limitations, transmission lines, hybrid couplers, power dividing/combining elements, phase shifters, delay lines, attenuators, amplifiers, and switching elements. FIG. 19 is a diagram of a sub-array 1952 of planar printed circuit dual linear polarization antenna elements which comprises four patch antennas 514 arranged in a linear horizontal row and the horizontal polarization row feeding network 1966H and vertical polarization row feeding network 1966V coupled to the sub-array 1952. The horizontal, respectively vertical, row feeding network 1966H, 1966V distributes their respective input signal from the interconnection feeding networks 1864H, 1864V to the horizontal, respectively vertical, antenna element feeds 534H, 534V using a corporate feeding network. The transmission line lengths and impedance of the horizontal, respectively vertical, polarization row feeding network 1966H, 1966V are designed to achieve a phase and amplitude distribution of the RF signals at the antenna element feeds 534H, 534V, and together with the patch antenna element 514's design and inter-element spacing to achieve the desired radiation pattern (beam direction, beamwidth, side lobe levels, etc.) in the horizontal (azimuth) cut. Furthermore, the design is such that RF signals from 1864V coupled to a vertical polarization row feeding network 1966V are radiated with substantially similar radiation patterns but with orthogonal polarization as RF signals from 1864H coupled to a horizontal polarization row feeding network 1966H. Generally, but not necessarily, all sub-arrays 1852 of planar printed circuit dual linear polarization antenna elements and their vertical and horizontal polarization row feeding networks 1866H, 1866V are designed to achieve similar radiation patterns.

For the sake clarity, but without limitations, we will assume that, in the MPA antenna 1810, the planar printed circuit dual linear polarization antenna elements are arranged into equally spaced identical sub-array rows, each sub-array row 1852 consisting of a linear arrangement of equally spaced planar printed circuit dual linear polarization antenna elements 514. Further, the vertical polarization and horizontal polarization row feeding networks 1866H, 1866V are designed to produce beams in the broadside direction with similar horizontal (azimuth) beamwidth, side lobe levels and gain.

Figure 20:
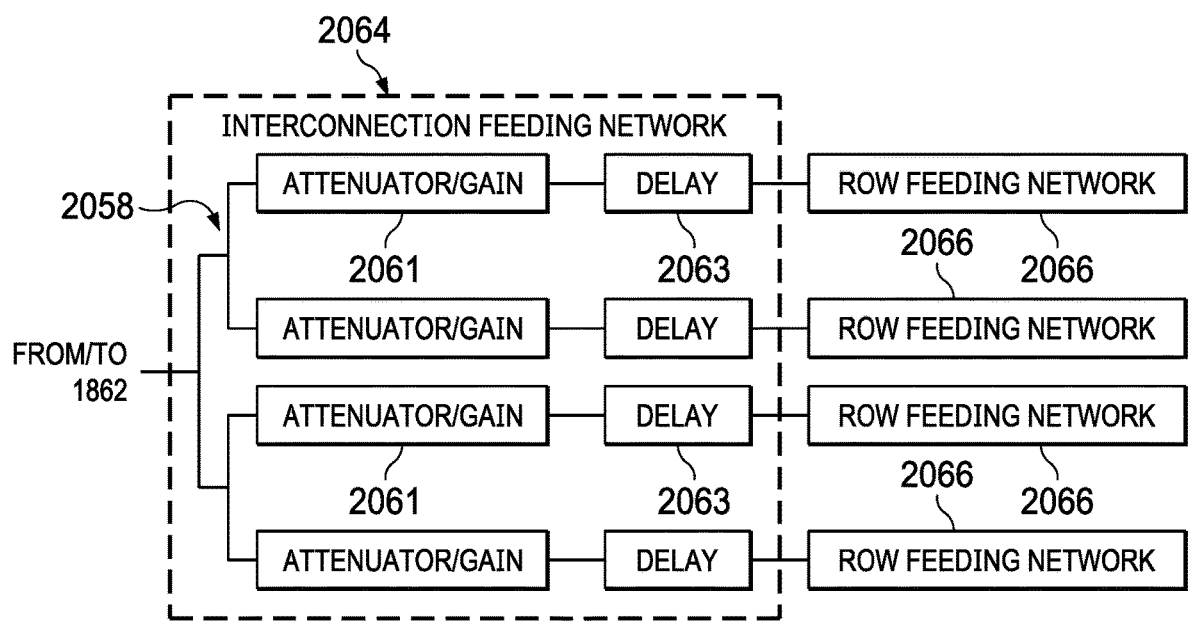
FIGS. 20-21 are diagrams of respective examples of interconnection feeding networks.
Figure 21:
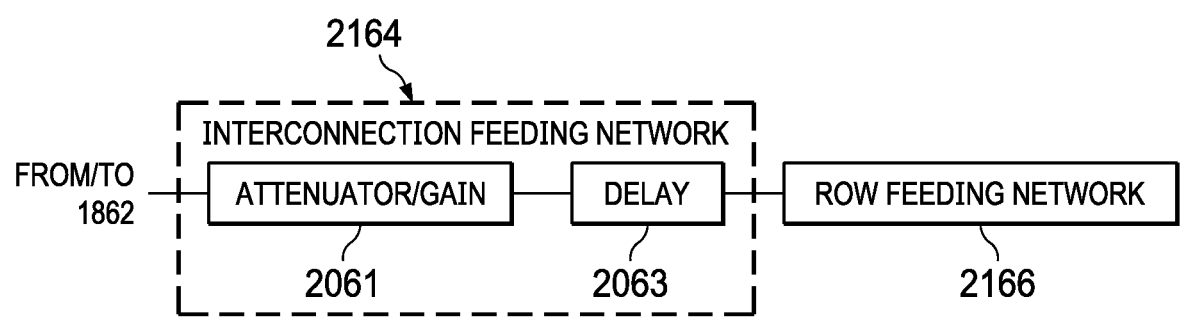

Referring again to FIG. 18, the function of a horizontal, respectively vertical, polarization interconnection feeding network 1864H, 1864V is to distribute the RF signal from one output of the horizontal, respectively vertical, polarization MIMO feeding network 1862H, 1862V to the input of one or more horizontal, respectively vertical, polarization row feeding networks 1866H, 1866V. The horizontal, respectively vertical, polarization interconnection feeding network 1864H, 1864V comprises RF circuits and devices such as, without limitations, transmission lines, hybrid couplers, power dividing/combining elements, phase shifters, delay lines, attenuators, amplifiers, and switching elements. FIG. 20 is a diagram of an interconnection feeding network 2064 to distribute an RF signal from one output of the MIMO feeding network 1862H, 1862V to inputs of four row feeding networks 2066 using a corporate feeding network 2058. FIG. 21 is a diagram of another interconnection feeding network 2164 distributing a RF signal from one output of the MIMO feeding network 1862 to an input of one row feeding network 2166.

The interconnection feeding networks 2064, 2164 are designed to provide a signal amplitude and phase distribution at the input of the row feeding networks 2066, 2166, respectively, to achieve the desired radiation patterns in the vertical (elevation) cut. For example, and without limitations, different attenuators 2061 can be used to control the radiation pattern side lobe levels or different delays 2063 can be used to steer the radiation pattern of all rows or a subset of row in a given direction. Referring again to FIG. 18, the horizontal polarization and vertical polarization interconnection networks 1864H, 1864V connected to corresponding outputs of the vertical polarization and horizontal polarization MIMO feeding networks 1862H, 1862V should be designed to achieve similar amplitude and phase distribution of the RF signal at the input of the horizontal polarization and vertical polarization row feeding networks 1866H, 1866V of the same sub-arrays 1852 of planar printed circuit dual linear polarization antenna elements.

Unlike the interconnection networks 1864H, 1864V and row feeding networks 1866H, 1866V, the MIMO feeding networks 1862H, 1862V have multiple inputs that can be simultaneously excited and multiple outputs. The vertical polarization and horizontal polarization MIMO feeding networks 1862H, 1862V therefore are the core components of the feeding networks 1760H, 1760V to enable the simultaneous transmission of multiple signals in different directions and the reconfigurability of the radio coverage area.

To enable those features, the MIMO feeding networks 1862H, 1862V must have the following three properties: (1) for each input of a MIMO feeding network 1862H, 1862V, a different RF signal amplitude and phase distribution must be achieved at the output of the MIMO feeding network 1862H, 1862V; (2) for each input of the vertical polarization MIMO feeding network 1862V there is a corresponding input of the horizontal polarization MIMO feeding network 1862H achieving the same RF signal amplitude and phase distribution at its outputs (the outputs of the vertical polarization and horizontal polarization MIMO feeding networks 1862H, 1862V with same amplitude and phase are denoted as corresponding outputs); and (3) when multiple inputs of the MIMO feeding network 1862H, 1862V are excited, the MIMO feeding network outputs should consist of the superposition of the RF signals resulting from the individual excitation of the inputs. The inputs of the vertical polarization and horizontal polarization MIMO feeding networks 1862H, 1862V are the MPA antenna feeds 1734H, 1734V, and the vertical polarization and horizontal polarization MPA antenna feeds 1734H, 1734V achieving the same RF signal amplitude and phase distribution at the vertical polarization and horizontal polarization MIMO feeding networks outputs are together an MPA antenna port 1612.

When the above MIMO feeding network 1862H, 1862V properties are achieved, together with the properties of the vertical polarization and horizontal polarization interconnection feeding networks 1864H, 1864V, and of the vertical polarization and horizontal polarization row feeding networks 1866H, 1866V, in the result: (1) RF signals from the multi RF chains radio coupled to corresponding MPA antenna feeds 1734H, 1734V will radiate with substantially similar directional radiation patterns but with orthogonal polarization; (2) RF signals from the multi RF chains radio coupled to different MPA antenna ports 1712 will simultaneously radiate in different directions; and (3) by changing the MPA antenna port 1712 to which RF signals from the multi RF chain radio are coupled or disconnecting one or more RF signals from all antenna ports 1712-1, . . . , 1712-N, it is possible to change the multi RF-chain radio type-2 coverage area (note that in some cases, as will be discussed below, the interconnection networks 1864H, 1864V must be heterogeneous to achieve different directions for different input ports 1712).

Figure 22:
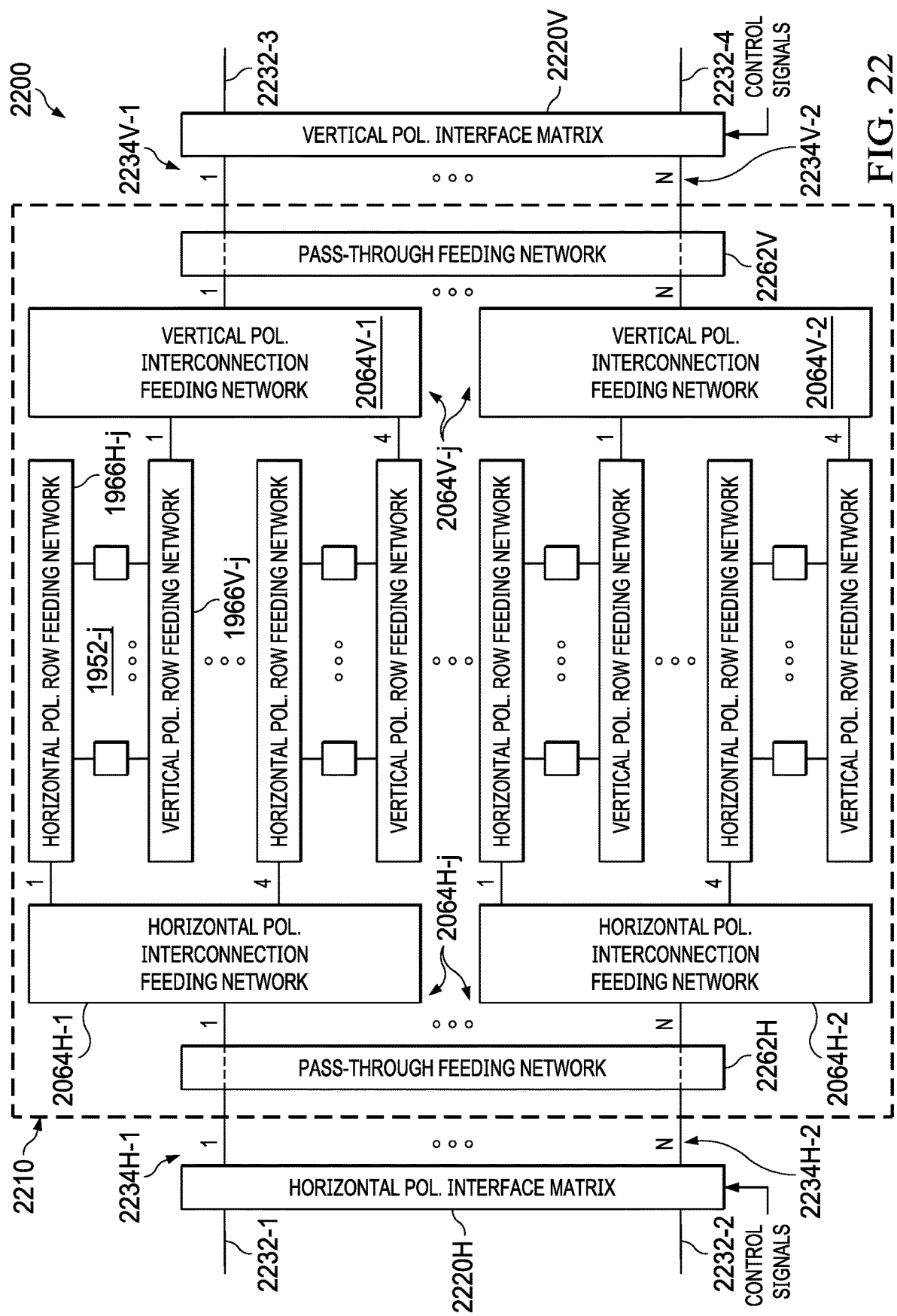
FIG. 22 is a diagram of an MSA antenna system including an MSA antenna configured like the one in FIG. 18, in which the MIMO feeding networks have been implemented as pass-through feeding networks.

FIG. 22 is a diagram of an MPA antenna system 2200 that includes an MPA antenna 2210 for which each of the MIMO feeding networks 2262H, 2262V is implemented as a pass-through feeding network. A pass-through feeding network 2262H, 2262V directly interconnects one input to one output (i.e., it has an identity matrix transfer function), thus it meets the above-noted three required properties of a MIMO feeding network. However, in order to achieve different beam directions for RF signals coupled to different MPA antenna ports, different interconnection feeding networks 2064H-j, 2064V-j are designed such that the signal radiates in different directions, where j=1 . . . N. For example, assuming, as shown in FIG. 22, four rows 1952-*i* of dual linear polarization patch antenna elements (e.g., 514) spaced about half a wavelength apart, e.g., between 0.4λ and 0.6λ, where, i=1 . . . 4, the radiation pattern will have a beamwidth of approximately 30 degrees in the vertical (elevation) cut. Note that each row 1952-*i* of dual linear polarization patch antenna elements is connected to the corresponding interconnection feeding network 2064H-j, 2064V-j through respective horizontal or vertical polarization row feeding network 1966H-i, 1966V-i.

Assuming two interconnections feeding networks 2064H-j, 2064V-j, (i.e., j=1 . . . N, where N=2), the first horizontal polarization interconnection network 2064H-1 and first vertical polarization interconnection network 2064V-1 are designed with transmission line delays such that the radiation pattern has a maximum at a 10 degree angle in the vertical cut, and the second horizontal polarization interconnection network 2064H-2 and second vertical polarization interconnection network 2064V-2 are designed with transmission line delays such that the radiation pattern has a maximum at a −10 degree angle in the vertical cut. As shown in FIG. 22, the MPA antenna system 2200's interface matrix is divided into a horizontal interface matrix 2220H and a vertical interface matrix 2220V.

Assuming, without limitations, a radio with four RF chains 2232-1, . . . , 2232-4, the first two RF chains 2232-1, 2232-2 are connected to the horizontal interface matrix 2220H and the second two RF chains 2232-3, 2232-4 are connected to the vertical interface matrix 2220V. For N greater than 2, the radio coverage can be changed by selectively interconnecting the first and second RF chains 2232-1, 2232-2 in the horizontal interface matrix 2220H to two different horizontal antenna feeds 2234H-1, 2234H-2 of the MPA antenna 2210 and by selectively interconnecting the third and fourth RF chains 2232-3, 2232-4 in the vertical interface matrix 2220V to the corresponding vertical antenna feeds 2234V-1, 2234V-2 of the MPA antenna 2210. The radio coverage can also be changed by selectively disconnecting either the first and second RF chains 2232-1, 2232-2 or the third and fourth RF chains 2232-3, 2232-4 from any antenna feeds 2234H-j, 2234V-j, where j=1, 2. The MPA antenna system 2200 illustrated in FIG. 22 can be generalized for an arbitrary number of RF chains 2232 and number of rows of antenna elements per interconnection feeding network 2064H-j, 2064V-j.

Figure 23:
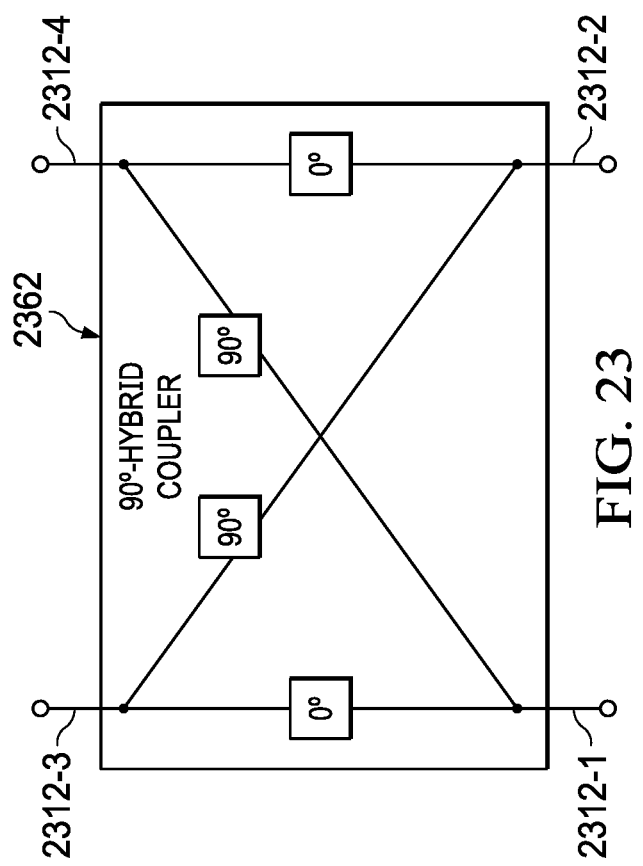
FIG. 23 is a diagram of a 90°-hybrid coupler.

However, other MPA antenna systems can be implemented to more efficiently use the rows 1952-*j* of antenna elements to produce the narrowest beamwidth possible. For example, with eight rows 1952-*j* of antenna elements, where j=1 . . . 8, one can achieve a beamwidth of approximately 15 degree versus approximately 30 degree with the architecture illustrated in FIG. 22 where j=4. FIG. 23 is diagram of a MIMO feeding network 2362 implemented as a 90-degree hybrid coupler, which is more efficient than the MIMO feeding network 2262H, 2262V. In a 90-degree hybrid coupler 2362, the RF signal at port 2312-1 will be distributed with 90-degree phase difference at the output port 2312-3 and 2312-4 and will vanish at the other input port 2312-1. Similarly, the RF signal at port 2312-2 will be distributed with an inverted 90-degree phase difference at the output port 2312-3 and 2312-4 and will cancel at the input port 2312-1.

An important fact that we take advantage in this disclosure is that because RF signals vanishes at the other input port, if two different RF signals are simultaneously coupled to the two input ports, they will superpose at the output ports with the respective phase shift associated to their respective input port. Therefore, a horizontal, respectively vertical, MIMO feeding network realized using the 90-degree hybrid coupler meets the three required properties of the MIMO feeding networks.

Figure 24:
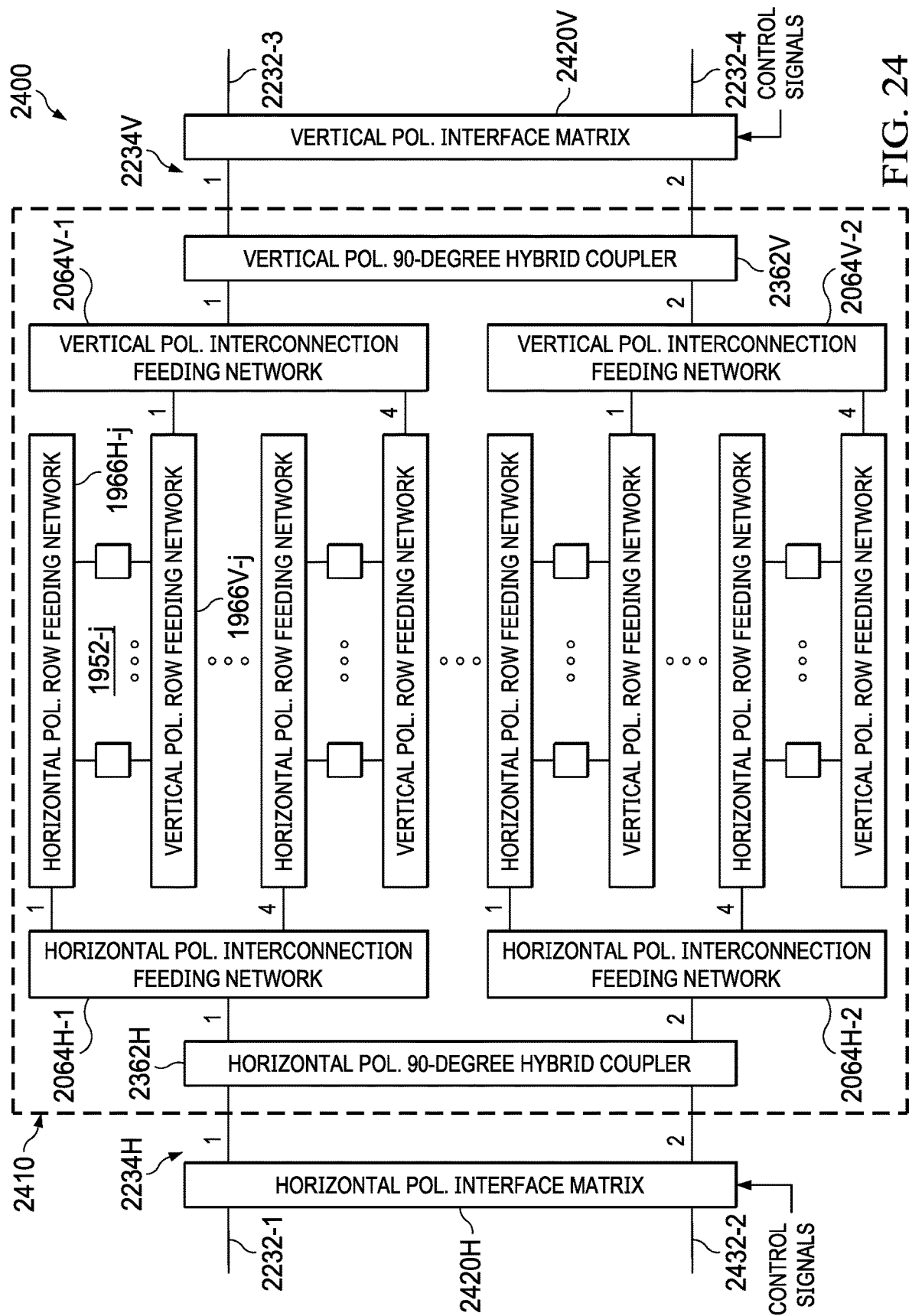
FIG. 24 is a diagram of an MSA antenna system including an MSA antenna configured like the one in FIG. 18, in which the MIMO feeding networks have been implemented as 90°-hybrid coupler feeding networks.

FIG. 24 is a diagram of an MPA antenna system 2400 that includes a horizontal interface matrix 2420H, a vertical interface matrix 2420V, and an MPA antenna 2410. The MPA antenna 2410 includes 90°-hybrid coupler MIMO feeding networks 2362H, 2362V, and two vertical interconnection feeding networks 2064V-1, 2064V-2 and two horizontal interconnection feeding networks 2064H-1, 2064H-2, each coupled to four rows 1952-*j* of antenna elements, where j=1 . . . 4. Note that each row 1952-*i* of dual linear polarization patch antenna elements is connected to the corresponding interconnection feeding network 2064H-j, 2064V-j through respective horizontal or vertical polarization row feeding network 1966H-i, 1966V-i. Here, each RF signal coupled to an MPA antenna feed 2234H, 2234V is distributed to all rows 1952-*j* antenna elements and therefore benefits from the full array aperture to achieve the narrowest beamwidth in the vertical (elevation) cut. Also, unlike the case with pass-through feeding network 2262H, 2262V, even if the interconnection feeding networks 2064H-1, 2064H-2, 2064V-1, 2064V-2 are identical, the beam directions for a different MPA antenna port are different because the phase distribution at the output of the 90-degree hybrid coupler MIMO feeding network 2362H or 2362V is different for different input ports.

Therefore, with this structure of the MPA antenna system 2400, RF signals coupled to corresponding MIMO feeding networks inputs (i.e., corresponding MPA antenna feeds 2234H, 2234V) will radiate with same directional radiation pattern but with orthogonal polarization and signals coupled to different MPA antenna ports will simultaneously radiate in different directions. However, in the case of a radio with four active RF chains 2232-1, 2232-2, 2232-3, 2232-4, it is not possible to change the radio coverage area since each 90-degree hybrid coupler 2362H, 2362V has only two inputs. An approach to overcome this problem is to use a hybrid between the 90-degree hybrid coupler 2362 and a pass-through matrix 2262 where there are several instantiations of the 90-degree hybrid coupler 2362, each connected to different pairs of interconnection feeding networks 2064H-j, 2064V-j, each pair of interconnection feeding networks designed to radiate in different directions. The MPA antenna system 2400 illustrated in FIG. 24 can be generalized for an arbitrary number of RF chains 2232 and number of rows 1952 of antenna elements per interconnection feeding network 2064H, 2064V.

Figure 25:
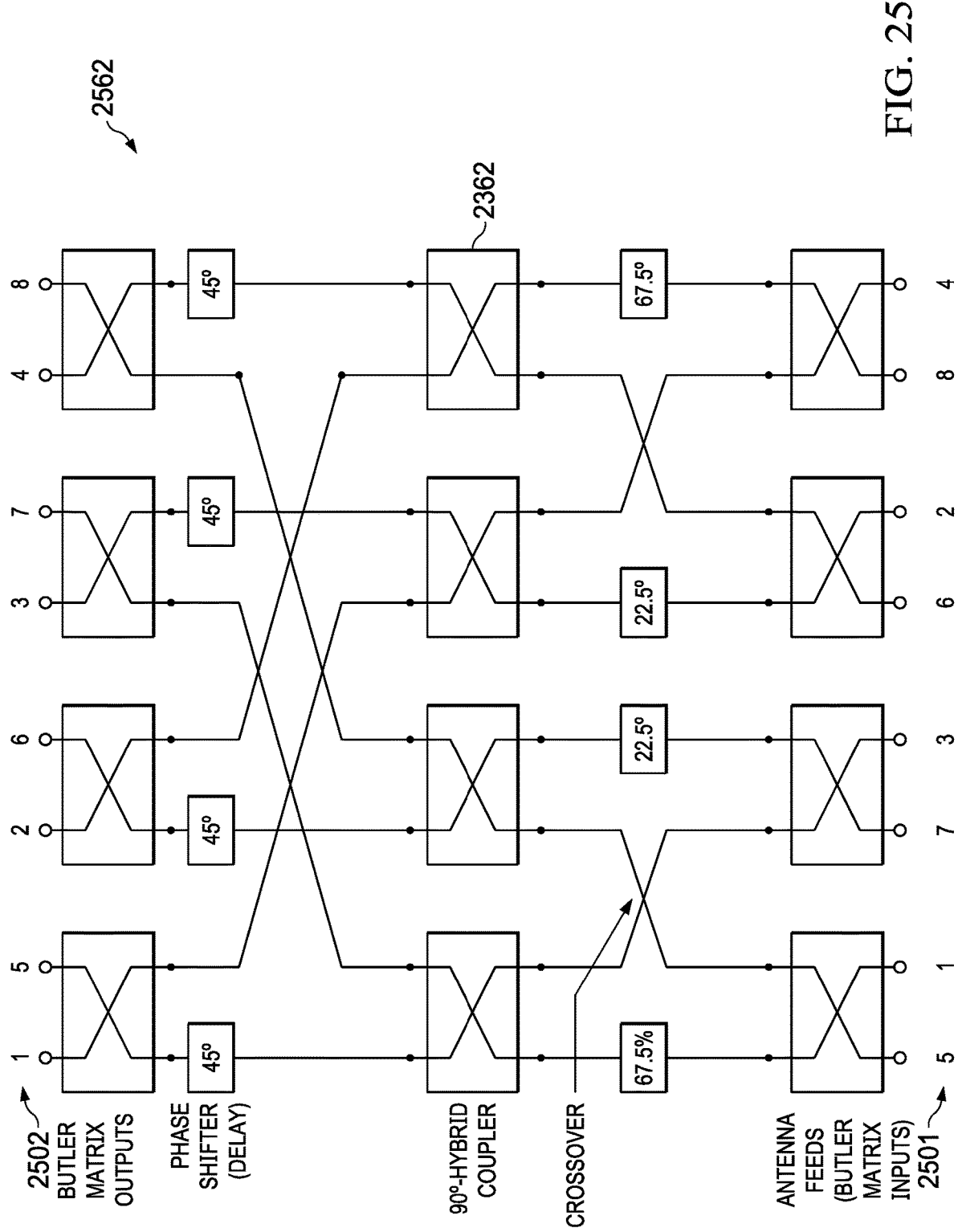
FIG. 25 is a diagram of an 8×8 Butler matrix.

To more efficiently overcome the problem of providing flexible coverage, we disclose an approach where the MIMO feeding networks is realized by extending the concept of the 90-degree hybrid coupler 2362 to a Butler matrix like the Butler matrices disclosed in U.S. Pat. No. 3,255,450 A. FIG. 25 is a diagram of an 8×8 Butler matrix 2562. An RF signal coupled to an input port 2501 of the Butler matrix 2562 will be distributed to the Butler matrix output ports 2502 with a phase distribution different for each Butler matrix input port 2501.

Figure 26:
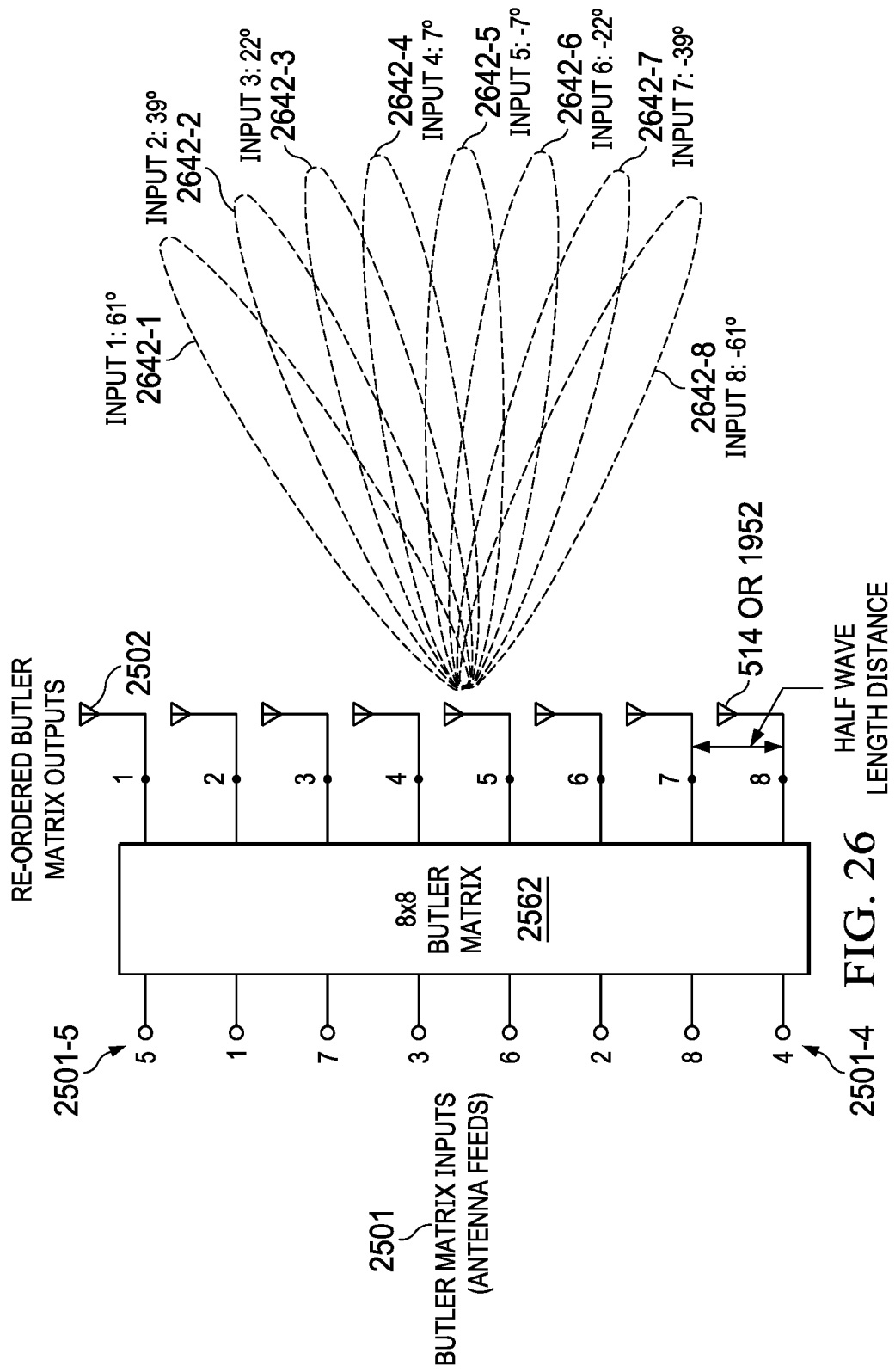
FIG. 26 is a schematic of an 8×8 Butler matrix coupled to antenna elements emitting eight beams along different directions.

Assuming the Butler matrix output ports 2502 are interconnected with equal delay transmission lines to identical antennas (e.g., 514 or 1952) equally spaced half a wavelength apart, e.g., between 0.4λ and 0.6λ, the phase distribution at the output ports 2502 of the 8×8 Butler matrix 2562 is such that RF signals at each Butler matrix input port 2501 are radiated according to the beams 2642-1 . . . . , 2642-8 illustrated in FIG. 26. Referring again to FIG. 25, the Butler matrix 2562 is hierarchically built with 90-degree hybrid couplers 2362 and thus retains the 90-degree hybrid couple input port isolation property. That is, an RF signal coupled to a Butler matrix input port 2501 will cancel at all other Butler matrix input ports 2501, and RF signals coupled to different Butler matrix input ports 2501 will superpose at the Butler matrix output ports 2502 with the respective phase shifts associated to their Butler matrix input port 2501.

For example, assuming that the output ports 2502 are interconnected with equal delay transmission lines to identical antennas (e.g., 514 or 1952) equally spaced-half a wavelength apart, e.g., between 0.4λ and 0.6λ, a RF signal coupled to the 8×8 Butler matrix input port 2501-4 will radiate with a beam 2642-4 in a direction at 7 degree (with an approximate 15 degree beamwidth), and a RF signal simultaneously coupled to the 8×8 Butler matrix input port 2501-5 will simultaneously radiate with a beam 2642-5 in a direction at −7 degree (with an approximate 15 degree beamwidth). Therefore, a horizontal, respectively vertical, MIMO feeding network realized with the Butler matrix 2562 meets the three required properties of the MIMO feeding networks.

Figure 27:
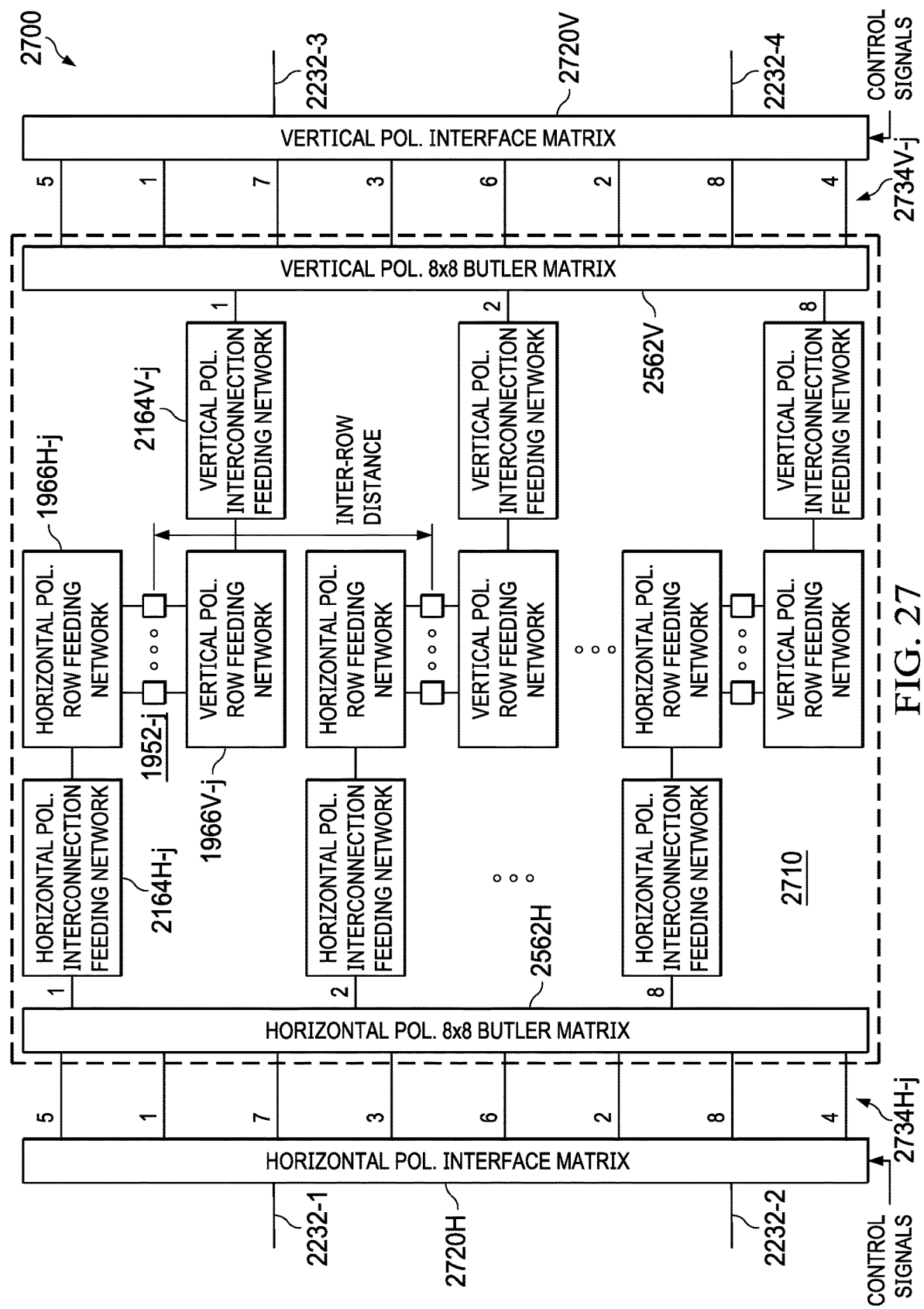
FIG. 27 is a diagram of an MSA antenna system including an MSA antenna configured like the one in FIG. 18, in which the MIMO feeding networks have been implemented as 8×8 Butler matrices.

FIG. 27 is a diagram of an MPA antenna system 2700 which includes a horizontal interface matrix 2720H, a vertical interface matrix 2720V, and an MPA antenna 2710. The MPA antenna 2710 includes a horizontal polarization Butler matrix 2562H and a vertical polarization Butler matrix 2562V, eight horizontal polarization interconnection feeding networks 2164H-j and eight vertical polarization interconnection feeding networks 2164V-j, eight sub-arrays 1952-j (also referred to as rows) of dual linear polarization antenna elements (e.g., 514) and corresponding horizontal polarization row feeding networks 1966H-j and vertical polarization row feeding networks 1966V-j, where j=1 . . . 8. In the MPA antenna, each Butler matrix output is coupled to a single row feeding network 1966H-j, 1966V-j using a single input single output interconnection network 2164H-j, 2164V-j illustrated in FIG. 21. A RF signal coupled to an MPA antenna feed 2734H-j, 2734V-j is therefore distributed to all rows 1952-j of antenna elements and therefore benefits from the full array aperture to achieve the narrowest beamwidth in the vertical (elevation) cut. Furthermore, the MPA antenna 2710 has sufficient antenna ports such that for a radio with four RF chains 2232-1, . . . , 2232-4, the radio coverage can be dynamically changed by changing the interconnection state of the MPA antenna system interface matrix comprising a horizontal interface matrix 2720H and a vertical interface matrix 2720V to selectively interconnect or disconnect the RF chains 2232-1, . . . , 2232-4 to different inputs of the Butler matrices 2562H, 2562V.

To maintain the overlapping coverage for both MPA antenna feeds 2734H-j, 2734V-j of an MPA input port, both the horizontal polarization and vertical polarization Butler matrix 2562H, 2562V are identical, their corresponding output ports are connected by identical horizontal polarization and vertical polarization interconnection networks 2164H-j, 2164V-j to identical horizontal and vertical row feeding networks 1966H-j, 1966V-j interconnected to the same sub-array 1952-j of dual linear polarization antenna elements (e.g., 514). Furthermore, the RF chains 2232-1, . . . , 2232-4 coupled to the horizontal and vertical interface matrix 2720H, 2720V should be interconnected to the corresponding horizontal and vertical MPA antenna feeds 2734H-j, 2734V-j. Note that the different horizontal, respectively vertical, interconnection networks 2164H-j, 2164V-j do not need to be identical. For example, different attenuators can be used to achieve better control of the side lobe levels in the vertical (elevation) cut. The architecture of the MPA antenna system 2700 illustrated in FIG. 27 can be generalized for an arbitrary number of RF chains 2232 and number of rows 1952 of antenna elements per interconnection feeding network 2164H, 2164V.

Because of all its properties, the MPA antenna system 2700 illustrated in FIG. 27 is a preferred embodiment of an MPA antenna system that includes an interface matrix and an MPA antenna like the one shown in either FIG. 17 or FIG. 18. The disclosed utilization of the Butler matrix 2562H, 2562V included in the MPA antenna system 2700 differs from previous utilizations of a Butler matrix in several manners. First, different input ports of each of the two Butler matrices 2562H, 2562V can be interconnected to different RF chains 2232 from the same radio, where each of the RF chains can transmit correlated or uncorrelated data signals. Second, the two Butler matrices 2562H, 2562V are simultaneously used to feed signals to different antenna feeds of the dual linear polarization antenna elements (e.g., 514) in the planar array 1750 of printed circuit dual linear polarization antenna elements. Third, the interconnections between the Butler matrices 2562H, 2562V and RF chains 2232 is done through two different interface matrices 2720H, 2720V which are configured in coordination to always emanate everywhere in the coverage area of the radio, two RF signals on different beams with orthogonal polarization.

Therefore, a unique advantage of the disclosed MPA antenna system 2700 is that it enables the simultaneous utilization of all elements (e.g., 514) in a planar array 1750 of printed circuit dual linear polarization antenna elements to transmit/receive signal from/to at least four RF chains 2232-1, . . . , 2232-4 from a single radio with multiple RF chains and to use an interface matrix 2720H, 2720V to reconfigure the achieved coverage area of the radio. This is particularly important to efficiently support MIMO and MU-MIMO radios with or without the ability to reconfigure coverage.

In a particular arrangement all components of the MPA antenna system 2700 comprising the MPA antenna 2710 (feedings networks 2562H, 2562V, 2164H-j, 2164V-j, 1966H-j, 1966V-j and antenna elements 1952-j) and the vertical and horizontal interface matrices 2720H, 2720V, excluding cables, are fabricated on a single PCB. The PCB can be single sided or double sided.

Variants and combinations of the above arrangements can be used to achieve the same properties of the MPA antenna 2710 for different number of inputs, antenna elements, and level of coverage reconfigurability. In particular, it can be readily recognized that the above arrangements can be used with radios with more than four RF chains 2232-1, . . . , 2232-4. For example, and without limitations, the MPA antenna system 2700 with 8×8 Butler matrix 2562H, 2562V, can be interconnected with a radio with 8 RF chains and simultaneously radiate signals in four different directions with orthogonal polarization, and further offer reconfigurability of the radio coverage area.

By employing the MPA antenna system 2200, 2400, 2700, a multitude of benefits and features result for its use: (1) it is possible to design arbitrary narrow directional beams with accurate side lobe level control in both horizontal (azimuth) cut and vertical (elevation) cut to minimize interference to adjacent wireless network devices and client devices using the same channel; (2) the reconfigurable interface matrices 2220H, 2220V or 2420H, 2420V or 2720H, 2720V enable one to dynamically and alternatively change the coverage of a radio with multiple RF chains, including profile, direction and width. This is an important feature to dynamically provide good signal coverage in UHD type-2 coverage scenarios while limiting interference in dense network deployment; (3) everywhere in the coverage area of the radio, there are always two signals emanating on different beams with orthogonal polarization. This is a desired feature to provide efficient MIMO communication links with two spatial streams; (4) different RF signals from the radio with multiple RF chains coupled to different ports are radiated in different directions (e.g., for a radio with four RF chains 2232-1, . . . , 2232-4, two RF signals coupled to a first port but different antenna feeds 2734H-j, 2734V-j will radiate with beams in the same direction but with orthogonal polarization and two other RF signals coupled to a different second port but different antenna feeds 2234H-j, 2234V-j or 2734H-j, 2734V-j will radiate with beams in the direction different from the first two RF signals but with orthogonal polarization). This provides additional signal discrimination that further enhances the performance of MU-MIMO communications; (5) by using an arrangement based on hybrid couplers, one can effectively reuse the antenna elements 1952-j to generate multiple directional beams and maximize the available area for antenna elements to generate beams with the narrowest beamwidth and (6) the geometry and signal rejection properties of the MPA antennas 2210, 2410, 2710 enable, as discussed below, the efficient realization of a multi-radio antenna system. One can thus appreciate the multiple significant benefits provided by the disclosed MPA antenna system 2200, 2400, 2700 over present state-of-the-art antenna systems employed in wireless network devices.

For the second step of the second approach, we will now integrate multiple MPA antennas (e.g., 2210, 2410, 2710) and an interface matrix into a multi-radio MPA (MR-MPA) antennas system for MR-WND to efficiently resolve the problem of providing efficient MIMO and MU-MIMO communications concurrently with multiple radios in UHD environments where high antenna gain and directivity are required.

Figure 28:
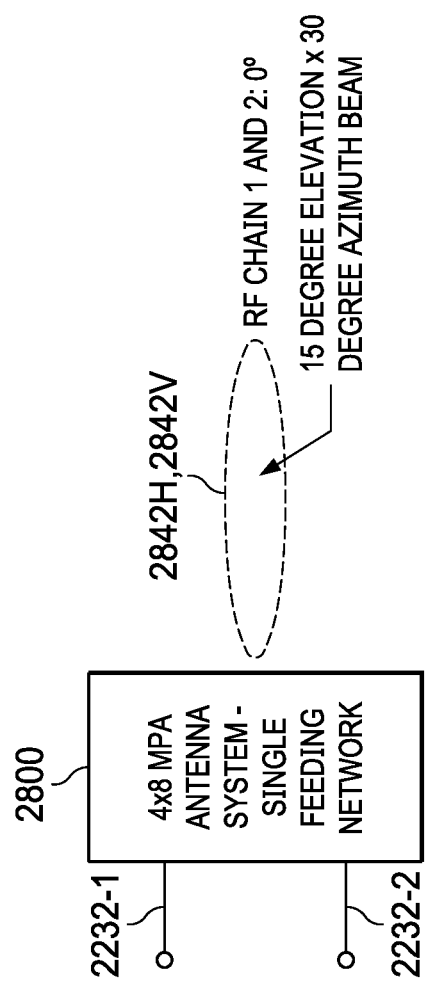
FIG. 28 is a diagram of a 4×8 MPA antenna system in which the MPA antenna has a single feeding network.

We first consider some examples of MPA antenna systems that could be integrated together to realize a MR-MPA antenna system for a MR-WND. FIG. 28 is a diagram of an example of a 4×8 MPA antenna system 2800 implemented as the MPA antenna system 2200 in which the 4×8 MPA antenna 2210 has N=1 horizontal, respectively vertical, interconnection feeding network 2064H, 2064V (note that in this case the 4×8 MPA antenna has a single port) both interconnected to eight rows 2252-j of four linear arrays of dual linear polarization patch antenna elements (e.g., 514) with half wavelength inter antenna element spacing, e.g., between 0.4λ and 0.6λ, and vertical, respectively horizontal, row feeding networks 1966H-j, 1966V-j, where j=1 . . . 8. Here, the vertical, respectively horizontal, row feeding networks 1966H-j, 1966V-j, and the vertical, respectively horizontal, interconnection feeding networks 2064H, 2064V are designed to provide a broadside radiation pattern with approximatively 30 degree horizontal (azimuth) beamwidth and 15 degree vertical (elevation) beamwidth. In this manner, a single 4×8 MPA antenna connected to a radio chain 2232-1, 2232-2 can provide dual orthogonal beams 2842H, 2842V of substantially similar pattern in a desired direction, enabling a single 4×8 MPA antenna to send and receive two discrete RF signals at the same frequency.

Furthermore, by appropriately designing the horizontal polarization and vertical polarization interconnection 2064H, 2064V and row feeding networks 1966H, 1966V of, and the arrangement of dual linear polarization antenna elements in the planar array 2252, the MPA antenna system 2800 provides means to radiate two RF signals with orthogonal polarization everywhere in the intended coverage zone of the radio and said radiation pattern of the array antenna can be designed to have arbitrary beamwidth and side lobe levels.

Figure 29:
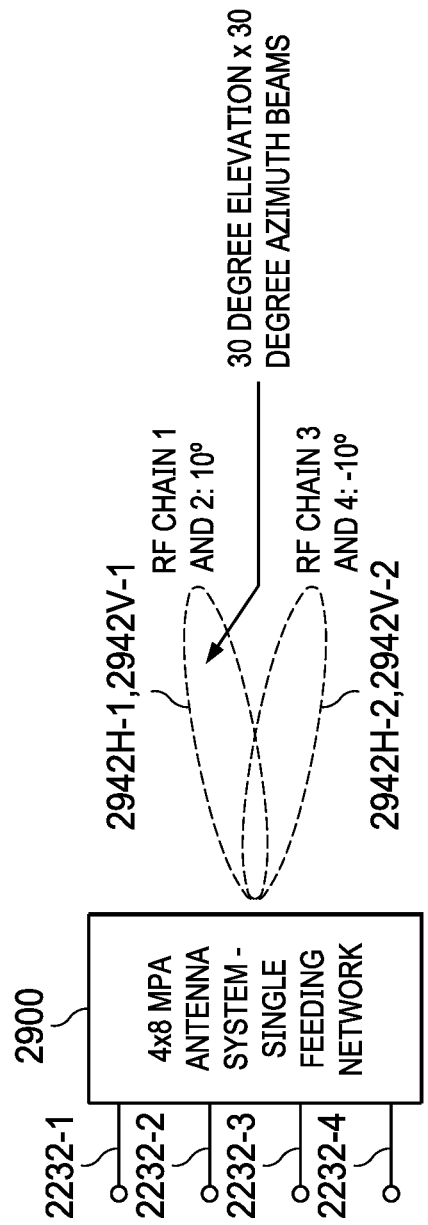
FIG. 29 is a diagram of a 4×8 MPA antenna system in which the MPA antenna has dual feeding networks.

FIG. 29 is a diagram of an example of a 4×8 MPA antenna system 2900 implemented as the MPA antenna system 2200 in which the 4×8 MPA antenna 2210 has N=2 horizontal, respectively vertical, interconnection feeding networks 2064H-1, 2064H-2, 2064V-1, 2064V-2, all interconnected to four rows 2252-j of four linear arrays of dual linear polarization patch antenna elements (e.g., 514) with half wavelength inter element spacing between antenna elements and rows of a sub-array antenna, e.g., between 0.4λ and 0.6, where j=1 . . . 4. In the example illustrated in FIG. 29, the vertical, respectively horizontal, row feeding networks 1966H-j, 1966V-j and vertical, respectively horizontal, interconnection feeding networks 2064H-j, 2064V-j of the first sub-array antenna has been designed to provide a radiation pattern with approximatively 30 degree horizontal (azimuth) beamwidth and 30 degree vertical (elevation) beamwidth with a maximum gain at 10 degree in elevation and broadside in azimuth, and the vertical, respectively horizontal, row feeding networks 1966H-j, 1966V-j and vertical, respectively horizontal, interconnection feeding networks 2064H-j, 2064V-j of the second sub-array antenna are designed to provide a radiation pattern with approximatively 30 degree horizontal (azimuth) beamwidth and 30 degree vertical (elevation) beamwidth with a maximum gain at −10 degree in elevation and broadside in azimuth. In this manner, the 4×8 MPA antenna of the 4×8 MPA antenna system 2900 connected to radio chains 2232-1, . . . , 2232-4 can radiate beams 2942H-1, 2942V-1 and 2842H-2, 2842V-2 with different directions and/or beamwidth, enabling the 4×8 MPA antenna of the 4×8 MPA antenna system 2900 to send and receive four discrete RF signals at the same frequency. By appropriately designing the horizontal polarization and vertical polarization interconnection 2064H-j, 2064V-j and row feeding networks 1966H-j, 1966V-j of the sub-arrays, and the arrangement of dual linear polarization antenna elements in the planar sub-arrays, the 4×8 MPA antenna system 2900 provide means to radiate multiple RF signals with orthogonal polarization everywhere in the intended coverage zone of the radio and said radiation pattern of the array antenna can be designed to have arbitrary beamwidth and side lobe levels. Furthermore, if the number of sub-array antennas exceed half the number of RF chains 2232-1, . . . , 2232-4, it then becomes possible to use switching elements and/or power dividing/combining elements in the interface matrix of the MPA antenna system 2900 to selectively route and connect or disconnect the RF chains 2232-1, . . . , 2232-4 to each of the sub-array antenna feeds and dynamically reconfigure the radio coverage.

Figure 30:
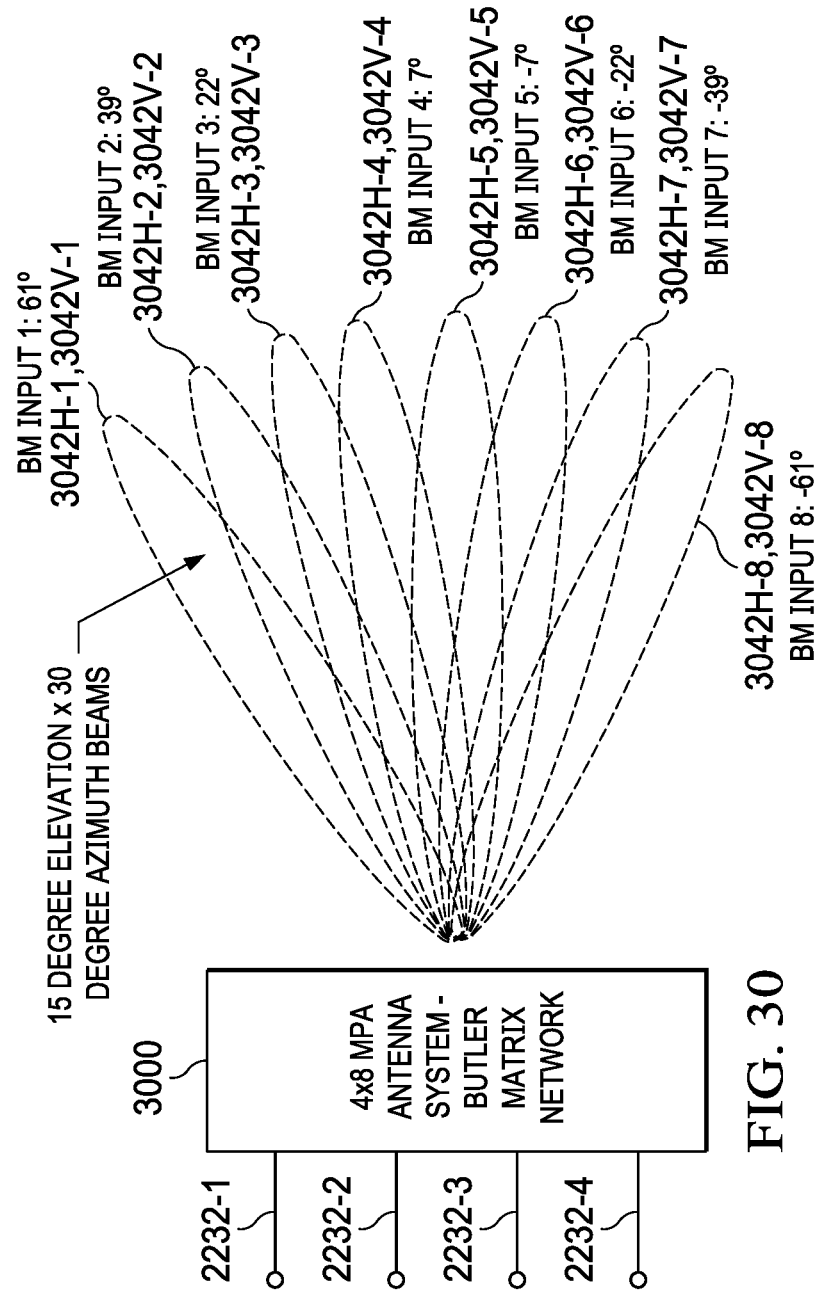
FIG. 30 is a diagram of a 4×8 MPA antenna system in which the MPA antenna has a Butler matrix feeding network.

FIG. 30 is a diagram of an example of a 4×8 MPA antenna system 3000 implemented as the MPA antenna system 2700 in which the 4×8 MPA antenna 2710 has eight rows of linear arrays 2252-j, where j=1 . . . 8, where each row consists of a linear array of four dual linear polarization patch antenna elements with half wavelength inter element spacing between antennas elements, e.g., between 0.4λ and 0.6λ. In the example illustrated in FIG. 30, the vertical, respectively horizontal, row feeding networks 1966H-j, 1966V-j and the Butler matrices 2562H, 2562V have been designed to provide a radiation pattern with approximately 30 degree horizontal (azimuth) beamwidth and 15 degree vertical (elevation) beamwidth with a maximum gain at broadside in azimuth and at different elevation angles depending on the excited port of the Butler matrix 2562H, 2562V.

The Butler matrix based 4×8 MPA antenna system 3000 provides means to radiate, with multiple beams 3042H-1, 3042V-1, ..., 3042H-8, 3042V-8 in multiple directions, multiple RF signals with orthogonal polarization everywhere in the intended coverage zone of the radio and said radiation pattern of the array antenna can be designed to have arbitrary beamwidth and side lobe levels. Furthermore, when the number of input ports of the Butler matrix exceeds half the number of RF chains 2232-1, ..., 2232-4, it then becomes possible to use switching elements and/or power dividing/combining elements in the interface matrix of the MPA antenna system 3000 to selectively route and connect or disconnect the RF chains 2232-1, ..., 2232-4 to each of the Butler matrix antenna feeds and dynamically reconfigure the radio coverage area, including its direction and width.

We further recognize herein the several characteristics possessed by the MPA antennas 1610, 1710, 2210, 2410, 2710 that are critical for a multiple radio antenna system implementation in a MR-WND and can also be exploited to provide additional benefits. First, the planar nature of the MPA antenna 1610, 1710, 2210, 2410, 2710 makes it amenable to integrate multiple MPA antennas in a single planar enclosure. Second, the MPA antenna signal rejection properties, the MPA antenna radiation pattern directionality, the interface matrix (when it comprises RF filters) signal rejection properties, and the flexibility of the geometric arrangement of the MPA antennas 1610, 1710, 2210, 2410, 2710 can be exploited in combination to enhance the isolation between RF signals from different radios to more efficiently support simultaneous operations of these radios. Finally, the possibility to reconfigure, via an interface matrix 2220H/V, 2420H/V, 2720H/V, the coverage realized by a MPA antenna 2210, 2410, 2710 and the possibility to integrate different MPA antennas 1610, 1710, 2210, 2410, 2710 with different beam profiles (direction and/or beamwidth) can be exploited to offer new level of flexibilities for design and operation of wireless networks.

Figure 31:
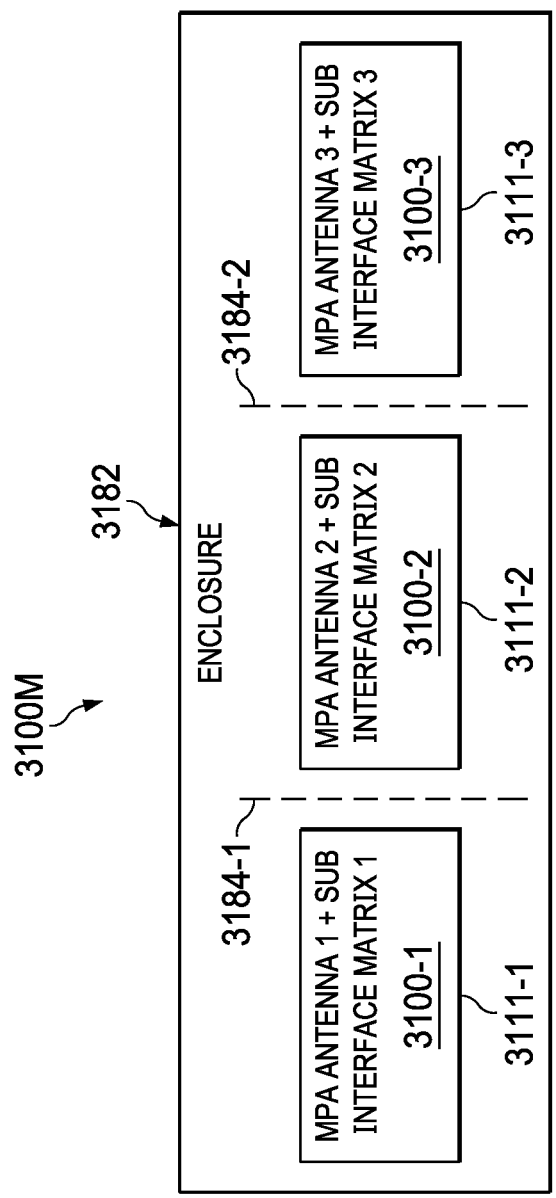
FIGS. 31-32 show aspects of multi-radio (MR) MPA antenna systems.
Figure 32:
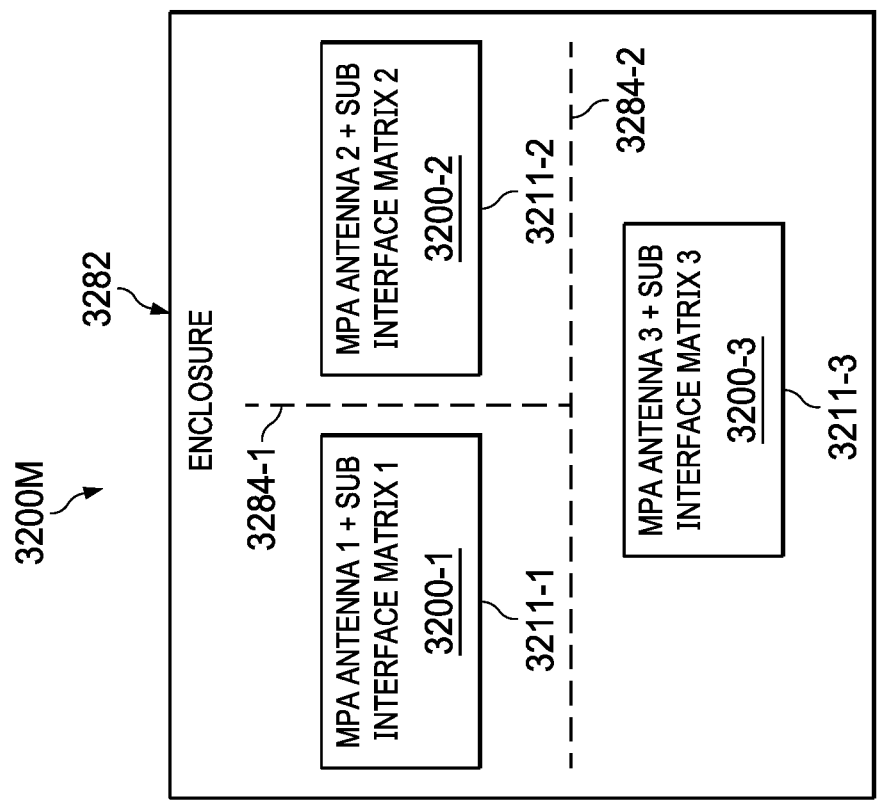

FIG. 31 is a diagram of an example of MR-MPA antenna system 3100M integrating three MPA antenna systems 3100-1, 3100-2, 3100-3 in an enclosure 3182. In this case, each MPA antenna system 3100-1, 3100-2, 3100-3 includes an associated MPA antenna and a subset of the associated interface matrix (sub interface matrix, e.g., 2220H/V, 2420H/V, 2720H/V) and is realized on separate PCBs 3111-1, 3111-2, 3111-3. FIG. 32 is a diagram of an example of MR-MPA antenna system 3200M integrating three MPA antenna systems 3200-1, 3200-2, 3200-3 in an enclosure 3282. In this case, each MPA antenna system 3200-1, 3200-2, 3200-3 includes an associated MPA antenna and a subset of the associated interface matrix (sub interface matrix, e.g., 2220H/V, 2420H/V, 2720H/V) and is realized on separate PCBs 3211-1, 3211-2, 3211-3 Note that in those examples, the MR-WND 201's interface matrix 220 is distributed on multiple components 3100-1, 3100-2, 3100-3 or 3200-1, 3200-2, 3200-3 of the device and further comprises cables between the multiple radios and the connectors on the PCB 3111-j, 3211-j of the associated MPA antenna system 3100-j, 3200-j, where j=1 . . . 3. Further, the MR-WND 201 may comprise multiple enclosures interconnected with cables but at least one enclosure must comprise at least two MPA antenna systems 3100-j, 3200-j. Due to the planar nature of the MPA antennas of the MPA antenna systems 3100-j, 3200-j, the antenna enclosure 3182, 3282's height can be made small. Also, the ability of having multiple MPA antenna systems 3100-j, 3200-j in a single enclosure 3182, 3282 decreases the number of mounting points required for MR-WND 201. Note that if the entire multi-radio wireless network device 201 is integrated in the same enclosure 3182 or 3282 as the antenna systems 3100-j, 3200-j, a single mounting location is required for the entire MR-WND 201 and external cables are eliminated. All those aspects improve the MR-WND aesthetic properties and installation costs. The MR-MPA antenna system 3100M, 3200M can either employ homogeneous MPA antennas (where all MPA antennas have similar beam profile properties) and heterogeneous MPA antennas (where at least some MPA array antennas have different beam profile properties).

To enable simultaneous radio operation of the multiple different radios, is it critical to maintain high isolation between RF signals from the different radios. As indicated before, the first step to ensure that there is sufficient isolation is to configure the radios requiring simultaneous operation such that they transmit and receive RF signals in RF channels in substantially non-overlapping RF bands. We then use the following tools individually or in different combinations to further provide isolation. Those extra isolation tools enable simultaneous operation of radios even in adjacent frequency band. This is useful to maximize the capacity of restricted bands. An example is to operate different radios in the U-NII-1, U-NII-2A, U-NII-2B, U-NII-2C, U-NII-3 and U-NII-4 bands to maximize the utilization of the 5 GHz unlicensed bands.

For sake of clarity, but without limitations, we will describe an arrangement for a MR-WND with two radios, where the first radio always operates in a first band and the second radio always operates in a second band, and the first radio is always interconnected to a first MPA antenna system and the second radio is always interconnected to a second MPA antenna system. The first approach is to design the dual linear polarization planar antenna elements of a MPA antenna of the first MPA antenna system to have a low reflection coefficient in the first frequency band and a high reflection coefficient outside the first band, and to design the dual linear polarization planar antenna elements of a MPA antenna of the second MPA antenna system to have a low reflection coefficient in the second frequency band and a high reflection coefficient outside the second band.

The second approach is to integrate, for the first MPA antenna system, e.g., 3100-1, in its interface matrix between the RF chains of the first radio and the antenna feeds of its MPA antenna, RF filters with low loss in the first frequency band and high rejection outside the first band. Similarly, for the second MPA antenna system, e.g., 3100-2, in its interface matrix between the RF chains of the second radio and its antenna feeds of the second MPA antenna, RF filters with low loss in the second frequency band and high rejection outside the second band are integrated.

A third approach is to take advantage of the fact that the MPA antenna systems 3100-1, 3100-2 or 3200-1, 3200-2 can easily be geometrically separated in the horizontal plane of the enclosure, e.g., 3182 or 3282, to add vertical dividers 3184-1 or 3284-1 between the first and second MPA antenna systems 3100-1, 3100-2 or 3200-1, 3200-2. The dividers 3184-1 or 3284-1 function is to decrease signal leakage from one MPA antenna system to the other. The dividers 3184-1 or 3284-1 may comprise metal sheets and/or RF absorbers, for example.

Each MPA antenna system 3100-j, 3200-j is configured to output a directional beam which intrinsically improves isolation between adjacent MPA antennas systems, e.g., 3100-1, 3100-2 or 3200-1, 3200-2. To further increase this isolation, a fourth approach is to maximize the distance between MPA antenna systems 3100-*j*, 3200-*j* designed to operate in the closest frequency band. That is, the distance between MPA antenna systems 3100-*j*, 3200-*j* should be monotonically decreasing as a function of the frequency separation between the bands in which the respective dual linear polarization planar antenna elements of MPA antennas of the MPA antenna systems 3100-*j*, 3200-*j* have low reflection coefficient.

Figure 33:
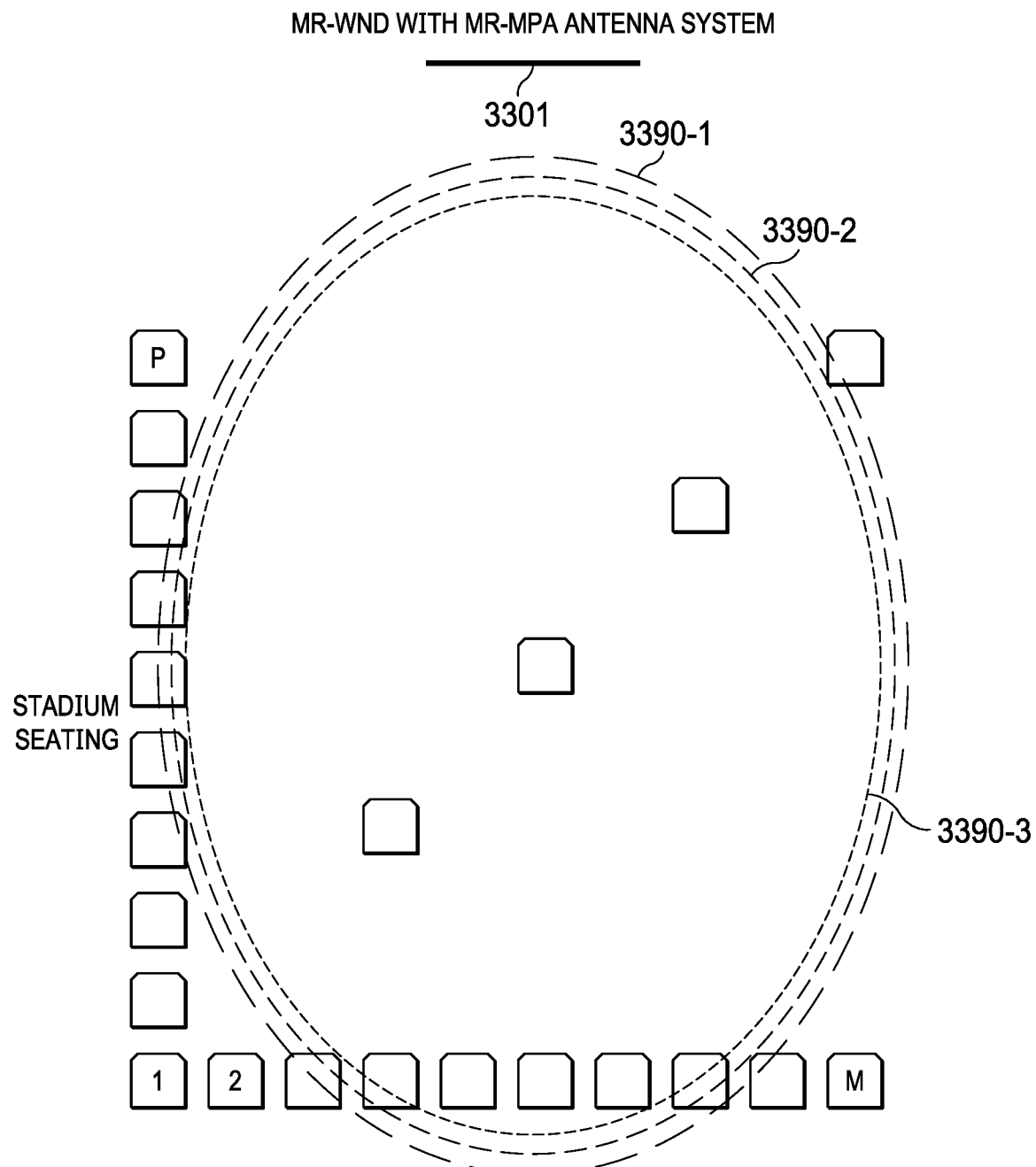
FIGS. 33-37 show coverage areas accomplished for different configurations of MR-MPA antenna systems from FIGS. 31-32.

We will now discuss the coverage flexibility, e.g., in a seating section of a stadium, arena, etc., offered by the proposed MR-MPA antenna architecture. FIG. 33 shows an MR-WND 3301 which uses the first, second and third MPA antenna systems 3100-1, 3100-2, 3100-3 interconnected to radio one, two and three, respectively, such that each MPA antenna system 3100-1, 3100-2, 3100-3 is a homogeneous realization of the MPA antenna system 2800 (similar radiation pattern beamwidth, gain and maximum gain direction), except for the fact that they are designed for the different operating bands of the radios. In this case, the coverage areas 3390-1, 3390-2, 3390-3 for the three radios in the MR-WND 3301 are completely overlapping, as illustrated in FIG. 33. The advantage provided by the MR-MPA antenna system of the MR-WND 3301 is multi-fold. First, this MR-WND 3301 with MR-MPA antenna system enables multiple radios to simultaneously operate in different bands to increase the offered capacity in a narrow directional coverage area. For example, this architecture enables multiple radios to simultaneously transmit and receive in different bands of the 5 GHz unlicensed spectrum, thereby increasing the available capacity delivered by a wireless network device in this unlicensed spectrum from a long distance to a seating section of a stadium. Another advantage is that the services offered by the different radios can be different and/or could use different transmission technologies and protocols. Therefore, a single MR-WND 3301 can be used to deliver those different services or wireless access networks to a given coverage area 3390-1, 3390-2, 3390-3. Another advantage is that the number of mounting locations required to offer this extended capacity or multiple services is greatly reduced by integrating the multiple MPA antenna systems 3100-1, 3100-2, 3100-3 in a single enclosure 3182.

Figure 34:
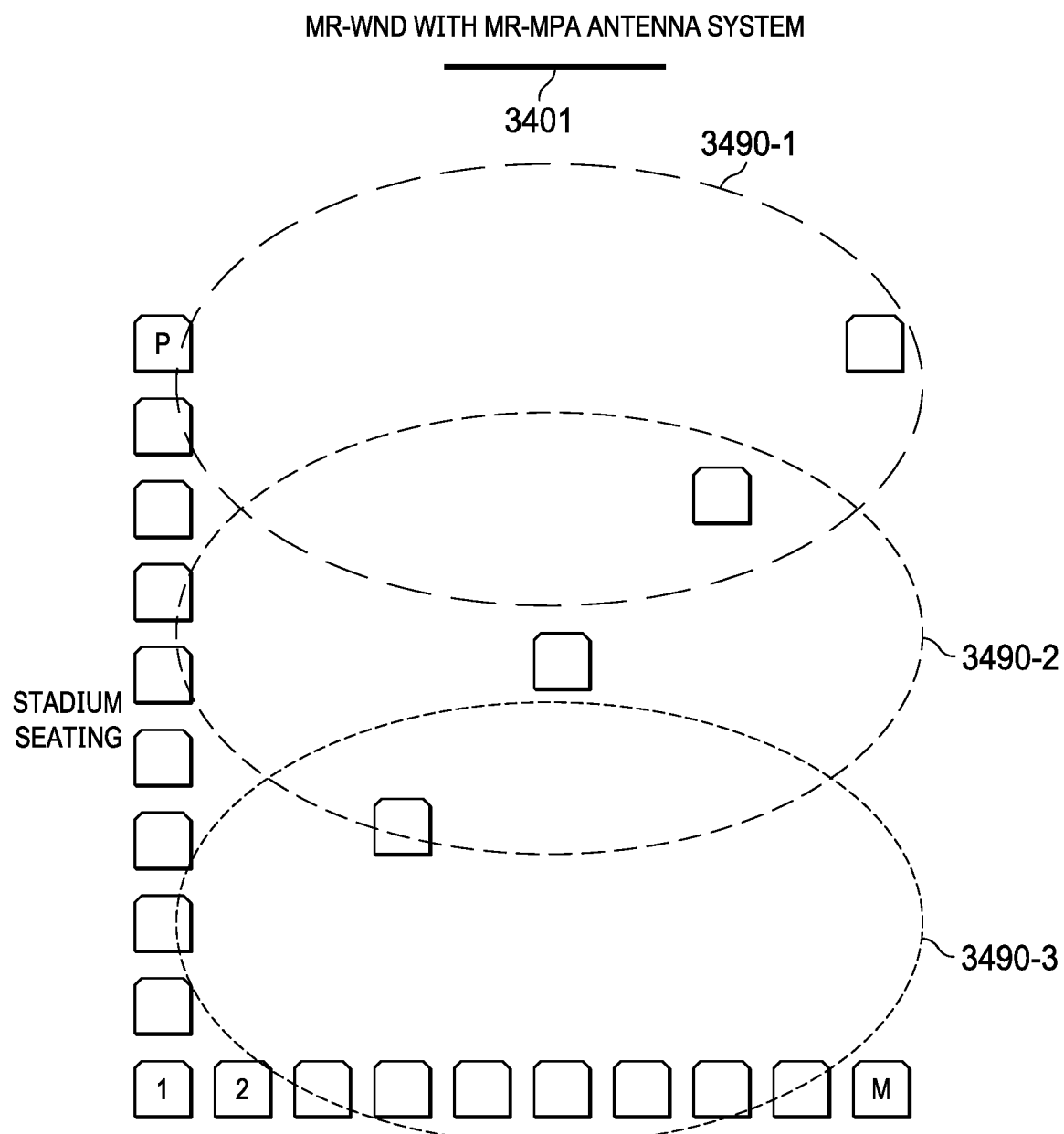

In other cases, the wireless network designer may want to increase the gain of the MPA antennas to be able to cover a given area from a farther distance or with a better signal quality. This has the effect of reducing the radiation pattern beamwidth and therefore decreasing the area covered by the MR-WND. However, the proposed MR-MPA antenna system enables the use of heterogeneous MPA antennas. FIG. 34 shows an MR-WND 3401 which uses the three MPA antenna systems 3100-1, 3100-2, 3100-3 interconnected to radio one, two and three, respectively, such MPA antenna systems 3100-1, 3100-2, 3100-3 are different realizations of the MPA antenna system 2800, where each MPA antenna system 3100-1, 3100-2, 3100-3 has a similar beamwidth and gain, but a different direction in elevation for maximum gain. Then, as illustrated in FIG. 34, the capacity offered by the MR-WND 3401 is spread across a larger area. That is, the architecture in this case is used to extend the coverage areas 3490-1, 3490-2, 3490-3 with high gain, versus the MR-WND 3301, where the capacity in the coverage area with high gain is increased.

Figure 35:
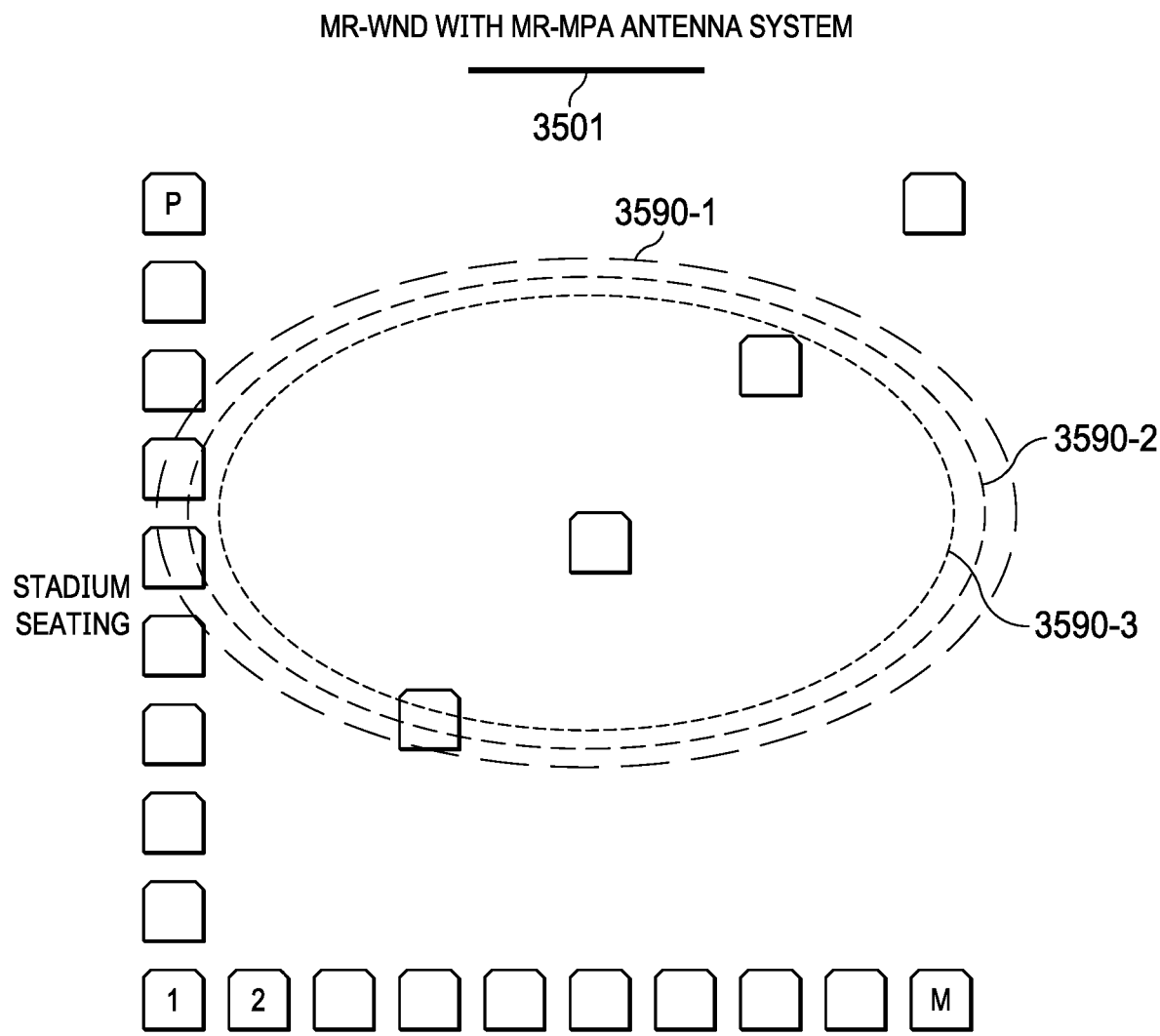

A novel level of flexibility can be achieved with the proposed MR-MPA antenna system when one or more of the MPA antenna systems enable the reconfiguration via the MR-MPA antenna system interface matrix of the radio coverage. For example, FIG. 35 shows an MR-WND 3501 which uses the three MPA antenna systems 3100-1, 3100-2, 3100-3 interconnected to radio one, two and three, respectively, where each radio has four RF chains. Here, the MPA antenna systems 3100-1, 3100-2, 3100-3 are similar realization of the Butler matrix based MPA antenna system 3000, except for the fact that they are designed for the different operating bands of the radios. In this example, the sub interface matrix associated with each MPA antenna system 3100-1, 3100-2, 3100-3 can be independently configured to interconnect or disconnect the RF chains with different MPA antenna ports. It then become possible to, in one instance, configure the interface matrix such that each radio offers wireless services in different areas 3490-1, 3490-2, 3490-3 to extend the service area of the MR-WND 3401 or all radios offer wireless services in the same coverage area 3590-1, 3590-2, 3590-3 to increase the offering capacity as illustrated in FIG. 35. Therefore, the same MR-WND 3501 can be reconfigured as a function of the instantaneous requirements to either extend the coverage area 3490-1, 3490-2, 3490-3 with high gain or increase the capacity in the coverage area 3590-1, 3590-2, 3590-3.

Figure 36:
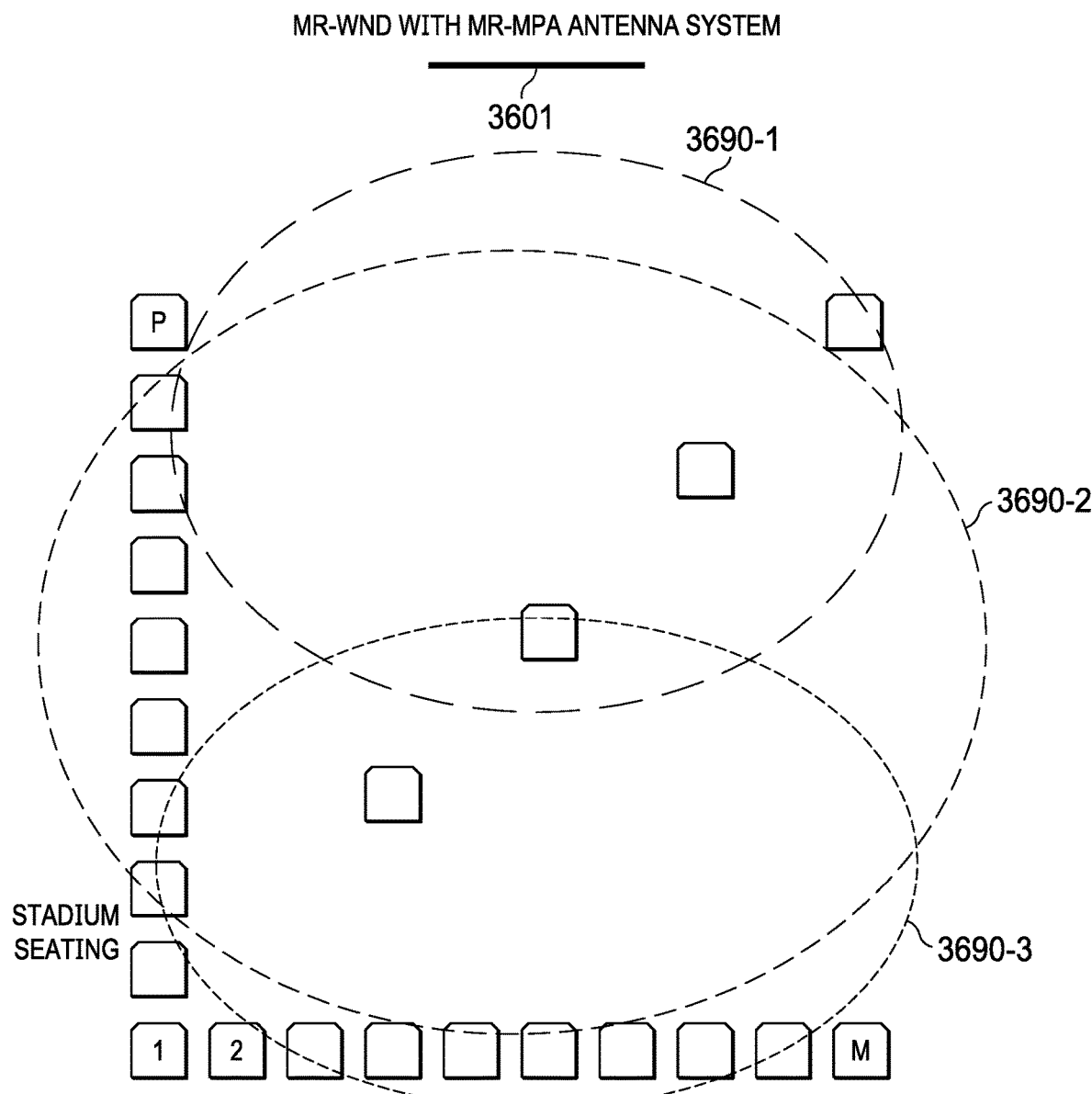
Figure 37:
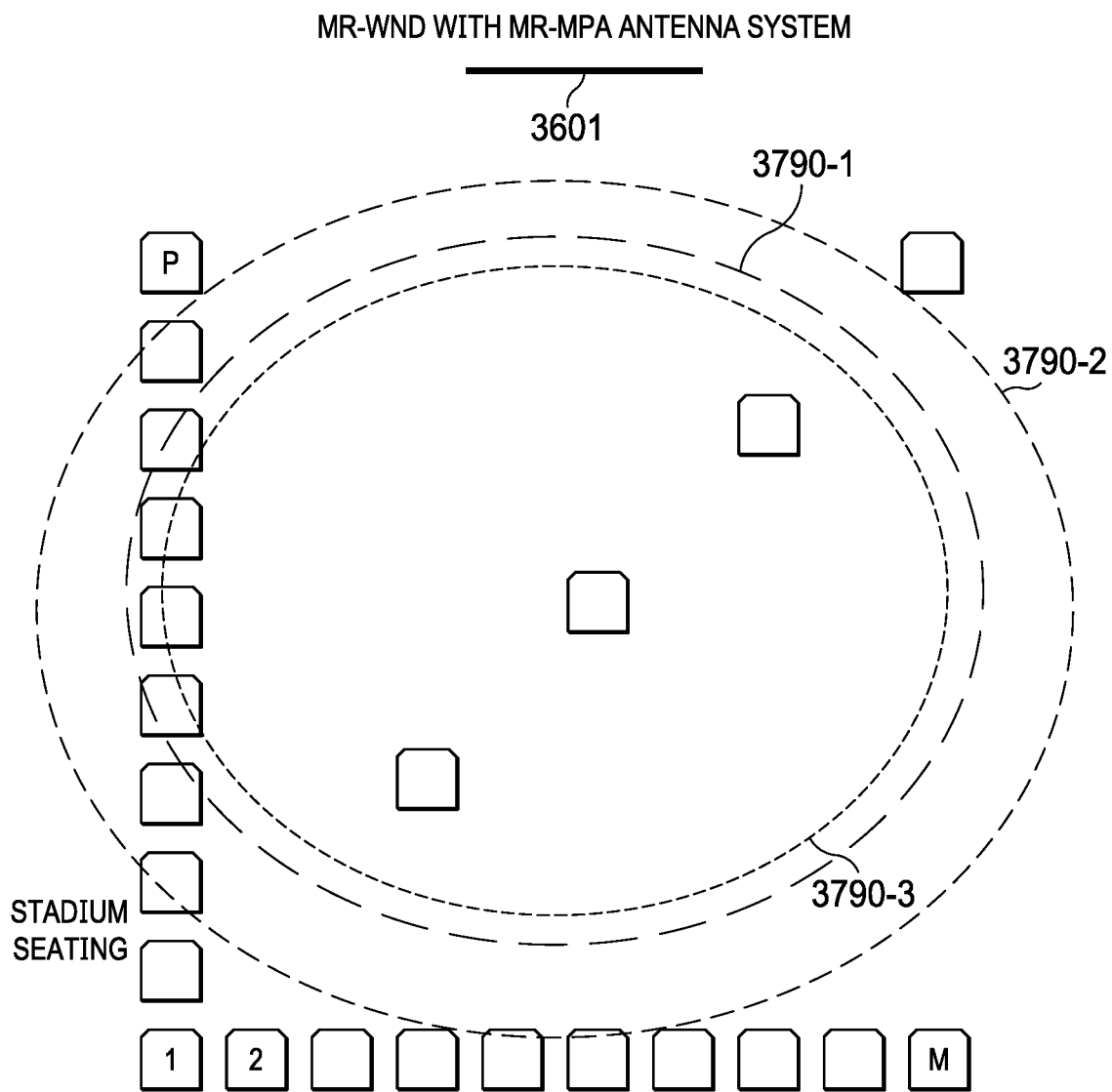

In several wireless network deployments it might be advantageous to have dissimilar characteristics for the coverage area of the radios. For example, this can be useful to extend coverage 3490-1, 3490-2, 3490-3, as discussed in the previous two examples and illustrated in FIG. 34, but also to offer softer coverage transitions between radios within a MR-WND and between adjacent MR-WND's to optimize user load balancing and roaming. In the previous examples, we assumed that all array antennas in an enclosure 3182, 3282 have similar beamwidth characteristics. The interface matrix could be used to independently change each radio coverage width by disconnecting some RF chains from antenna feeds. However, an additional approach is to integrate in the enclosure 3182, 3282 MPA antenna systems with different beamwidth characteristics. FIGS. 36 and 37 shows an MR-WND 3601 which uses the MPA antenna systems 3200-1 and 3200-2 in the MR-MPA system 3200M interconnected to radio one and two respectively, where each radio has four RF chains. Here, the MPA antenna systems 3200-1, 3200-2 are similar realization of the Butler matrix based MPA antenna system 3000 except for the fact that they are designed for the different operating bands of the radios. The MPA antenna system 3200-3 in the MR-MPA system 3200M is interconnected to radio three, where radio three has four RF chains, is a realization of the MPA antenna system 2900. Because the MPA antenna systems 3200-1, 3200-2, 3200-3 are oriented in different directions and have different architecture, it can be realized that the coverage areas 3790-1, 3790-2, 3790-3 of the different radios will be as illustrated in FIG. 37 when the interface matrix is configured such that MPA antenna system 3200-1 and MPA antenna system 3200-2 radiate at broadside. Further, it is possible to change the interface matrix configuration as a function of various parameters such that MPA antenna system 3200-1 and MPA antenna system 3200-2 radiate in different directions to extend the coverage areas 3690-1, 3690-2, 3690-3 achieved by the MR-WND 3601 as shown in FIG. 36.

Somebody skilled in the art can easily extend the embodiment to different number of radios, RF chains, multiple multi-port antennas, type of multi-port antennas, etc. In particular, the different MPA antenna systems discussed previously can be integrated in different combinations in this disclosed MR-MPA antenna system.

Somebody skilled in the art can appreciate that by appropriately selecting and designing the MPA antennas, the radios and operating bands, the interface matrix configuration, and other components of the MR-WND, it is possible to achieve a new level of flexibility in offering high throughput services in UHD environments where narrow directional coverage is required. One can thus appreciate the significant and unique benefits provided by the disclosed MR-MPA antenna system over state-of-the-art antenna systems in wireless network devices.

One can appreciate that in combination the disclosed multi-radio multi-segment multi-port antenna system and multi-radio multi-port array antenna system achieve all desired and optional features for a MR-WND antenna system in UHD environments. The disclosed antenna systems therefore provide great benefits over state-of-the-art systems for the design and operation of high capacity multi service wireless networks in UHD environments.

In general, innovative aspects of the technologies described herein can be implemented in wireless-access points that include one or more of the following aspects:

In general aspect 1, a wireless-access point comprises a first radio comprising at least two first radio-chain circuitry each configured to transmit respective radio frequency (RF) signals in a first channel; a second radio comprising at least two second radio-chain circuitry each configured to transmit, simultaneously to transmissions of the RF signals by the first radio, respective RF signals in a second channel which is non-overlapping with the first channel; and a plurality of planar antennas coupled with corresponding first radio-chain circuitry and second radio-chain circuitry to receive the RF signals. A first planar antenna is coupled with a first radio-chain circuitry of the first radio to receive therefrom a first RF signal in the first channel, the first planar antenna being arranged with its normal along a first direction, and configured to radiate the first RF signal along the first direction. A second planar antenna is coupled with a second radio-chain circuitry of the first radio to receive therefrom a second RF signal in the first channel, the second planar antenna being arranged with its normal along a second direction different from the first direction, and configured to radiate the second RF signal along the second direction. And, a third planar antenna is coupled with a third radio-chain circuitry of the second radio to receive therefrom a third RF signal in the second channel, the third planar antenna being arranged with its normal along a third direction, and configured to radiate the third RF signal along the third direction.

Aspect 2 according to aspect 1, wherein the normal of the third planar antenna is parallel to the normal of the first planar antenna.

Aspect 3 according to aspect 1 or 2, wherein the wireless-access point comprises a printed circuit board (PCB), wherein both the first planar antenna and the third planar antenna are printed on the PCB.

Aspect 4 according to any one of aspects 1 to 3, wherein each of the first planar antenna, the second planar antenna and the third planar antenna comprises a microstrip patch antenna.

Aspect 5 according to any one of aspects 1 to 3, wherein the first planar antenna comprises a first dual linear polarization microstrip patch antenna having a first feed and a second feed, the first feed coupled with the first radio-chain circuitry of the first radio to receive therefrom the first RF signal, and the second feed coupled with a fourth radio-chain circuitry of the first radio to receive therefrom a fourth RF signal, the first dual linear polarization microstrip patch antenna being configured to simultaneously radiate, along the first direction, the first RF signal and the fourth RF signal as a first pair of mutually orthogonally polarized beams; the second planar antenna comprises a second dual linear polarization microstrip patch antenna having a third feed and a fourth feed, the third feed coupled with the second radio-chain circuitry of the first radio to receive therefrom the second RF signal, and the fourth feed coupled with a fifth radio-chain circuitry of the first radio to receive therefrom a fifth RF signal, the second dual linear polarization microstrip patch antenna being configured to simultaneously radiate, along the second direction, the second RF signal and the fifth RF signal as a second pair of mutually orthogonally polarized beams; and the third planar antenna comprises a third dual linear polarization microstrip patch antenna having a fifth feed and a sixth feed, the fifth feed coupled with the third radio-chain circuitry of the second radio to receive therefrom the third RF signal, and the sixth feed coupled with a sixth radio-chain circuitry of the second radio to receive therefrom a sixth RF signal, the third dual linear polarization micro strip patch antenna being configured to simultaneously radiate, along the third direction, the third RF signal and the sixth RF signal as a third pair of mutually orthogonally polarized beams.

Aspect 6 according to aspect 5, wherein the normal of the third dual linear polarization microstrip patch antenna is parallel to the normal of the first dual linear polarization microstrip patch antenna.

Aspect 7 according to aspect 6, wherein the third dual linear polarization microstrip patch antenna is rotated relative to the first dual linear polarization microstrip patch antenna by an acute angle, such that a polarization of one of the third pair of mutually orthogonally polarized beams radiated by the third antenna is tilted by the acute angle relative to a polarization of a corresponding one of the first pair of mutually orthogonally polarized beams radiated by the first antenna.

Aspect 8 according to any one of aspects 1 to 7, wherein the wireless-access point comprises interface matrix circuitry coupled between the plurality of planar antennas and the at least two first radio-chain circuitry of the first radio, and the at least two second radio-chain circuitry of the second radio. Here, the interface matrix circuitry is configured to selectively transmit an RF signal from any one of the at least two first radio-chain circuitry of the first radio to none, one or multiple ones of the plurality of planar antennas, and selectively transmit, independently of the transmissions of RF signals by the first radio, an RF signal from any one of the at least two second radio-chain circuitry of the second radio to none, one or multiple ones of the plurality of planar antennas.

Aspect 9 according to any one of aspects 1 to 8, wherein the first antenna has a first reflection coefficient configured such that a first value of the first reflection coefficient at RF frequencies of the first channel is smaller by a first predetermined factor than a second value of the first reflection coefficient at RF frequencies of the second channel; and the third antenna has a third reflection coefficient, such that a first value of the third reflection coefficient at RF frequencies of the second channel is smaller by a second predetermined factor than a second value of the second reflection coefficient at RF frequencies of the first channel.

Aspect 10 according to aspect 9, wherein each of the first predetermined factor and the second predetermined factor is between 2 and 10, and each of the second value of the first reflection coefficient and the second value of the second reflection coefficient is between 0.85 and 0.99.

Aspect 11 according to aspect 9, wherein the first predetermined factor is the same as the second predetermined factor.

Aspect 12 according to any one of aspects 1 to 11, wherein the first channel belongs to a first operating frequency band, the second channel belongs to a second operating frequency band, and the first operating frequency band and second operating frequency band are in the 5 GHz unlicensed bands.

Aspect 13 according to any one of aspects 1 to 12, wherein the wireless access point comprises first RF filter circuitry coupled between the two or more first radio-chain circuitry of the first radio and the plurality of planar antennas, wherein the first RF filter circuitry are configured to reject RF signals at the RF frequencies of the second channel of the second radio; and second RF filter circuitry coupled between the two or more second radio-chain circuitry of the second radio and the plurality of planar antennas, wherein the second RF filter circuitry are configured to reject RF signals at the RF frequencies of the first channel of the first radio.

In general aspect 14, a wireless-access point comprises a first radio comprising first radio-chain circuitry configured to transmit a first radio frequency (RF) signal in a first channel; a second radio comprising second radio-chain circuitry configured to transmit, simultaneously to transmissions of the first RF signal by the first radio, a second RF signal in a second channel which is non-overlapping with the first channel; a first antenna coupled to the first radio-chain circuitry of the first radio to radiate the first RF signal, wherein the first antenna has a first reflection coefficient configured such that a first value of the first reflection coefficient at RF frequencies of the first channel is smaller by a first predetermined factor than a second value of the reflection coefficient at RF frequencies of the second channel; and a second antenna coupled to the second radio-chain circuitry of the second radio to radiate the second RF signal, wherein the second antenna has a second reflection coefficient configured such that a first value of the second reflection coefficient at RF frequencies of the second channel is smaller by a second predetermined factor than a second value of the second reflection coefficient at RF frequencies of the first channel.

Aspect 15 according to aspect 14, wherein the first channel belongs to a first operating frequency band, and the second channel belongs to a second operating frequency band that is adjacent to the first operating frequency band.

Aspect 16 according to aspect 14, wherein the first channel belongs to a first operating frequency band, the second channel belongs to a second operating frequency band, and the first operating frequency band and second operating frequency band are in the 5 GHz unlicensed bands.

Aspect 17 according to any one of aspects 14 to 16, wherein the first antenna comprises a first planar antenna formed on a first printed circuit board (PCB), and the second antenna comprises a second planar antenna formed on a second PCB different from the first PCB.

Aspect 18 according to any one of aspects 14 to 16, wherein the first antenna comprises a first planar antenna formed on a printed circuit board (PCB), and the second antenna comprises a second planar antenna formed on the same PCB as the first planar antenna.

Aspect 19 according to any one of aspects 14 to 18, wherein the first antenna comprises a first microstrip patch antenna having a first width and a first length configured to cause the first value of the first reflection coefficient at RF frequencies of the first channel to be smaller by the first predetermined factor than the second value of the first reflection coefficient at RF frequencies of the second channel, and the second antenna comprises a second microstrip patch antenna having a second width and a second length configured to cause the first value of the second reflection coefficient at RF frequencies of the second channel to be smaller by the second predetermined factor than the second value of the second reflection coefficient at RF frequencies of the first channel.

Aspect 20 according to aspect 19, wherein the first radio comprises third radio-chain circuitry configured to transmit, simultaneously to transmissions of the first RF signal by the first radio and the second RF signal by the second radio, a third RF signal in the first channel; the second radio comprises fourth radio-chain circuitry configured to transmit, simultaneously to transmissions of the first RF signal and the third RF signal by the first radio and the second RF signal by the second radio, a fourth RF signal in the second channel; the first microstrip patch antenna comprises a first dual linear polarization microstrip patch antenna having a first feed and a second feed, the first feed being coupled with the first radio-chain circuitry to receive the first RF signal therefrom and the second feed being coupled with the third radio-chain circuitry to receive the third RF signal therefrom, the first micro strip patch antenna configured to simultaneously radiate the first RF signal as a first beam having a first polarization and the third RF signal as a third beam having a third polarization orthogonal to the first polarization; and the second microstrip patch antenna comprises a second dual linear polarization microstrip patch antenna having a third feed and a fourth feed, the third feed being coupled with the second radio-chain circuitry to receive the second RF signal therefrom and the fourth feed being coupled with the fourth radio-chain circuitry to receive the fourth RF signal therefrom, the second microstrip patch antenna configured to simultaneously radiate the second RF signal as a second beam having a second polarization and the fourth RF signal as a fourth beam having a fourth polarization orthogonal to the second polarization.

Aspect 21 according to any one of aspects 14 to 20, wherein wireless-access point comprises a plurality of instances of the first antenna, each of the instances of the first antenna being coupled to the first radio-chain circuitry of the first radio; and a plurality of instances of the second antenna, each of the instances of the second antenna being coupled to the second radio-chain circuitry of the second radio.

Aspect 22 according to aspect 21, wherein the instances of the first antenna are arranged as a first array, and the instances of the second antenna are arranged as a second array, and at least one of the first array or the second array is a linear array.

Aspect 23 according to aspect 21, wherein the instances of the first antenna are spaced apart by between 0.4 to 0.6 of a first wavelength corresponding to the first channel, and the instances of the second antenna are separated by between 0.4 to 0.6 of a second wavelength corresponding to the second channel.

Aspect 24 according to aspect 21, wherein the wireless-access point comprises an enclosure arranged and configured to encompass the plurality of instances of the first antenna and the plurality of instances of the second antenna.

Aspect 25 according to any one of aspects 14 to 24, wherein each of the first predetermined factor and the second predetermined factor is between 2 and 10.

Aspect 26 according to aspect 25, wherein each of the first predetermined factor and the second predetermined factor is between 2 and 3; and each of the second value of the first reflection coefficient and the second value of the second reflection coefficient is between 0.85 and 0.99.

Aspect 27 according to any one of aspects 14 to 26, wherein the first predetermined factor is the same as the second predetermined factor.

Aspect 28 according to any one of aspects 14 to 27, wherein the wireless access point comprises a first RF filter coupled between first radio-chain circuitry of the first radio and the first antenna, wherein the first RF filter is configured to reject RF signals at the RF frequencies of the second channel of the second radio; and a second RF filter coupled between second radio-chain circuitry of the second radio and the second antenna, wherein the second RF filter is configured to reject RF signals at the RF frequencies of the first channel of the first radio.

In general aspect 29, a wireless-access point comprises a radio comprising at least two radio-chain circuitry each configured to transmit respective radio frequency (RF) signals; and at least two planar antennas coupled with corresponding radio-chain circuitry to receive the RF signals. A first planar antenna is coupled with a first radio-chain circuitry to receive therefrom a first RF signal, the first planar antenna being arranged with its normal along a first direction, and configured to radiate the first RF signal along the first direction. And, a second planar antenna is coupled with a second radio-chain circuitry to receive therefrom a second RF signal, the second planar antenna being arranged with its normal along a second direction different from the first direction, and configured to radiate the second RF signal along the second direction.

Aspect 30 according to aspect 29, wherein the first planar antenna comprises a first microstrip patch antenna, and the second planar antenna comprises a second microstrip patch antenna.

Aspect 31 according to aspect 29 or 30, wherein the first planar antenna comprises a first dual linear polarization microstrip patch antenna having a first feed and a second feed, the first feed coupled with the first radio-chain circuitry to receive therefrom the first RF signal, and the second feed coupled with a third radio-chain circuitry to receive therefrom a third RF signal, the first dual linear polarization microstrip patch antenna being configured to simultaneously radiate, along the first direction, the first RF signal and the third RF signal as a first pair of mutually orthogonally polarized beams; and the second planar antenna comprises a second dual linear polarization microstrip patch antenna having a third feed and a fourth feed, the third feed coupled with the second radio-chain circuitry to receive therefrom the second RF signal, and the fourth feed coupled with a fourth radio-chain circuitry to receive therefrom a fourth RF signal, the second dual linear polarization micro strip patch antenna being configured to simultaneously radiate, along the second direction, the second RF signal and the fourth RF signal as a second pair of mutually orthogonally polarized beams.

Aspect 32 according to aspect 31, wherein a third dual linear polarization microstrip patch antenna has a fifth feed and a sixth feed, the fifth feed coupled with a fifth radio-chain circuitry to receive therefrom a fifth RF signal, and the sixth feed coupled with a sixth radio-chain circuitry to receive therefrom a sixth RF signal, the third dual linear polarization microstrip patch antenna being arranged with its normal along a third direction different from each of the first direction and the second direction, and configured to simultaneously radiate, along the third direction, the fifth RF signal and the sixth RF signal as a third pair of mutually orthogonally polarized beams; and a fourth dual linear polarization microstrip patch antenna has a seventh feed and an eight feed, the seventh feed coupled with a seventh radio-chain circuitry to receive therefrom a seventh RF signal, and the eight feed coupled with an eight radio-chain circuitry to receive therefrom an eight RF signal, the fourth dual linear polarization microstrip patch antenna being arranged with its normal along a fourth direction different from each of the first direction, the second direction and the third direction, and configured to simultaneously radiate, along the fourth direction, the seventh RF signal and the eight RF signal as a fourth pair of mutually orthogonally polarized beams.

Aspect 33 according to any one of aspects 29 to 32, wherein the second RF signal is another instance of the first signal, and both the first planar antenna and the second planar antenna are coupled with the first radio-chain circuitry to receive therefrom the first RF signal.

Aspect 34 according to any one of aspects 29 to 33, wherein the wireless-access point comprises interface matrix circuitry coupled between the at least two planar antennas and the at least two radio-chain circuitry, the interface matrix circuitry configured to selectively transmit an RF signal from any one of the at least two radio-chain circuitry to none, one or multiple ones of the at least two planar antennas.

In general aspect 35, a wireless-access point comprises a radio comprising at least two radio-chain circuitry each configured to transmit respective radio frequency (RF) signals; a printed circuit board (PCB); and a plurality of planar antennas printed on the PCB. A first set of at least two planar antennas from among the plurality of planar antennas is coupled with first radio-chain circuitry to receive therefrom a first RF signal, the planar antennas of the first set being arranged and configured to radiate, along a first direction, the first RF signal as a first beam having a first beamwidth. And, a second set of at least two planar antennas from among the plurality of planar antennas is coupled with second radio-chain circuitry to receive therefrom a second RF signal, the planar antennas of the second set being arranged and configured to radiate, along a second direction different from the first direction, the second RF signal as a second beam having a second beamwidth.

Aspect 36 according to aspect 35, wherein the first set of at least two planar antennas and the second set of at least two planar antennas are disjoint sets.

Aspect 37 according to aspect 35, wherein the first set of at least two planar antennas and the second set of at least two planar antennas have at least one common planar antenna.

Aspect 38 according to any one of aspects 35 to 37, wherein the first set of at least two planar antennas and the second set of at least two planar antennas have different number of planar antennas.

Aspect 39 according to any one of aspects 35 to 38, wherein the first set of at least two planar antennas and the second set of at least two planar antennas have the same number of planar antennas.

Aspect 40 according to any one of aspects 35 to 39, wherein the radio is configured to transmit RF signals in a particular channel, and the first set of at least two planar antennas and the second set of at least two planar antennas are spaced apart by between 0.4 and 0.6 of a wavelength corresponding to the particular channel.

Aspect 41 according to any one of aspects 35 to 40, wherein the plurality of planar antennas comprises microstrip patch antennas.

Aspect 42 according to any one of aspects 35 to 40, wherein the plurality of planar antennas comprises dual linear polarization microstrip patch antennas, each having a first feed and a second feed; the first feed of each of the dual linear polarization microstrip patch antennas of the first set being coupled with the first radio-chain circuitry to receive therefrom the first RF signal, and the second feed of each of the dual linear polarization microstrip patch antennas of the first set being coupled with a third radio-chain circuitry to receive therefrom a third RF signal, the first set of two or more dual linear polarization microstrip patch antennas being configured to simultaneously radiate, along the first direction, the first RF signal and the third RF signal as a first pair of mutually orthogonally polarized beams; and the first feed of each of the dual linear polarization micro strip patch antennas of the second set being coupled with the second radio-chain circuitry to receive therefrom the second RF signal, and the second feed of each of the dual linear polarization micro strip patch antennas of the second set being coupled with a fourth radio-chain circuitry to receive therefrom a fourth RF signal, the second set of two or more dual linear polarization microstrip patch antennas being configured to simultaneously radiate, along the second direction, the second RF signal and the fourth RF signal as a second pair of mutually orthogonally polarized beams.

Aspect 43 according to any one of aspects 35 to 42, wherein the wireless-access point comprises a feeding network coupled between the plurality of planar antennas and the at least two radio-chain circuitry, the feeding network configured to selectively transmit an RF signal from any one of the at least two radio-chain circuitry to different sets of at least two planar antennas from among the plurality of planar antennas.

Aspect 44 according to any one of aspects 35 to 42, wherein the wireless-access point comprises a feeding network coupled between the plurality of planar antennas and the at least two radio-chain circuitry, the feeding network configured to selectively transmit an RF signal from any one of the at least two radio-chain circuitry to a single set of at least two planar antennas from among the plurality of planar antennas. Here, a first transmission corresponds to a first phase distribution of the RF signal, and a second transmission corresponds to a second phase distribution of the RF signal.

Aspect 45 according to aspect 44, wherein the feeding network comprises a Butler matrix.

In general aspect 46, a wireless-access point comprises a radio comprising at least two radio-chain circuitry each configured to transmit respective radio frequency (RF) signals; horizontal polarization coupling circuitry and vertical polarization coupling circuitry; and a plurality of dual linear polarization microstrip patch antennas, each having a horizontal polarization feed and a vertical polarization feed. Each of the horizontal polarization feed of a first dual linear polarization microstrip patch antenna and the horizontal polarization feed of a second dual linear polarization microstrip patch antenna is coupled through the horizontal polarization coupling circuitry with first radio-chain circuitry to receive therefrom a first RF signal, and each of the vertical polarization feed of the first dual linear polarization microstrip patch antenna and the vertical polarization feed of the second dual linear polarization microstrip patch antenna is coupled through the vertical polarization coupling circuitry with second radio-chain circuitry to receive therefrom a second RF signal, the first dual linear polarization microstrip patch antenna and the second dual linear polarization microstrip patch antenna being arranged and configured to cooperatively radiate, along a first direction, the first RF signal as a first horizontally polarized beam, and cooperatively radiate, along the first direction, the second RF signal as a second vertically polarized beam. The horizontal polarization coupling circuitry comprises a horizontal polarization Butler matrix with multiple input ports and multiple output ports; a horizontal polarization interface matrix coupled to the at least two radio-chain circuitry and to the input ports of the horizontal polarization Butler matrix, the horizontal polarization interface matrix configured to receive from the first radio-chain circuitry the first RF signal, and to selectively provide the first RF signal to a first input port of the horizontal polarization Butler matrix; a first horizontal polarization interconnection feeding network coupled to a first output port of the horizontal polarization Butler matrix to receive the first RF signal, and a second horizontal polarization interconnection feeding network coupled to a second output port of the horizontal polarization Butler matrix to receive the first RF signal, and a first horizontal polarization row feeding network coupled to the first horizontal polarization interconnection feeding network to receive the first RF signal and to the horizontal polarization feed of the first dual linear polarization microstrip patch antenna to provide thereto the first RF signal, and a second horizontal polarization row feeding network coupled to the second horizontal polarization interconnection feeding network to receive the first RF signal and to the horizontal polarization feed of the second dual linear polarization microstrip patch antenna to provide thereto the first RF signal. And the vertical polarization coupling circuitry comprises a vertical polarization Butler matrix with multiple input ports and multiple output ports; a vertical polarization interface matrix coupled to the at least two radio-chain circuitry and to the input ports of the vertical polarization Butler matrix, the vertical polarization interface matrix configured to receive from the second radio-chain circuitry the second RF signal, and to selectively provide the second RF signal to a first input port of the vertical polarization Butler matrix; a first vertical polarization interconnection feeding network coupled to a first output port of the vertical polarization Butler matrix to receive the second RF signal, and a second vertical polarization interconnection feeding network coupled to a second output port of the vertical polarization Butler matrix to receive the second RF signal; and a first vertical polarization row feeding network coupled to the first vertical polarization interconnection feeding network to receive the second RF signal and to the vertical polarization feed of the first dual linear polarization microstrip patch antenna to provide thereto the second RF signal, and a second vertical polarization row feeding network coupled to the second vertical polarization interconnection feeding network to receive the second RF signal and to the vertical polarization feed of the second dual linear polarization microstrip patch antenna to provide thereto the second RF signal.

Aspect 47 according to aspect 46, wherein each of the horizontal polarization feed of the first dual linear polarization micro strip patch antenna and the horizontal polarization feed of the second dual linear polarization microstrip patch antenna is coupled through the horizontal polarization coupling circuitry with third radio-chain circuitry to receive therefrom a third RF signal, and each of the vertical polarization feed of the first dual linear polarization microstrip patch antenna and the vertical polarization feed of the second dual linear polarization microstrip patch antenna is coupled through the vertical polarization coupling circuitry with fourth radio-chain circuitry to receive therefrom a fourth RF signal, the first dual linear polarization microstrip patch antenna and the second dual linear polarization microstrip patch antenna being arranged and configured to cooperatively radiate, along a second direction, the third RF signal as a third horizontally polarized beam, and cooperatively radiate, along the second direction, the fourth RF signal as a fourth vertically polarized beam, wherein the first dual linear polarization microstrip patch antenna and the second dual linear polarization microstrip patch antenna cooperatively radiate the third beam and the fourth beam at the same time when they cooperatively radiate the first beam and the second beam. The horizontal polarization interface matrix is configured to receive from the third radio-chain circuitry the third RF signal, and to selectively provide the third RF signal to a second input port of the horizontal polarization Butler matrix; and the vertical polarization interface matrix is configured to receive from the fourth radio-chain circuitry the fourth RF signal, and to selectively provide the fourth RF signal to a second input port of the vertical polarization Butler matrix. The first horizontal polarization interconnection feeding network to receive the third RF signal from the first output port of the horizontal polarization Butler matrix, and the second horizontal polarization interconnection feeding network to receive the third RF signal from the second output port of the horizontal polarization Butler matrix; and the first vertical polarization interconnection feeding network to receive the fourth RF signal from the first output port of the vertical polarization Butler matrix, and the second vertical polarization interconnection feeding network to receive the fourth RF signal from the second output port of the vertical polarization Butler matrix. The first horizontal polarization row feeding network to receive the third RF signal from the first horizontal polarization interconnection feeding network and to provide the third RF signal to the horizontal polarization feed of the first dual linear polarization microstrip patch antenna, and the second horizontal polarization row feeding network to receive the third RF signal from the second horizontal polarization interconnection feeding network and to provide it to the horizontal polarization feed of the second dual linear polarization microstrip patch antenna; and the first vertical polarization row feeding network to receive the fourth RF signal from the first vertical polarization interconnection feeding network and to provide the fourth RF signal to the vertical polarization feed of the first dual linear polarization microstrip patch antenna, and the second vertical polarization row feeding network coupled to receive the fourth RF signal from the second vertical polarization interconnection feeding network and provide the fourth RF signal to the vertical polarization feed of the second dual linear polarization microstrip patch antenna.

Aspect 48 according to aspect 46 or 47, wherein each of the horizontal polarization interface matrix and the vertical polarization interface matrix comprises one or more switches configured to change inputs of the corresponding horizontal polarization Butler matrix and vertical polarization Butler matrix input ports to which RF signals are selectively provided.

Aspect 49 according to any one of aspects 46 to 48, wherein each of the horizontal polarization interconnection feeding networks and vertical polarization interconnection feeding networks comprises one or more attenuator/gain circuitry and one or more delay circuitry to condition the RF signals provided to the corresponding dual linear polarization microstrip patch antennas.

Aspect 50 according to any one of aspects 46 to 49, wherein each of the first dual linear polarization microstrip patch antenna and the second dual linear polarization microstrip patch antenna comprises two or more instances of itself arranged in a row.

In general aspect 51, a wireless-access point comprises a first radio comprising first radio-chain circuitry configured to transmit radio frequency (RF) signals in a first channel; a second radio comprising second radio-chain circuitry configured to transmit, simultaneously to transmissions of the RF signals by the first radio, respective RF signals in a second channel which is non-overlapping with the first channel; and a plurality of antennas coupled with corresponding first radio-chain circuitry and second radio-chain circuitry to receive the RF signals. A first set of at least two antennas from among the plurality of antennas is coupled with the first radio-chain circuitry of the first radio to receive therefrom a first RF signal in the first channel, the antennas of the first set being arranged and configured to radiate, along a first direction, the first RF signal as a first beam having a first beamwidth. A second set of at least two planar antennas from among the plurality of planar antennas is coupled with the second radio-chain circuitry of the second radio to receive therefrom a second RF signal in the second channel, the antennas of the first set being arranged and configured to radiate, along a second direction, the second RF signal as a second beam having a second beamwidth. Either (i) the second direction is different from the first direction, or (ii) the second beamwidth is different from the first beamwidth, or (iii) both the second direction is different from the first direction and the second beamwidth is different from the first beamwidth.

Aspect 52 according to aspect 51, wherein the plurality of antennas comprise planar antennas.

Aspect 53 according to aspect 52, wherein the planar antennas of the first set have normals oriented along a first direction, and the planar antennas of the second set have normals oriented along a second direction parallel to the first direction.

Aspect 54 according to aspect 51 or 52, wherein the planar antennas of the first set are printed on a first printed circuit board (PCB), and the planar antennas of the second set have been printed on a second PCB different from the first PCB.

Aspect 55 according to any one of aspects 51 to 54, wherein the wireless-access point comprises coupling circuitry connected to (i) the first radio-chain circuitry of the first radio to receive the first RF signal and the second radio-chain circuitry of the second radio to receive the second RF signal, and (ii) the plurality of antennas to provide the first RF signal and the second RF signal to corresponding sets of the plurality. The coupling circuitry is configured to cause the wireless-access point to (i) selectively change either the first direction of the first beam used to radiate the first RF signal in the first channel to a third direction, or the first beamwidth of the first beam used to radiate the first RF signal in the first channel to a third beamwidth; and (ii) either selectively change, independently of the change of the first direction, the second direction of the second beam used to radiate the second RF signal in the second channel to a fourth direction, or (iii) selectively change, independently of the change of the first beamwidth, the second beamwidth of the second beam used to radiate the second RF signal in the second channel to a fourth beamwidth.

Aspect 56 according to aspect 55, wherein both the third direction and the fourth direction are parallel.

Aspect 57 according to aspect 55, wherein both the third beamwidth and the fourth beamwidth are equal.

Aspect 58 according to aspect 55, wherein the coupling circuitry comprises a Butler matrix.

Aspect 59 according to any one of aspects 51 to 58, wherein the antennas are microstrip patch antennas.

Aspect 60 according to any one of aspects 51 to 59, wherein the antennas of the first set have a first reflection coefficient configured such that a first value of the first reflection coefficient at RF frequencies of the first channel is smaller by a first predetermined factor than a second value of the first reflection coefficient at RF frequencies of the second channel, the antennas of the second set have a second reflection coefficient configured such that a first value of the second reflection coefficient at RF frequencies of the second channel is smaller by a second predetermined factor than a second value of the second reflection coefficient at RF frequencies of the first channel.

Aspect 61 according to aspect 60, wherein each of the first predetermined factor and the second predetermined factor is between 2 and 10; and each of the second value of the first reflection coefficient and the second value of the second reflection coefficient is between 0.85 and 0.99.

Aspect 62 according to aspect 60, wherein the first predetermined factor is the same as the second predetermined factor.

Aspect 63 according to any one of aspects 51 to 62, wherein the first channel belongs to a first operating frequency band; and the second channel belongs to a second operating frequency band that is adjacent to the first operating frequency band.

Aspect 64 according to any one of aspects 51 to 62, wherein the first channel belongs to a first operating frequency band; the second channel belongs to a second operating frequency band; and the first operating frequency band and second operating frequency band are in the 5 GHz unlicensed bands.

Aspect 65 according to any one of aspects 51 to 64, wherein the wireless-access point comprises a third radio that comprises third radio-chain circuitry configured to transmit, simultaneously to transmissions of the RF signals by the first radio and the second radio, respective RF signals in a third channel which is non-overlapping with either the first channel or the second channel. Here, a third set of at least two planar antennas from among the plurality of planar antennas is coupled with the third radio-chain circuitry of the third radio to receive therefrom a third RF signal in the third channel, the antennas of the third set being arranged and configured to radiate, along a third direction, the third RF signal as a third beam having a second beamwidth.

Aspect 66 according to aspect 65, wherein the wireless-access point comprises an enclosure arranged and configured to encompass the first radio, the second radio, the third radio, and the plurality of antennas. Here, a first distance between the first set of at least two antennas and the third set of at least two antennas is smaller than a second distance between the second set of at least two antennas and the third set of at least two antennas when a first frequency separation between the first channel of the first radio and the third channel of the third radio is larger than a second frequency separation between the second channel of the second radio and the third channel of the third radio.

In some implementations, the foregoing WNDs and MR-WNDs can be configured with other interface matrix arrangements, as described below.

Referring again to FIG. 2, the MR-WND 201 uses at least one radio 230 with multiple RF chains 232 transmitting multiple RF signals. As described above, the radio 230 can support MIMO transmission techniques where multiple spatial streams (SS) of data are transmitted simultaneously over the wireless medium. The RF signals are coupled to an antenna system 200 including an interface matrix 220 and a multi-port antenna 210. Note that the terms interface matrix and interface matrix circuitry are used interchangeably. In a particular embodiment the multi-port antenna 210 is implemented as the multi-port array antenna 1610. This multi-port array antenna 1610 can also be referred to as a multi-beam multi-port antenna. The interface matrix 220 couples the RF signals to the input antenna ports of the multi-beam multi-port antenna 1610. The coupling state of the interface matrix 220 is determined by the input control signals 222. The following discussion refers to an implementation in which the multi-beam multi-port antenna 1610 radiates the RF signals coupled to its input port with the same polarization. Note that it is straightforward to extend this disclosure to multiple polarizations by including multiple interface matrices for each polarization and different single polarization multi-beam multi-port antenna systems or a multi-polarization multi-beam multi-port antenna system, as described above in this specification. For the sake of clarity, we will only consider a single polarization system in the following description of FIGS. 38-39.

Figure 38:
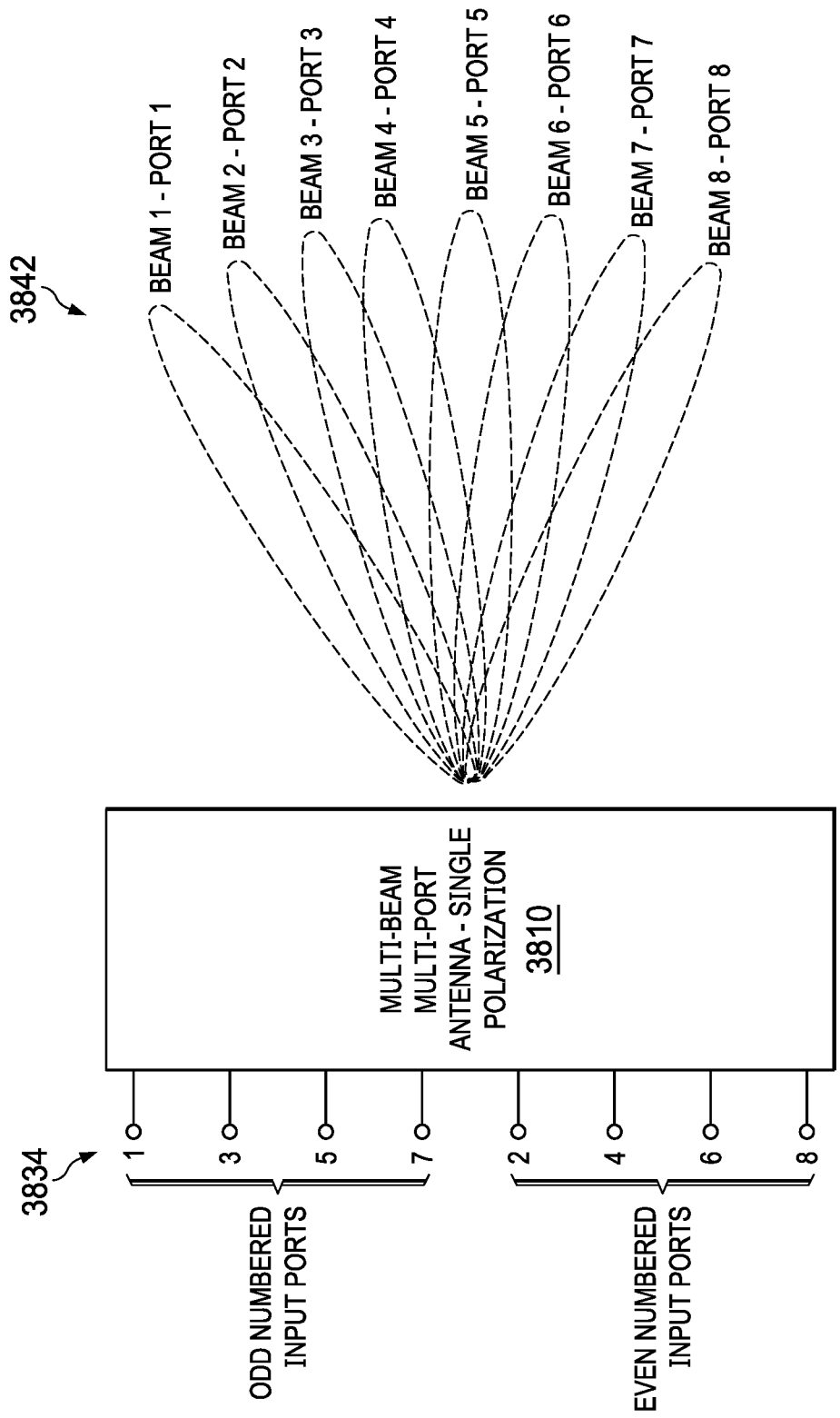
FIG. 38 illustrates a multi-beam, multi-port antenna with eight input ports and that radiates the RF signals coupled to each input port according to a different directional radiation pattern, according to an embodiment.

Referring now to FIG. 38, let us consider a multi-beam multi-port antenna 3810 with eight input ports 3834 radiating the RF signals coupled to each input port 3834 according to a different directional radiation pattern from among a plurality of directional radiation patterns (or beams) 3842 which the multi-beam multi-port antenna 3810 is configured to radiate. For example, in the illustrative example of FIG. 38, the RF signal coupled to input port n (n=1, . . . , 8) is radiated according to beam n (n=1, . . . , 8) of the eight beams 3842 which the multi-beam multi-port antenna 3810 is configured to radiate. Furthermore, some implementations of the multi-beam multi-port antenna 3810 can simultaneously radiate different RF signals coupled to different input ports 3834 according to the different directional radiation patterns 3842 corresponding to the input ports 3834 excited by the RF signals. Continuing with the example implementation of the multi-beam multi-port antenna 3810 shown in FIG. 38, assuming that RF signals 1 and 2 are coupled to input port 3834-$i$ and 3834-$j$, respectively, where i and j are different, then RF signal 1 will be radiated according to beam 3842-$i$ and RF signal 2 will simultaneously be radiated according to beam 3842-$j$.

Figure 39:
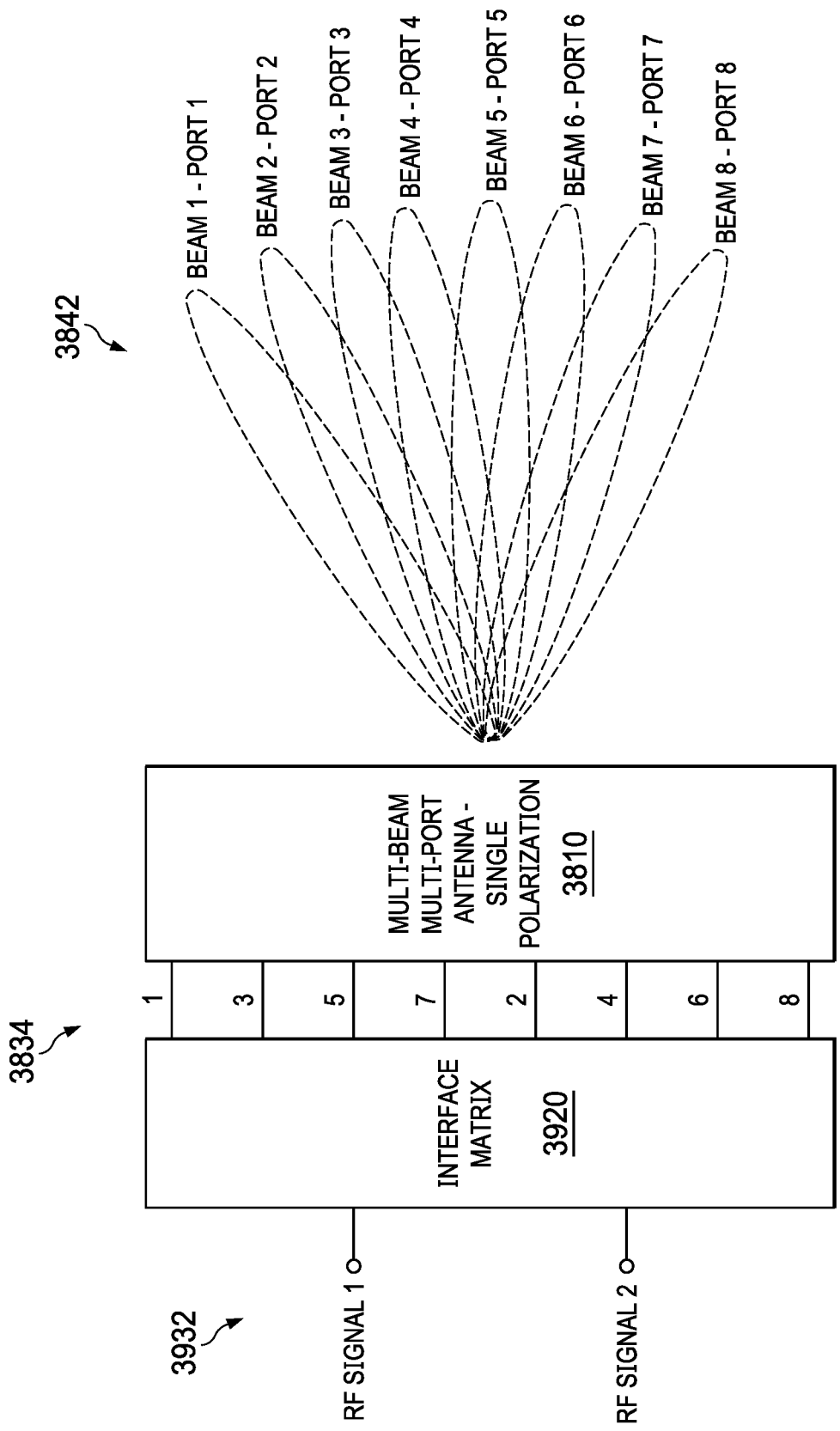
FIG. 39 illustrates a case where two RF signals are coupled through an interface matrix to an eight-beam eight-port antenna, according to an embodiment.

For the sake of clarity, we will now consider the case, as shown in FIG. 39 of two RF signals provided on respective RF chains 3932 and coupled through an interface matrix 3920 to the multi-beam multi-port antenna 3810 having the eight input ports 3834 and being configured to radiate the eight beams 3842. For a case of 2 RF signals provided on respective RF chains 3932, we will consider that the multi-beam multi-port antenna 3810 is configured such that all even numbered input ports are consecutive to each other in a first set, and all odd number input ports are consecutive to each other in a second set. The input ports 3834' ordering in each set (an increasing order is shown in FIGS. 38-39 for illustrative purpose) as well as the sets ordering is not important.

Another implementation of the multi-port antenna system 1610 of the MR-WND 201 was described above in connection with FIGS. 25-27. The disclosed dual-polarization Multi-Port Antenna (MPA) system 2700 has an MPA 2710 with eight ports. It also includes two interface matrices, one 2720H for vertical polarization radiated RF signals and the second one 2720V for horizontal polarization radiated RF signals. The MPA 2710 includes two 8×8 Butler matrices 2562H, 2562V configured as illustrated in FIG. 25. As described above, a RF signal coupled to an input port 2501 of a Butler matrix 2562H/V will be distributed to the Butler matrix output ports 2502 with a phase distribution different for each Butler matrix input port 2501.

Assuming the Butler matrix output ports 2502 are interconnected with equal delay transmission lines to identical radiating elements 514, 1952 equally spaced half a wavelength apart, the phase distribution at the output ports 2502 of the 8×8 Butler matrix 2562 is such that RF signals at each Butler matrix input port 2501 are radiated according to the beams illustrated in FIG. 26. Furthermore, when different Butler matrix input ports are simultaneously excited by different RF signals, each RF signal is simultaneously radiated according to the different directional radiation pattern corresponding to the input port 2734H/V excited by the RF signal. We can observe that this Butler matrix arrangement respects the conditions on the input port order described before. Note that this arrangement of Butler matrix is the most common arrangement because of its ease of realization and resulting circuit compactness.

In the following discussions carried out below in connection with FIGS. 40-45, we will assume a multi-beam multi-port antenna as shown in FIG. 27 with the Butler matrix input port order shown in FIGS. 26-27. The problem that arises is to find efficient arrangements for the interface matrices 2720H, 2720V for the antenna system 2700. An efficient arrangement is one that minimizes the cost and signal power loss of the interface matrix 2720H/V. The cost is determined by, without limitations, the number and types of components, the number of layers required for the printed circuits board, the circuit size, etc. The signal power loss is determined by, without limitations, the number of components (RF switches, cross-overs, etc.) and via holes a signal should travel through and the transmission line length. We are thus interested in an arrangement of the interface matrix 2720H/V with a compact circuit with the lowest number of components and vias.

Figure 40:
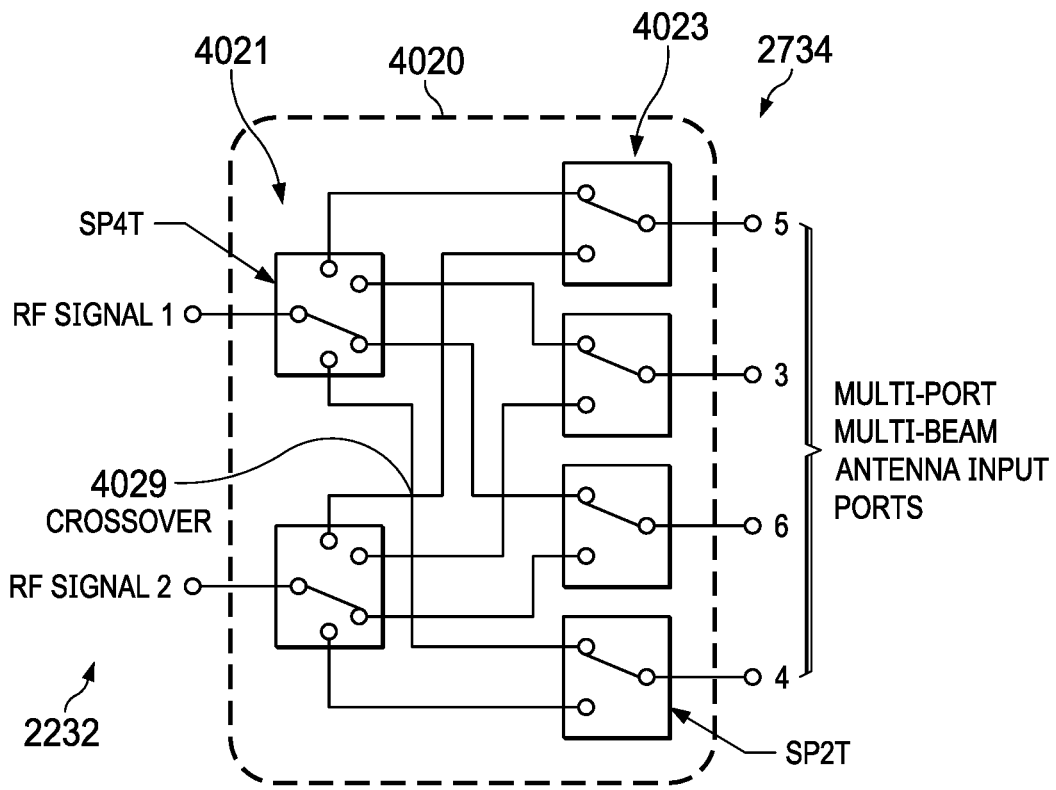
FIG. 40 illustrates an interface matrix that has two RF signals at its input and that can be coupled to any of four selected input ports of the multi-beam multi-port antenna using two single pole quad throw (SP4T) RF switches, four single pole double throw (SP2T) RF switches and six crossovers, according to an embodiment.

FIG. 40 illustrates an interface matrix 4020 coupled at its input with two RF chains 2232 and at its output with four of the input ports 2734 of a multi-port multi-beam antenna (e.g., MPA 2710). The interface matrix 4020 is implemented using prior art concatenation of two one-t-four demultiplexers and four two-to-one multiplexers. The interface matrix 4020 thus includes two single pole quad throw (SP4T) RF switches 4021 connected with the RF chains 2232, and four single pole double throw (SP2T) RF switches 4023 connected with the SP4T RF switches 4021 and with the multi-port multi-beam antenna's input ports 2734. Here, connections of the four SP2T RF switches 4023 with the SP4T RF switches 4021 form six crossovers 4029.

As an example, let us assume that two RF signals are delivered over RF chains 2232 at the interface matrix 4020's input. The arrangement and configuration of the noted components of the interface matrix 4020 enables coupling of the two RF signals to any of four selected input ports of the multi-beam multi-port antenna. Here, selected input ports means input ports that have been pre-selected, or predetermined, for use during operation. For instance, a multi-beam multi-port antenna can have a large number of ports, for instance eight, and only four of them are to be used in certain cases. In the example illustrate in FIG. 40 and in Table 1, the four selected input ports are ports 2734-3, 4, 5, 6 which corresponds to the four consecutive beams 2642 at broadside.

TABLE 1

| Input Ports | 1 | 2 | 3 | 4 | 5 | 6 | 7 | 8 |
|---|---|---|---|---|---|---|---|---|
| RF signal 1 | | | x | x | x | x | | |
| RF signal 2 | | | x | x | x | x | | |

A few efficient arrangements of the interface matrix, which take advantage of the system operation and requirements, as well as the particular structure of the input port order of the multi-beam, multi-port antenna, are described next.

Figure 41:
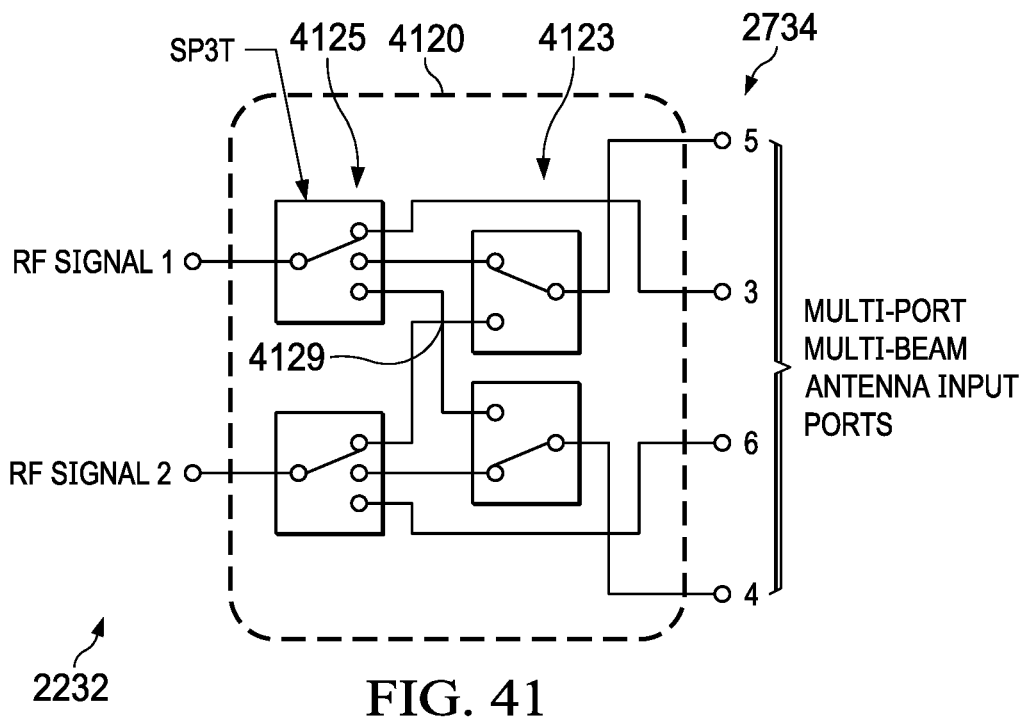
FIG. 41 illustrates an interface matrix simplified from the one shown in FIG. 40, where the interface matrix has two RF signals at its input that can be coupled to any of four selected input ports of the multi-beam multi-port antenna in the same relative order as the input RF signals, according to an embodiment.

FIG. 41 illustrates an interface matrix 4120 coupled at its input with two RF chains 2232 and at its output with four of the input ports 2734 of a multi-port multi-beam antenna (e.g., MPA 2710). The interface matrix 4120 includes two single pole triple throw (SP3T) RF switches 4125 connected with the RF chains 2232, and two SP2T RF switches 4123 connected with the SP3T RF switches 4125 and with the multi-port multi-beam antenna's input ports 2734. Here, connections of the two SP2T RF switches 4123 with the SP3T RF switches 4125 form one crossover 4129, and with the multi-port multi-beam antenna's input ports 2734 form two crossovers 4129.

A first arrangement improvement can be achieved by adding a constraint that RF signal 1 and RF signal 2 delivered to the interface matrix 4120 should always be radiated from beams in the same relative order (i.e., RF signal 1 is always radiated from a lower numbered beam or a higher numbered beam than that of RF signal 2). For most wireless network devices or protocols, such as Wi-Fi 802.11 and LTE, this constraint doesn't impact the system performance. This constraint eliminates connection permutations and the interface matrix 4020 can be simplified to the implementation of the interface matrix 4120. As an example, let us assume that two RF signals are delivered over RF chains 2232 at the interface matrix 4120's input. The arrangement and configuration of the noted components of the interface matrix 4120 enables coupling of the two RF signals to any of four selected input ports of the multi-beam multi-port antenna in the same relative order. In the example illustrate in FIG. 41 and in Table 2, the four selected input ports are ports 2734-3, 4, 5, 6 which corresponds to the four consecutive beams 2642 at broadside.

TABLE 2

| Input Ports | 1 | 2 | 3 | 4 | 5 | 6 | 7 | 8 |
|---|---|---|---|---|---|---|---|---|
| RF signal 1 | | | x | x | x | | | |
| RF signal 2 | | | | x | x | x | | |

As shown in FIG. 41, the interface matrix 4120 is simplified from the interface matrix 4020 shown in FIG. 40 since the interface matrix 4120 has fewer components and crossovers than the interface matrix 4020. It can be observed that interface matrix 4120 achieves, by changing control signal of the RF switches 4123, 4125, all combinations of two excited beams with RF signal 1 radiated from a lower numbered beam than RF signal 2.

The need for crossovers 4129 at the output of the SP2T switches 4123 incurs extra signal power loss and extra cost and can be eliminated by realizing the important fact that the beam order in which RF signals are radiated is not important to the performance of the system. That is, for most wireless network devices or protocols, such as WiFi 802.11x and LTE, the radio transmission is agnostic to the order of the beam on which the RF signals are radiated. For example, the radio system operation and performance is the same whether RF signal 1 and RF signal 2 are respectively radiated according to beam 2642-*i* and 2642-*j*, or beam 2642-*j* and 2642-*i*.

This insight enables the elimination of the connections required to support the various permutations of RF signals mapping to input ports and thus provides a second arrangement improvement that enables at least one permutation, as described next.

Figure 42:
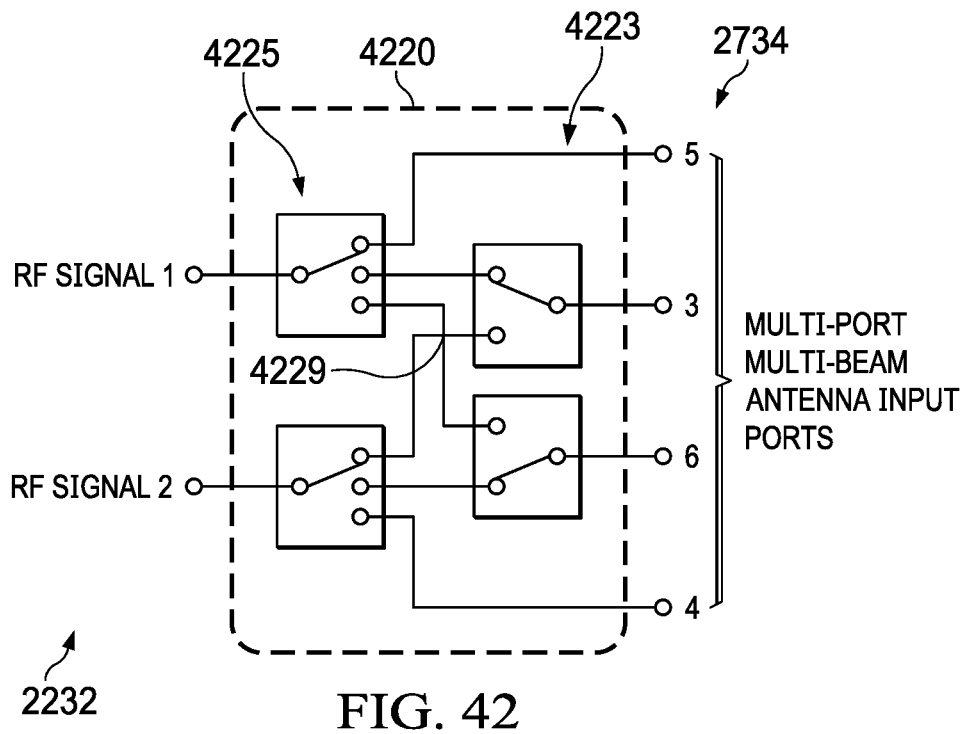
FIG. 42 illustrates an interface matrix simplified from the ones shown in FIGS. 40-41, where the interface matrix has two RF signals at its input that can be coupled to any set of two selected input ports, irrespective of the order in which the two RF signals are coupled to the two selected input ports, out of four selected input ports of the multi-beam multi-port antenna, according to an embodiment.

FIG. 42 illustrates an interface matrix 4220 coupled at its input with two RF chains 2232 and at its output with four of the input ports 2734 of a multi-port multi-beam antenna (e.g., MPA 2710). The interface matrix 4220 includes two SP3T RF switches 4225 connected with the RF chains 2232, and two SP2T RF switches 4223 connected with the SP3T RF switches 4125 and with the multi-port multi-beam antenna's input ports 2734. Here, connections of the two SP2T RF switches 4223 with the SP3T RF switches 4225 form one crossover 4229.

As an example, let us assume that two RF signals are delivered over RF chains 2232 at the interface matrix 4220's input. The arrangement and configuration of the noted components of the interface matrix 4220 enables coupling of the two RF signals to any set of two input ports, irrespective of the order in which the two RF signals are coupled to the two input ports, out of four selected input ports 2734 of the multi-beam multi-port antenna. In the example illustrated in FIG. 42 and Table 3, the four selected input ports are ports 2734-3, 4, 5, 6 which corresponds to the four consecutive beams 2642 at broadside.

TABLE 3

| Input Ports | 1 | 2 | 3 | 4 | 5 | 6 | 7 | 8 |
|---|---|---|---|---|---|---|---|---|
| RF signal 1 | | | x | | x | x | | |
| RF signal 2 | | | x | x | | x | | |

As shown in FIG. 42, the interface matrix 4220 is simplified from the interface matrix 4120 shown in FIG. 41 as the interface matrix 4220 has fewer crossovers than the interface matrix 4120. The elimination of the last stage crossovers reduces the cost, signal loss and circuit size of the interface matrix 4220. It can be observed that interface matrix 4220 achieves, by changing the control signal of the RF switches 4223, 4225, all combinations of two radiated beams with a single permutation of mapping the two RF signals to the two beams (beams (3, 4), (5, 3), (3, 6), (5, 4), (6, 4)). Note that the order of the RF signal coupling to the two beams varies for the different configurations.

A third arrangement with significant improvement can be realized by constraining the RF signals to radiate from adjacent beams. This is a typical constraint since wireless network deployments usually require a radio to provide a continuous coverage without a hole for a single polarization. This can only be achieved by having RF signals radiate from adjacent beams without one or more non-excited beams in between. By combining this constraint with the crucial insight that the radio transmission and performance is agnostic to the order of the beam on which the RF signals are radiated enables significant improvements in the interface matrix arrangement, as described next.

Figure 43:
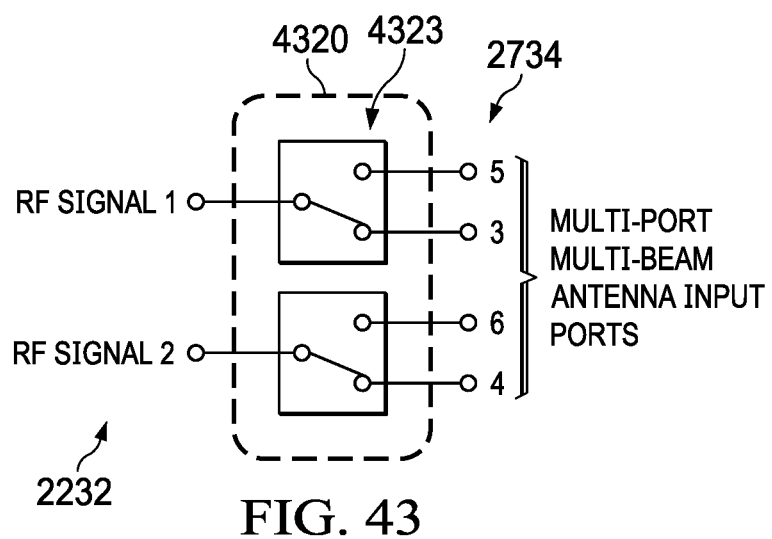
FIG. 43 illustrates an interface matrix simplified from the ones shown in FIG. 40 and FIG. 42, where the interface matrix has two RF signals at its input that can be coupled to any set of two adjacent selected input ports, irrespective of the order in which the two RF signals are coupled to the two selected input ports, out of four selected input ports of the multi-beam multi-port antenna, according to an embodiment.

FIG. 43 illustrates an interface matrix 4320 coupled at its input with two RF chains 2232 and at its output with four of the input ports 2734 of a multi-port multi-beam antenna (e.g., MPA 2710). The interface matrix 4320 includes only two SP2T RF switches 4323 connected with the RF chains 2232 and with the multi-port multi-beam antenna's input ports 2734.

As an example, let us assume that two RF signals are delivered over RF chains 2232 at the interface matrix 4320's input. The arrangement and configuration of the noted components of the interface matrix 4320 enables coupling of the two RF signals to any set of two adjacent input ports, irrespective of the order in which the two RF signals are coupled to the two input ports, out of four selected input ports 2734 of the multi-beam multi-port antenna. In the example illustrated in FIG. 43 and Table 4, the four selected input ports are ports 2734-3, 4, 5, 6 which corresponds to the four consecutive beams 2642 at broadside.

TABLE 4

| Input Ports | 1 | 2 | 3 | 4 | 5 | 6 | 7 | 8 |
|---|---|---|---|---|---|---|---|---|
| RF signal 1 | | | x | | x | | | |
| RF signal 2 | | | | x | | x | | |

As shown in FIG. 42, the interface matrix 4320 is simplified from the interface matrix 4220 shown in FIG. 42. The elimination of all crossovers and the second stage of RF switches significantly reduces the cost, signal power loss and circuit size of the interface matrix 4320. It can be observed that this interface matrix 4320 achieves, by changing the control signal of the RF switches 4323, all combinations of two adjacent beams with a single permutation of mapping the two RF signals to the two beams out of the four middle beams:

1. Configuration 1: RF signal 1 on Beam 3 and RF signal 2 on Beam 4;
2. Configuration 2: RF signal 1 on Beam 5 and RF signal 2 on Beam 4; and
3. Configuration 3: RF signal 1 on Beam 5 and RF signal 2 on Beam 6.

Figure 44:
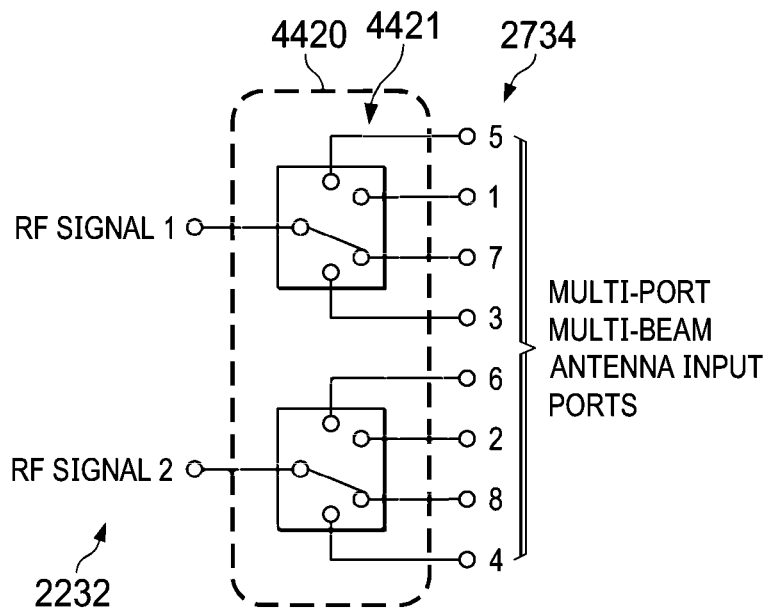
FIG. 44 illustrates an efficient interface matrix that couples two RF signals to any set of two adjacent selected input ports, irrespective of the order in which the two RF signals are coupled to the two selected input ports, out of eight selected input ports of the multi-beam, multi-port antenna, and that includes a single stage of two SP4T switches, according to an embodiment.

The disclosed arrangements can be extended to various number of input ports and RF signals. FIG. 44 illustrates an interface matrix 4420 coupled at its input with two RF chains 2232 and at its output with eight input ports 2734 of a multi-port multi-beam antenna (e.g., MPA 2710). The interface matrix 4420 includes only two SP4T switches 4421 connected with the RF chains 2232 and with the multi-port multi-beam antenna's input ports 2734.

For example, let us assume that two RF signals are delivered over RF chains 2232 at the interface matrix 4420's input. The arrangement and configuration of the noted components of the interface matrix 4420 enables coupling of the two RF signals to any set of two adjacent input ports, irrespective of the order in which the two RF signals are coupled to the two input ports, out of eight selected input ports 2734 of the multi-beam multi-port antenna. In the example illustrated in FIG. 44 and Table 5, the eight selected input ports are all the ports 2734-1, . . . , 8 which corresponds to all consecutive beams 2642.

TABLE 5

| Input Ports | 1 | 2 | 3 | 4 | 5 | 6 | 7 | 8 |
|---|---|---|---|---|---|---|---|---|
| RF signal 1 | x | | x | | x | | x | |
| RF signal 2 | | x | | x | | x | | x |

This simplified interface matrix 4320 is much more efficient that conventional arrangements.

Let us now consider the generalization of the embodiments 4320 and 4420 of an interface matrix, to a general case where the number of RF signals is N≥2 and the multi-beam multi-port antenna has M selected input ports that are used (here, the unused input ports are not considered and numbered). Let us define K=ceil(M/N), where ceil(x) is the smallest integer number larger or equal to x. Then, input ports for which the remainder of the input port number L divided by N are the same should be adjacent. Then in this case, assuming RF signals should be radiated from adjacent beams and the coupling order of RF signals to input ports is irrelevant, the interface matrix arrangement consists of a single stage of SPKT (single pole K-throw) RF switches, and the output of each of the SPKT RF switches is connected to a different set of input ports for which the remainder of the input port number L divided by N are the same.

Figure 45:
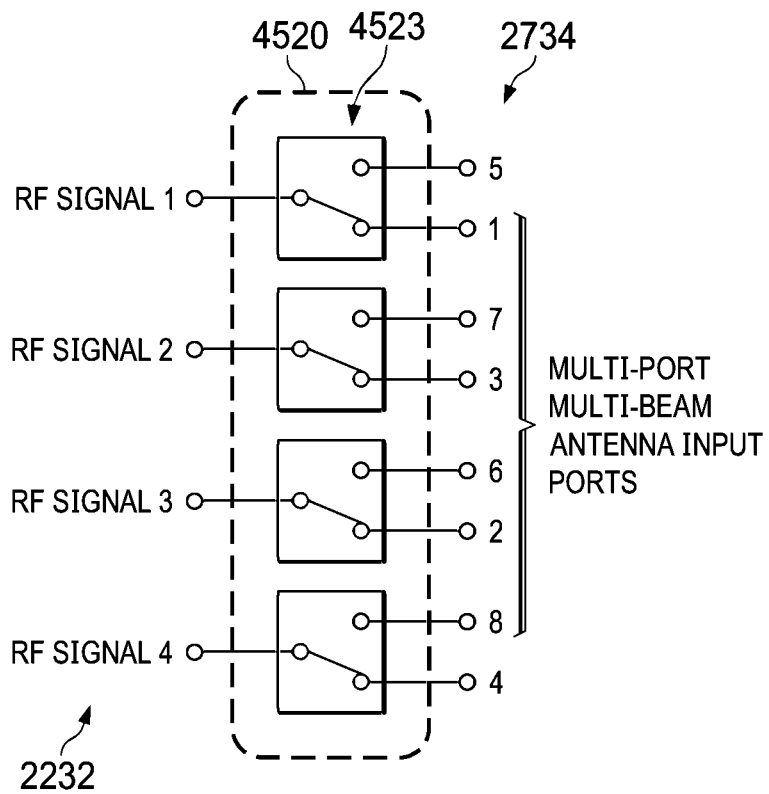
FIG. 45 illustrates an efficient interface matrix that couples four RF signals to any set of four adjacent selected input ports, irrespective of the order in which the four RF signals are coupled to the four selected input ports, out of eight selected input ports of the multi-beam, multi-port antenna, and that includes a single stage of four single port double throw (SP2T) switches, according to an embodiment.

FIG. 45 illustrates an interface matrix 4520 coupled at its input with four RF chains 2232 and at its output with eight input ports 2734 of a multi-port multi-beam antenna, e.g., MPA 2710. The interface matrix 4520 includes a single stage of four SP2T RF switches 4523 connected with the RF chains 2232 and with the multi-port multi-beam antenna's input ports 2734.

In terms of the above-noted generalization, the interface matrix 4520 receives, over the RF chains 2232, N=4 input RF signals and couples them with M=8 selected input ports of a multi-beam multi-port antenna, e.g., 2710. In this case, we then have K=2. Then the Butler matrix based antenna 2710 (shown in FIGS. 26-27) respects the input order condition stated above.

Furthermore, the arrangement and configuration of the noted components of the interface matrix 4520 enables the Butler matrix based antenna 2710 to radiate the four RF signals from adjacent beams irrespective of the order in which the four RF signals are coupled to the four input ports, out of eight selected input ports 2734 of the multi-beam multi-port antenna 2710. In the example illustrated in FIG. 45 and Table 6, the eight selected input ports are all the ports 2734-1, . . . , 8 which corresponds to all consecutive beams 2642.

TABLE 6

| Input Ports | 1 | 2 | 3 | 4 | 5 | 6 | 7 | 8 |
|---|---|---|---|---|---|---|---|---|
| RF signal 1 | x |   |   |   | x |   |   |   |
| RF signal 2 |   |   | x |   |   |   | x |   |
| RF signal 3 |   | x |   |   |   | x |   |   |
| RF signal 4 |   |   |   | x |   |   |   | x |

The above embodiments of the interface matrix circuitry can be integrated in a MR-WND with multiple radios, each radio with multiple RF ports transmitting RF signals, where the multiple RF ports are coupled to one or more multi-port antenna systems. In this embodiment, such multiple radios and multi-port antenna systems are integrated into a single MR-WND. The different radios transmit RF signals in different RF channels. The multi-port antenna systems can further include the interface matrix circuitry disclosed herein, to reconfigure the coupling of RF signals to beams. Furthermore, the interface matrix circuitry described herein enables the simultaneous coupling of multiple RF ports from a single radio to the multi-beam multi-port antenna input ports allowing multiple different RF signals from a single radio to be simultaneously radiated according to different beams and further to dynamically reconfigure, using control signals to determine the coupling state of the SPKT switches, the coupling of RF signals to the radiated beams.

An example of such use case occurs, without limitations, in the Multi-Radio Wireless Network Device (MR-WND) with multi-port antennas systems, such as the Multi-Port Array (MPA) antenna system 2700, where the interface matrix circuitry is used to implement the interface matrices 2720H, V.

One skilled in the art will appreciate the advantages of the arrangement disclose herein and can easily extend it to other configurations of RF signals and antenna input ports.

In general, innovative aspects of the technologies described herein can be implemented in wireless-access points that include one or more of the following aspects:

In general aspect 67, a multi-port, multi-beam antenna comprises a Butler matrix with multiple input ports, wherein a number M of the multiple input ports are predetermined for use and are labeled using integer labels L, where a radio frequency (RF) signal coupled to an input port L and another RF signal coupled to another input port L±1 are radiated on adjacent beams by the multi-port, multi-beam antenna; and interface matrix circuitry comprising a single stage of N single pole K-throw RF switches, where 2≤N≤M and K=ceil(M/N), the K output ports of each single pole K-throw RF switch being connected to a respective set of K input ports of the Butler matrix, such that the sets are disjoint. The interface matrix circuitry is configured to (i) receive N RF signals in one-to-one correspondence with the N single pole K-throw RF switches, and couple the N RF signals to any N input ports, from among the M predetermined input ports of the Butler matrix, for which the N coupled RF signals are radiated by the multi-port, multi-beam antenna on adjacent beams.

Aspect 68 according to aspect 67, wherein each set of K input ports of the Butler matrix, to which the K output ports of a corresponding single pole K-throw RF switch are connected, are disposed adjacently and have labels L with the same value of mod(L, N).

Aspect 69 according to aspect 67, wherein the interface matrix circuitry is configured to couple a first RF signal to an input port having a first label, and a second RF signal to an input port having a second label. Here, in a first configuration, a value of the second label is larger than a value of the first label, and in a second configuration, a value of the second label is smaller than a value of the first label.

Aspect 70 according to aspect 67, wherein there are four predetermined input ports from among the multiple input ports of the Butler matrix, the predetermined input ports being labeled (5, 3, 6, 4). The interface matrix circuitry comprises a single stage of two single pole 2-throw RF switches to receive two RF signals, respectively. Additionally, the input ports, to which the two RF signals are to be respectively coupled to be radiated by the multi-port, multi-beam antenna on adjacent beams, are one of (3, 4), (5, 4), or (5, 6).

Aspect 71 according to aspect 67, wherein there are 8 predetermined input ports from among the multiple input ports of the Butler matrix, the predetermined input ports being labeled (5, 1, 7, 3, 6, 2, 8, 4). The interface matrix circuitry comprises a single stage of two single pole 4-throw RF switches to receive two RF signals. Additionally, the input ports, to which the two RF signals are to be coupled to be radiated by the multi-port, multi-beam antenna on adjacent beams, are one of (1, 2), (3, 2), (3, 4), (5, 4), (5, 6), (7, 6), or (7, 8).

Aspect 72 according to aspect 67, wherein there are eight predetermined input ports from among the multiple input ports of the Butler matrix, the predetermined input ports being labeled (5, 1, 7, 3, 6, 2, 8, 4). The interface matrix circuitry comprises a single stage of four single pole 2-throw RF switches to receive four RF signals. Additionally, the input ports, to which the four RF signals are to be coupled to be radiated by the multi-port, multi-beam antenna on adjacent beams, are one of (1, 3, 2, 4), (5, 3, 2, 4), (5, 3, 6, 4), (5, 7, 6, 4), (5, 7, 6, 8).

In general aspect 73, a multi-port, multi-beam antenna comprises a Butler matrix with multiple input ports, wherein four of the multiple input ports are predetermined for use and are labeled using integer labels L, where a radio frequency (RF) signal coupled to an input port L and another RF signal coupled to another input port L±1 are radiated on adjacent beams by the multi-port, multi-beam antenna; and interface matrix circuitry comprising (i) a first stage of two single pole 3-throw RF switches, (ii) a second stage of two single pole 2-throw RF switches, and (iii) three crossovers. The interface matrix circuitry is configured to (i) receive two RF signals in one-to-one correspondence with the two single pole 3-throw RF switches, and (ii) couple the two RF signals to any two input ports, from among the four predetermined input ports of the Butler matrix, such that any of the two input ports to which the two RF signals are to be coupled are labeled in the same relative order as the two RF signals.

Aspect 74 according to aspect 73, wherein the predetermined input ports being labeled (5, 3, 6, 4), and the two input ports to which the two RF signals are to be coupled are one of (3, 4), (4, 5), (5, 6), (3, 5), (3, 6), or (4, 6).

In general aspect 75, a multi-port, multi-beam antenna comprises a Butler matrix with multiple input ports, wherein four of the multiple input ports are predetermined for use and are labeled using integer labels L, where a radio frequency (RF) signal coupled to an input port L and another RF signal coupled to another input port L±1 are radiated on adjacent beams by the multi-port, multi-beam antenna; and interface matrix circuitry comprising (i) a first stage of two single pole 3-throw RF switches, (ii) a second stage of two single pole 2-throw RF switches, and (iii) a single crossover. The interface matrix circuitry is configured to (i) receive two RF signals in one-to-one correspondence with the two single pole 3-throw RF switches, and (ii) couple the two RF signals to any two input ports from among the four predetermined input ports of the Butler matrix.

Aspect 76 according to aspect 75, wherein the interface matrix circuitry is configured to couple a first RF signal to an input port having a first label, and a second RF signal to an input port having a second label. Here, in a first configuration, a value of the second label is larger than a value of the first label, and in a second configuration, a value of the second label is smaller than a value of the first label.

Aspect 77 according to aspect 75, wherein the predetermined input ports being labeled (5, 3, 6, 4), and the two input ports to which the two RF signals are to be coupled are one of (3, 4), (5, 3), (3, 6), (5, 4), or (6, 4).

In general aspect 78, a multi-port, multi-beam antenna comprises a horizontal polarization Butler matrix with multiple input ports; a horizontal polarization interface matrix configured to receive first and second radio frequency (RF) signals, to couple the first RF signal to a first set of input ports of the horizontal polarization Butler matrix and to couple the second RF signal to a second set of input ports of the horizontal polarization Butler matrix, where the first and second set of input ports are disjoint; a horizontal polarization interconnection feeding network coupled to the horizontal polarization Butler matrix; a horizontal polarization row feeding network coupled to the horizontal interconnection feeding network; an antenna element comprising two separate antenna feeds, where RF signals coupled to each antenna feed are radiated with orthogonal polarization, and one antenna feed is coupled to the horizontal polarization row feeding network; a vertical polarization row feeding network coupled to other antenna feed of the antenna element; a vertical polarization interconnection feeding network coupled to the vertical polarization row feeding networks; a vertical polarization Butler matrix with multiple input ports coupled to the vertical polarization interconnection feed network; and a vertical polarization interface matrix configured to receive third and fourth RF signals, to couple the third RF signal to a first set of input ports of the vertical polarization Butler matrix and to couple the fourth RF signal to a second set of input ports of the vertical polarization Butler matrix, where the first and second set of input ports are disjoint.

In aspect 79, a wireless-network device comprises a radio comprising N≥2 RF chains; and the multi-port, multi-beam antenna according to any one of the aspects 67-78; and control circuitry communicatively coupled with the radio and the interface matrix circuitry of the multi-port, multi-beam antenna. Here, the N RF chains are (i) coupled in one-to-one correspondence with the N RF switches of the first, or single, stage of the interface matrix circuitry, and (ii) configured to concurrently transmit N RF signals to the interface matrix circuitry. Additionally, the control circuitry is configured to provide control signals to the interface matrix circuitry for determining the coupling state of the N RF switches to cause coupling of the N RF signals to N of the M predetermined input ports of the Butler matrix of the multi-port, multi-beam antenna, thereby causing the multi-port, multi-beam antenna to concurrently radiate the N RF signals on respective N of available M beams corresponding to the predetermined input ports of the Butler matrix.

A few embodiments have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other embodiments fall within the scope of the following claims.

What is claimed is:

1. A wireless access point comprising:
a first radio providing, during operation of the wireless access device, at least a first and a second radio frequency (RF) communication signals in a first channel;
a first Butler matrix with multiple input ports and multiple output ports, wherein a first output port is coupled to a first set of antennas and a second output port is coupled to a second set of antennas;
a first interface matrix circuitry comprising at least two single pole K-throw RF switches, where at least two outputs from the single pole K-throw RF switches are coupled to different input ports of the first Butler matrix;

wherein the first interface matrix circuitry is configured to
receive at least the first and second RF signals from the first radio, and
couple the at least first and second RF signals to two different input ports of the Butler matrix;
wherein the first radio is assignable to a plurality of spatial sectors, and further comprises:
a processor bank including one or more processors; and
non-transitory computer-readable storage medium storing instructions that, when executed by the one or more processors, cause the processor bank to perform operations comprising:
(i) assigning the first radio to a corresponding spatial sector of the plurality of spatial sectors;
(ii) configuring the first interface matrix circuitry to radiate, along the first direction into the particular spatial sector, the first RF signal;
(iii) configuring the first interface matrix circuitry to radiate, along the second direction into the particular spatial sector, the second RF signal; and
(iv) dynamically reassigning the first radio to other different spatial sector of the plurality of sectors apart from the particular spatial sector in response to receiving and transmitting information from a network for dedicating and rededicating assignment of the first radio to specific spatial sectors and configuring the first interface matrix circuitry to radiate the RF signals of the radio in the different spatial sector.

2. The wireless access point of claim 1 wherein
a number M of the multiple input ports of the first Butler matrix are predetermined for use and are labeled using integer labels L, where a radio frequency (RF) signal coupled to an input port L and another RF signal coupled to another input port L±1 are radiated on adjacent beams; and
the first interface matrix circuitry comprises a single stage of N single pole K-throw RF switches, where 2≤N≤M and K=ceil(M/N), the K output ports of each single pole K-throw RF switch being connected to a respective set of K input ports of the first Butler matrix, such that the sets are disjoint,
wherein the first interface matrix circuitry is configured to
receive N RF signals from the first radio in one-to-one correspondence with the N single pole K-throw RF switches, and
couple the N RF signals to any N input ports, from among the M predetermined input ports of the first Butler matrix, for which the N coupled RF signals are radiated on adjacent beams.

3. The wireless access point of claim 1, wherein each set of K input ports of the first Butler matrix, to which the K output ports of a corresponding single pole K-throw RF switch are connected, are disposed adjacently and have labels L with the same value of mod(L, N).

4. The wireless access point of claim 1, wherein
the interface matrix circuitry is configured to couple a first RF signal to an input port having a first label, and a second RF signal to an input port having a second label, and
in a first configuration, a value of the second label is larger than a value of the first label, and
in a second configuration, a value of the second label is smaller than a value of the first label.

5. The wireless access point of claim 1, wherein there are four predetermined input ports from among the multiple input ports of the Butler matrix, the predetermined input ports being labeled (5, 3, 6, 4),
the interface matrix circuitry comprises a single stage of two single pole 2-throw RF switches to receive two RF signals, respectively, and
the input ports, to which the two RF signals are to be respectively coupled to be radiated by the multi-port, multi-beam antenna on adjacent beams, are one of (3, 4), (5, 4), or (5, 6).

6. The wireless access point of claim 1, wherein
there are 8 predetermined input ports from among the multiple input ports of the Butler matrix, the predetermined input ports being labeled (5, 1, 7, 3, 6, 2, 8, 4),
the interface matrix circuitry comprises a single stage of two single pole 4-throw RF switches to receive two RF signals, and
the input ports, to which the two RF signals are to be coupled to be radiated by the multi-port, multi-beam antenna on adjacent beams, are one of (1, 2), (3, 2), (3, 4), (5, 4), (5, 6), (7, 6), or (7, 8).

7. The wireless access point of claim 1, wherein
there are eight predetermined input ports from among the multiple input ports of the Butler matrix, the predetermined input ports being labeled (5, 1, 7, 3, 6, 2, 8, 4),
the interface matrix circuitry comprises a single stage of four single pole 2-throw RF switches to receive four RF signals, and
the input ports, to which the four RF signals are to be coupled to be radiated by the multi-port, multi-beam antenna on adjacent beams, are one of (1, 3, 2, 4), (5, 3, 2, 4), (5, 3, 6, 4), (5, 7, 6, 4), (5, 7, 6, 8).

8. The wireless access point of claim 1 wherein
the first radio further provides, during operation of the wireless access device, at least a third and a fourth radio frequency (RF) communication signals in a first channel;
the first and second set of antennas comprises dual polarization antenna elements;
a second Butler matrix with multiple input ports and multiple output ports, wherein a first output port is coupled to the first set of antennas and a second output port is coupled to the second set of antennas;
wherein the first and third RF signals are radiated along the same direction but with orthogonal polarization; and
wherein the second and fourth RF signals are radiated along the same direction but with orthogonal polarization.

9. The wireless access point of claim 1 wherein configuring the first interface matrix circuitry comprises changing the coupling state of at least one of the single pole K-throw RF switches.

10. The wireless access point of claim 1 wherein at least two of the spatial sectors have the same beamwidth.

11. The wireless access point of claim 1 wherein at least two of the spatial sectors are spatially isolated.

12. The wireless access point of claim 1 wherein at least two of the spatial sectors have different beamwidth.

13. The wireless access point of claim 1 wherein at least two of the spatial sectors at least partially overlap.

14. The wireless access point of claim 1 wherein the first and second set of antennas comprises planar antenna elements with normal that are parallel.

15. The wireless access point of claim 1 wherein the first and second set of antennas comprises planar antenna elements and at least two planar antenna elements have normal that are not parallel.

16. The wireless access point of claim 1 further comprising
a second radio providing, during operation of the wireless access device, at least a third and a fourth radio frequency (RF) communication signals in a second channel wherein the first and second channels are isolated;
a second Butler matrix with multiple input ports and multiple output ports, wherein a first output port is coupled to a third set of antennas and a second output port is coupled to a fourth set of antennas;
a second interface matrix circuitry comprising at least two single pole K-throw RF switches, where at least two outputs from the single pole K-throw RF switches are coupled to different input ports of the second Butler matrix;
wherein the second interface matrix circuitry is configured to
receive at least the third and fourth RF signals from the first radio, and
couple the at least third and fourth RF signals to two different input ports of the second Butler matrix;
wherein the second radio is assignable to a plurality of spatial sectors;
wherein the non-transitory computer-readable storage medium storing instructions that, when executed by the one or more processors, further cause the processor bank to perform operations comprising:
(i) assigning the second radio to a corresponding spatial sector of the plurality of spatial sectors;
(ii) configuring the second interface matrix circuitry to radiate, along the first direction into the particular spatial sector, the third RF signal;
(iii) configuring the second interface matrix circuitry to radiate, along the second direction into the particular spatial sector, the fourth RF signal; and
(iv) dynamically reassigning the second radio to other different spatial sector of the plurality of sectors apart from the particular spatial sector in response to receiving and transmitting information from a network for dedicating and rededicating assignment of the second radio to specific spatial sectors and configuring the second interface matrix circuitry to radiate the RF signals of the radio in the different spatial sector.

17. The wireless access point of claim 16 wherein the first and second radio can be assigned to spatial sectors having the same beamwidth.

18. The wireless access point of claim 16 wherein the first and second radio can be assigned to spatial sectors having different beamwidth.

19. The wireless access point of claim 16 wherein the first and second radio can be assigned to spatial sectors that are at least partially overlapping.

20. The wireless access point of claim 16 wherein the first and second radio can be assigned to spatial sectors that are at spatially isolated.

21. The wireless access point of claim 16 wherein the first, second, third and fourth set of antennas comprises planar antenna elements with normal that are parallel.

22. The wireless access point of claim 16 wherein the first, second, third and fourth set of antennas comprises planar antenna elements where at least one antenna elements from the first and second set have normal that is not parallel to the normal of at least one antenna elements from the third and fourth set.

* * * * *